(12) United States Patent
Adlem et al.

(10) Patent No.: US 8,252,389 B2
(45) Date of Patent: Aug. 28, 2012

(54) MESOGENIC DIMERS

(75) Inventors: Kevin Adlem, Dorset (GB); Owain Llyr Parri, Hampshire (GB); Karl Skjonnemand, Southampton (GB); David Wilkes, Southampton (GB)

(73) Assignee: Merck Patent Gesellschaft mit Beschränkter Haftung, Darmstadt (DE)

( * ) Notice: Subject to any disclaimer, the term of this patent is extended or adjusted under 35 U.S.C. 154(b) by 225 days.

(21) Appl. No.: 12/679,341

(22) PCT Filed: Aug. 29, 2008

(86) PCT No.: PCT/EP2008/007089
§ 371 (c)(1),
(2), (4) Date: Mar. 22, 2010

(87) PCT Pub. No.: WO2009/039937
PCT Pub. Date: Apr. 2, 2009

(65) Prior Publication Data
US 2010/0222534 A1    Sep. 2, 2010

(30) Foreign Application Priority Data

Sep. 25, 2007    (EP) .................................... 07018811

(51) Int. Cl.
| C09K 19/38 | (2006.01) |
| C09K 19/34 | (2006.01) |
| C09K 19/30 | (2006.01) |
| C09K 19/20 | (2006.01) |
| C08F 138/02 | (2006.01) |
| C08F 138/04 | (2006.01) |
| C07C 69/34 | (2006.01) |
| C07C 69/52 | (2006.01) |
| C07C 69/76 | (2006.01) |
| C07D 319/06 | (2006.01) |

(52) U.S. Cl. .................... 428/1.1; 428/1.3; 252/299.01; 252/299.61; 252/299.63; 252/299.67; 526/285; 549/369; 560/73; 560/84; 560/85; 560/194; 560/220; 560/221

(58) Field of Classification Search .................. 428/1.1, 428/1.3; 252/299.01, 299.61, 299.62, 299.63, 252/299.67; 526/285; 549/369; 560/73; 560/84, 85, 194, 220, 221
See application file for complete search history.

(56) References Cited

U.S. PATENT DOCUMENTS 5,567,349 A    10/1996 Kelly et al.
(Continued)

FOREIGN PATENT DOCUMENTS

| DE | 19959723 A1 | 6/2000 |
| EP | 1199346 A2 | 4/2002 |
| WO | 2005085222 A1 | 9/2005 |

OTHER PUBLICATIONS

PCT/EP2008/07089, search report Oct. 30, 2008.

*Primary Examiner* — Shean Wu
(74) *Attorney, Agent, or Firm* — Millen, White, Zelano & Branigan, P.C.

(57) ABSTRACT

The invention relates to novel mesogenic dimeric compounds which are especially suitable for use in birefringent films with negative optical dispersion, to novel liquid crystal (LC) formulations and polymer films comprising them, and to the use of the dimers, formulations and films in optical, electrooptical, electronic, semiconducting or luminescent components or devices.

25 Claims, 4 Drawing Sheets

U.S. PATENT DOCUMENTS

| | | |
|---|---|---|
| 6,139,771 A | 10/2000 | Walba et al. |
| 6,171,665 B1 | 1/2001 | Heckmeier et al. |
| 6,203,724 B1 | 3/2001 | Reiffenrath et al. |
| 6,677,003 B2 | 1/2004 | Lussem et al. |
| 7,534,475 B2 * | 5/2009 | Nishikawa et al. .......... 428/1.31 |
| 8,119,026 B2 * | 2/2012 | Parri et al. ................ 252/299.01 |
| 2010/0072422 A1 * | 3/2010 | Parri et al. ................ 252/299.61 |

* cited by examiner

MESOGENIC DIMERS

FIELD OF THE INVENTION

The invention relates to novel mesogenic dimeric compounds which are especially suitable for use in birefringent films with negative optical dispersion, to novel liquid crystal (LC) formulations and polymer films comprising them, and to the use of the dimers, formulations and films in optical, electrooptical, electronic, semiconducting or luminescent components or devices.

BACKGROUND AND PRIOR ART

There is a need for anisotropic optical films that demonstrate negative optical retardation dispersion. For example, a quarter wave film made with negative dispersion birefringent materials will be largely achromatic. Devices such as a reflective LCD that utilises such a quarter wave film will have a dark state that is not coloured. Currently such devices have to use two retarder films to achieve this effect. The dispersive power of such a film can be defined in many ways, however one common way is to measure the optical retardation at 450 nm and divide this by the optical retardation measured at 550 nm ($R_{450}/R_{550}$). If the on-axis retardation of a negative retardation dispersion film at 550 nm is 137.5 nm and the $R_{450}/R_{550}$ value is 0.82, then such a film will be a largely a quarter wave for all wavelengths of visible light and a liquid crystal display device (LCD) using this film as, for example, a circular polarizer would have a substantially black appearance. On the other hand, a film made with an on axis of 137.5 nm which had normal positive dispersion (typically $R_{450}/R_{550}=1.13$) would only be a quarter wave for one wavelength (550 nm), and an LCD device using this film as, for example, a circular polarizer would have a purple appearance. Another way of representing this information is to plot the change in birefringence as a function of wavelength. FIG. 1 shows a typical birefringence against wavelength plot for a polymerized film made from the commercially available reactive mesogen RM257 (Merck KgaA, Darmstadt, Germany). The $R_{450}/R_{550}$ for this compound is around 1.115.

In an anisotropic optical film formed by rod-shaped, optically anisotropic molecules, the origin of the retardation dispersion is due to the fact that the two refractive indices $n_e$, $n_o$, of the anisotropic molecules (wherein $n_e$ is the "extraordinary refractive index" in the direction parallel to the long molecular axis, and $n_o$ is the "ordinary refractive index" in the directions perpendicular to the long molecular axis) are changing with wavelength at different rates, with $n_e$ changing more rapidly than $n_o$ towards the blue end of the visible wavelength spectrum. One way of preparing material with low or negative retardation dispersion is to design molecules with increased $n_o$ dispersion and decreased $n_e$ dispersion. This is schematically shown in FIG. 2. Such an approach has been demonstrated in prior art to give LC's with negative birefringence and positive dispersion as well as compounds with positive birefringence and negative dispersion.

Thus, molecules that can be formed into anisotropic films that demonstrate the property of negative or reverse retardation dispersion have been disclosed in prior art. For example, JP2005-208416 A1 and WO 2006/052001 A1 disclose polymerizable materials based on a "cardo" core group. JP2005-208414 A1 discloses molecules that have covalently bonded discs and rods. JP2005-208415 A1 and JP2002-267838 A1 disclose materials that possess a cross-shape with short high refractive index parts of the molecule crossed with longer lower refractive index parts. WO 2005-085222 A1 discloses molecules that have two lower refractive index parts connected by a higher refractive index bridge part. The bridge is predominantly connected to the rods via a fused five-membered heterocyclic ring. All the above-mentioned documents disclose molecules that not only demonstrate negative dispersion, but also contain at least one polymerizable group and can therefore be polymerized when exposed to either heat or UV irradiation. These materials can be processed either as single materials, or as a mixture to give thin films which under the appropriate conditions can demonstrate uniform anisotropic properties. If photoinitiator is also included in the mixture, the anisotropic properties can be locked in by exposing the film to UV irradiation. This method of preparing optical films is well known.

Another class of materials which is claimed to demonstrate negative birefringence is disclosed in U.S. Pat. No. 6,139,771, which describes compounds generally consisting of two rod-shaped LC parts connected by a acetylenic or bis-acetylenic bridging group. The bridging group is connected to the two rod-shaped parts using a benzene ring. However the document does neither disclose nor suggest polymerizable versions of these compounds.

U.S. Pat. No. 6,203,724 discloses molecules generally consisting of two rod-shaped LC parts connected by highly dispersive bridging groups. The bridging group is connected to the rod-shaped parts via the axial position of a cyclohexane ring. However the document does neither disclose nor suggest to use such compounds for the preparation of optical polymer films having negative optical dispersion.

U.S. Pat. No. 5,567,349 discloses dimers (or H-shaped RM's) wherein the bridging group is connected to the rod shaped part of the molecule via a phenyl ring, however, this document does not report that the molecules demonstrate negative dispersion or negative birefringence.

However, the materials already disclosed in the literature have thermal properties that are not suitable for processing under standard industrial processes, or are not soluble in the solvents commonly used in standard industrial processes or are not compatible with host RM materials commonly used in standard industrial processes, or are too expensive to manufacture.

This invention has the aim of providing improved compounds for use in LC formulations and polymer films having negative dispersion, which do not have the drawbacks of the prior art materials.

Another aim of the invention is to extend the pool of materials and polymer films having negative dispersion that are available to the expert. Other aims are immediately evident to the expert from the following description.

It has been found that these aims can be achieved by providing compounds, materials and films as claimed in the present invention.

SUMMARY OF THE INVENTION

The invention relates to dimers comprising two subunits linked by a spacer group, wherein each subunit comprises
- two mesogenic groups comprising one or more non-aromatic rings,
- optionally one or more polymerisable groups attached to at least one of the mesogenic groups either directly or via spacer groups, and
- a bridging group connecting the mesogenic groups, comprising one or more subgroups selected from pi-conjugated linear carbyl or hydrocarbyl groups, aromatic and heteroaromatic groups, and being linked to a sp³-hybridised C-atom or Si-atom in a non-aromatic ring of each mesogenic group.

The invention further relates to an LC formulation comprising one or more dimers as described above and below.

The invention further relates to a polymerizable LC formulation comprising one or more dimers as described above and below and one or more further compounds, wherein at least one of the compounds is polymerizable.

The invention further relates to a birefringent polymer obtainable by polymerizing a dimer or LC formulation as described above and below, preferably in its LC phase in an oriented state in form of a thin film.

The invention further relates to a birefringent polymer film with $R_{450}/R_{550}<1$, wherein $R_{450}$ is the optical on-axis retardation at a wavelength of 450 nm and $R_{550}$ is the optical on-axis retardation at a wavelength of 550 nm, said film being obtainable by polymerizing one or more dimers or LC formulations as described above and below.

The invention further relates to the use of dimers, LC formulations and polymers as described above and below in optical, electronic and electrooptical components and devices, preferably in optical films, retarders or compensators having negative optical dispersion.

The invention further relates to an optical, electronic or electrooptical component or device, comprising a dimer, LC formulation or or polymer as described above and below.

Said devices and components include, without limitation, electrooptical displays, LCDs, optical films, polarizers, compensators, beam splitters, reflective films, alignment layers, colour filters, holographic elements, hot stamping foils, coloured images, decorative or security markings, LC pigments, adhesives, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electrophotographic recording devices, capacitors, charge injection layers, Schottky diodes, planarising layers, antistatic films, conducting substrates, conducting patterns, photoconductors, electrophotographic applications, electrophotographic recording, organic memory devices, biosensors, biochips, optoelectronic devices requiring similar phase shift at multiple wavelengths, combined CD/DVD/HD-DVD/Blu-Rays, reading, writing re-writing data storage systems, or cameras.

TERMS AND DEFINITIONS

Figure 1:
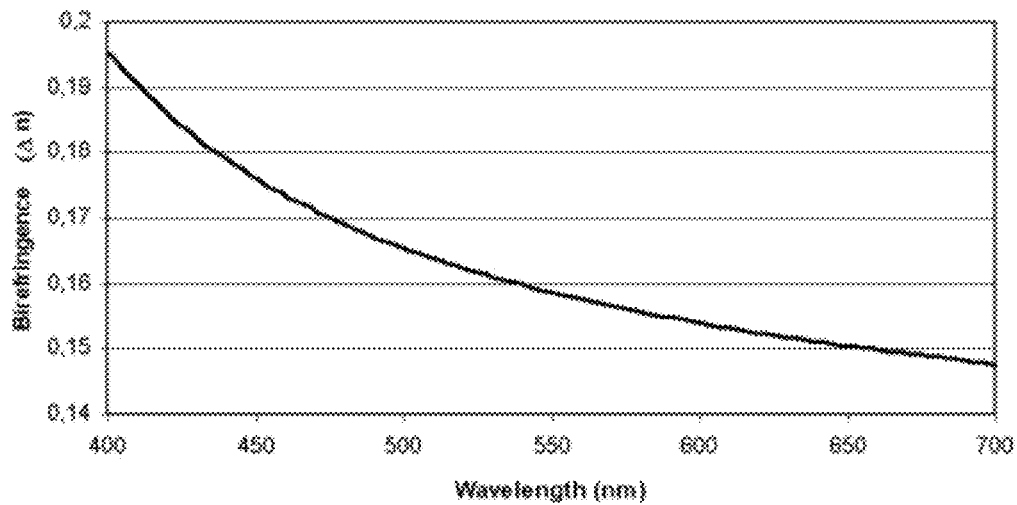
FIG. 1 shows the birefringence versus wavelength plot for a polymerized film made from a reactive mesogen of prior art.
Figure 2:
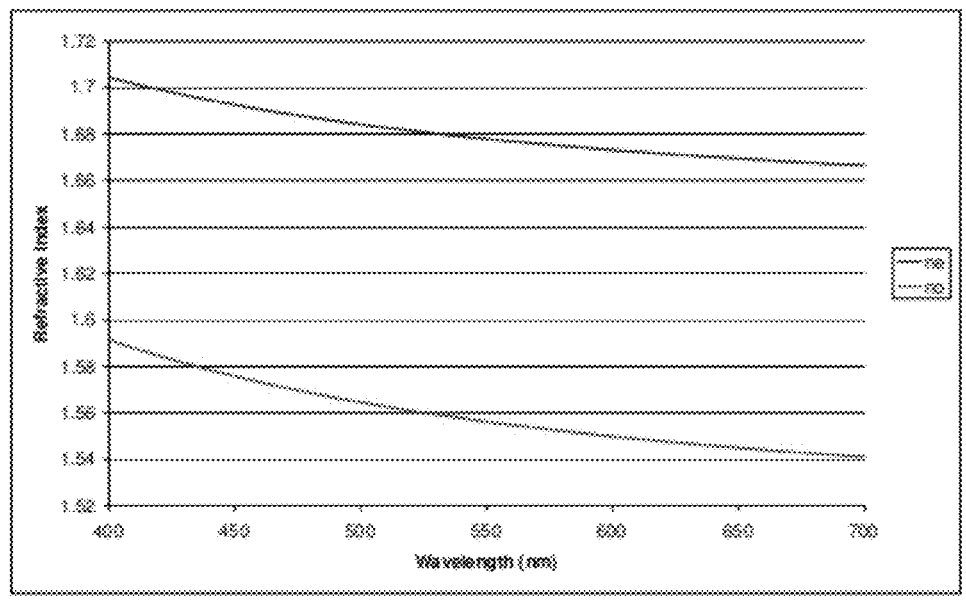
FIG. 2 shows the refractive index versus wavelength plot of a modelled molecule with low or negative retardation dispersion, showing increased $n_o$ dispersion and decreased $n_e$ dispersion.

The term "liquid crystal or mesogenic compound" means a compound comprising one or more calamitic (rod- or board/lath-shaped) or discotic (disk-shaped) mesogenic groups.

The term "calamitic compound" or "calamitic group" means a rod- or board/lath-shaped compound or group.

The term "mesogenic group" means a group with the ability to induce liquid crystal (LC) phase behaviour. The compounds comprising mesogenic groups do not necessarily have to exhibit an LC phase themselves. It is also possible that they show LC phase behaviour only in mixtures with other compounds, or when the mesogenic compounds or the mixtures thereof are polymerized. For the sake of simplicity, the term "liquid crystal" is used hereinafter for both mesogenic and LC materials. For an overview of definitions see Pure Appl. Chem. 73(5), 888 (2001) and C. Tschierske, G. Pelzl and S. Diele, Angew. Chem. 2004, 116, 6340-6368.

The term "spacer" or "spacer group", also referred to as "Sp" below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless stated otherwise, the term "spacer" or "spacer group" above and below denotes a flexible organic group, which in a polymerisable mesogenic compound ("RM") connects the mesogenic group and the polymerisable group(s).

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerizable groups.

The term "reactive mesogen" (RM) means a polymerizable mesogenic or liquid crystal compound.

Polymerizable compounds with one polymerizable group are also referred to as "monoreactive" compounds, compounds with two polymerizable groups as "direactive" compounds, and compounds with more than two polymerizable groups as "multireactive" compounds. Compounds without a polymerizable group are also referred to as "non-reactive" compounds.

The term "film" includes rigid or flexible, self-supporting or free-standing films with mechanical stability, as well as coatings or layers on a supporting substrate or between two substrates.

The term "pi-conjugated" means a group containing mainly C atoms with sp²-hybridisation, or optionally also sp-hybridisation, which may also be replaced by hetero atoms. In the simplest case this is for example a group with alternating C—C single and double bonds, or triple bonds, but does also include groups like 1,3- or 1,4-phenylene. Also included in this meaning are groups like for example aryl amines, aryl phosphines and certain heterocycles (i.e. conjugation via N-, O-, P- or S-atoms).

The term "carbyl group" means any monovalent or multivalent organic radical moiety which comprises at least one carbon atom either without any non-carbon atoms (like for example —C≡C—), or optionally combined with at least one non-carbon atom such as N, O, S, P, Si, Se, As, Te or Ge (for example carbonyl etc.). The term "hydrocarbyl group" denotes a carbyl group that does additionally contain one or more H atoms and optionally contains one or more hetero atoms like for example N, O, S, P, Si, Se, As, Te or Ge. A carbyl or hydrocarbyl group comprising a chain of 3 or more C atoms may also be linear, branched and/or cyclic, including spiro and/or fused rings.

On the molecular level, the birefringence of a liquid crystal depends on the anisotropy of the polarizability ($\Delta\alpha = \alpha_{||} - \alpha\perp$). "Polarizability" means the ease with which the electron distribution in the atom or molecule can be distorted. The polarizability increases with greater number of electrons and a more diffuse electron cloud. The polarizability can be calculated using a method described in eg Jap. J. Appl. Phys. 42, (2003) p 3463.

The "optical retardation" at a given wavelength $R(\lambda)$ (in nm) of a layer of liquid crystalline or birefringent material is defined as the product of birefringence at that wavelength $\Delta n(\lambda)$ and layer thickness d (in nm) according to the equation $$R(\lambda) = \Delta n(\lambda) \cdot d$$

The optical retardation R represents the difference in the optical path lengths in nanometers travelled by S-polarised and P-polarised light whilst passing through the birefringent material. "On-axis" retardation means the retardation at normal incidence to the sample surface.

The term "negative (optical) dispersion" refers to a birefringent or liquid crystalline material or layer that displays reverse birefringence dispersion where the magnitude of the birefringence ($\Delta n$) increases with increasing wavelength ($\lambda$). i.e $|\Delta n(450)| < |\Delta n(550)|$, or $\Delta n(450)/\Delta n(550) < 1$, where $\Delta n(450)$ and $\Delta n(550)$ are the birefringence of the material measured at wavelengths of 450 nm and 550 nm respectively. In contrast, positive (optical) dispersion" means a material or layer having $|\Delta n(450)| > |\Delta n(550)|$ or $\Delta n(450)/\Delta n(550) > 1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Figure 4A:
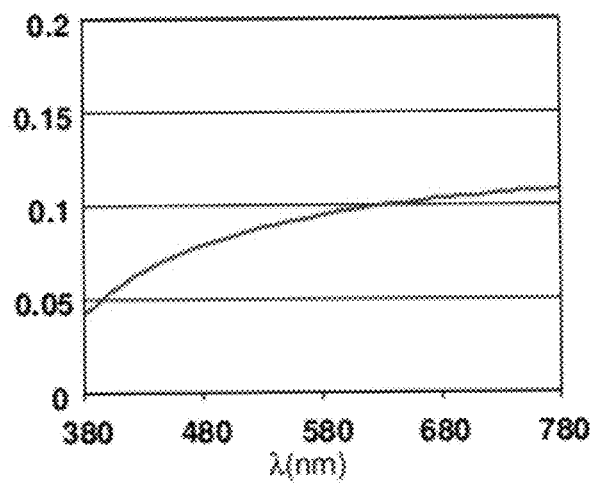
FIG. 4a and FIG. 4b show the birefringence versus wavelength plot for a compound with negative optical dispersion (4a) and positive optical dispersion (4b), respectively.

This is shown schematically in FIG. 4a.

Since the optical retardation at a given wavelength is defined as the product of birefringence and layer thickness as described above [$R(\lambda) = \Delta n(\lambda) \cdot d$], the optical dispersion can be expressed either as the "birefringence dispersion" by the ratio $\Delta n(450)/\Delta n(550)$, or as "retardation dispersion" by the ratio $R(450)/R(550)$, wherein $R(450)$ and $R(550)$ are the retardation of the material measured at wavelengths of 450 nm and 550 nm respectively. Since the layer thickness d does not change with the wavelength, $R(450)/R(550)$ is equal to $\Delta n(450)/\Delta n(550)$. Thus, a material or layer with negative or reverse dispersion has $R(450)/R(550) < 1$ or $|R(450)| < |R(550)|$, and a material or layer with positive or normal dispersion has $R(450)/R(550) > 1$ or $|R(450)| > |R(550)|$.

In the present invention, unless stated otherwise "optical dispersion" means the retardation dispersion i.e. the ratio $(R(450)/R(550))$.

The retardation ($R(\lambda)$) of a material can be measured using a spectroscopic ellipsometer, for example the M2000 spectroscopic ellipsometer manufactured by J. A. Woollam Co., This instrument is capable of measuring the optical retardance in nanometers of a birefringent sample e.g. Quartz over a range of wavelengths typically, 370 nm to 2000 nm. From this data it is possible to calculate the dispersion ($R(450)/R(550)$ or $\Delta n(450)/\Delta n(550)$) of a material.

A method for carrying out these measurements was presented at the National Physics Laboratory (London, UK) by N. Singh in October 2006 and entitled "Spectroscopic Ellipsometry, Part 1—Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, Nebr., USA). Unless stated otherwise, this method is used to determine the retardation of the materials, films and devices described in this invention.

DETAILED DESCRIPTION OF THE INVENTION

Preferably the birefringent polymer film according to the present invention is prepared by polymerizing an LC formulation comprising one or more dimers having the structural features as described above and below, hereinafter referred to as "guest component" or "guest compound", and further comprising an LC material, which may be a single compound or a mixture of compounds, hereinafter referred to as "host component" or "host mixture", preferably a polymerizable LC host mixture having a nematic phase. The terms "guest" and "host" do not exclude the possibility that the amount of the guest component in the final LC mixture is >50% by weight, and the amount of the host component in the final LC mixture is <50% by weight.

The birefringent polymer film preferably has positive birefringence and negative (or "reverse") dispersion.

The host component preferably has positive birefringence and positive (or "normal") dispersion.

The guest component preferably has
(1) Negative birefringence at 550 nm and normal (positive) birefringence dispersion (e.g. negative calamitic compound) or
(2) Positive birefringence at 550 nm and reverse (negative) birefringence dispersion. In this case $\Delta n(450)/\Delta n(550)$ can be negative if the guest component has a negative birefringence at 450 nm.

In the dimers, the mesogenic groups are preferably calamitic groups, very preferably rod-shaped groups.

In the dimers, the mesogenic groups preferably comprise one or more groups selected from aromatic or heteroaromatic rings, and non-aromatic, e.g. fully or partially saturated, carbocyclic or heterocyclic groups, said groups being linked to each other either directly or via linkage groups.

Preferably the mesogenic groups are selected such that they exhibit a low polarizability. This can be achieved e.g. by using mesogenic groups that are preferably comprising mainly non-aromatic, most preferably fully saturated, carbocyclic or heterocyclic groups which are connected directly or via linkage groups, wherein "mainly" means that each mesogenic group comprises more saturated rings than unsaturated or aromatic rings, and very preferably does not comprise more than one unsaturated or aromatic ring.

The bridging group does preferably exhibit a high polarizability and is preferably consisting mainly, very preferably exclusively, of subgroups selected from pi-conjugated linear groups, aromatic and heteroaromatic groups.

Preferably the bridging group consists, very preferably exclusively, of one or more subgroups selected from groups having a bonding angle of 120° or more, preferably in the range of 180°. Suitable and preferred subgroups include, without limitation, groups comprising sp-hybridised C-atoms, like —C≡C—, or divalent aromatic groups connected to their neighboured groups in para-position, like e.g. 1,4-phenylene, naphthalene-2,6-diyl, indane-2,6-diyl or thieno[3,2-b]thiophene-2,5-diyl.

Preferably the bridging group is connected to an $sp^3$-hybridised C-atom or Si-atom located in a non-aromatic ring of the mesogenic group. Very preferably the bridging group is connected in axial position to a cyclohexylene or silanane ring comprised in the mesogenic group, which is optionally substituted and wherein one or more non-adjacent C-atoms are optionally replaced by Si and/or one or more non-adjacent $CH_2$ groups are optionally replaced by —O— and/or —S—.

Figure 3:
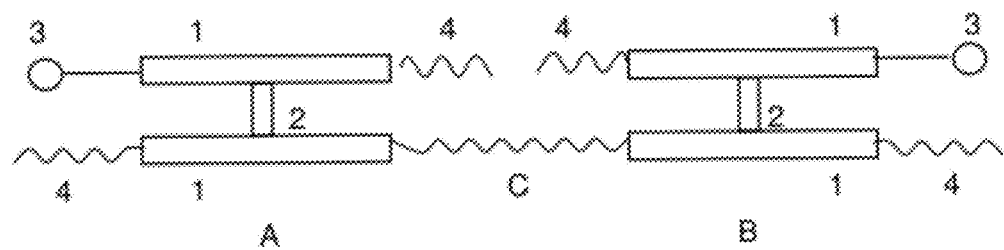
FIG. 3 schematically depicts a dimer according to the present invention.

FIG. 3 schematically illustrates the structure of a dimeric compound according to the present invention, without limiting its scope. Therein A and B are the two subunits linked by the spacer group C. Each subunit A comprises mesogenic calamitic groups 1, a bridging group 2, polymerisable groups 3 attached to the mesogenic groups 1 via spacers, and non-polymerisable terminal groups 4, like carbyl or hydrocarbyl.

The guest compounds according to the present invention are not limited to the structures shown in FIG. 3. For example, the compounds may also comprise polymerisable groups in other positions than those shown in FIG. 3 or in addition to those shown in FIG. 3a, e.g. at the end of the terminal groups 4. The polymerisable groups may also be attached directly to the mesogenic groups without spacer groups. The polymerisable groups 3 and/or the terminal groups 4 may also be omitted.

Since the bridging group is a linear group consisting of subgroups having bonding angles of approx. 180°, and is linked to the mesogenic groups via an sp$^3$-hybridised C-atom or Si-atom (i.e. with a bonding angle of approx. 109°), the compounds of the present invention have an H-shaped or L-shaped structure, wherein the mesogenic groups are substantially parallel to each other and substantially perpendicular to the bridging group, as illustrated in FIG. 3.

Figure 4B:
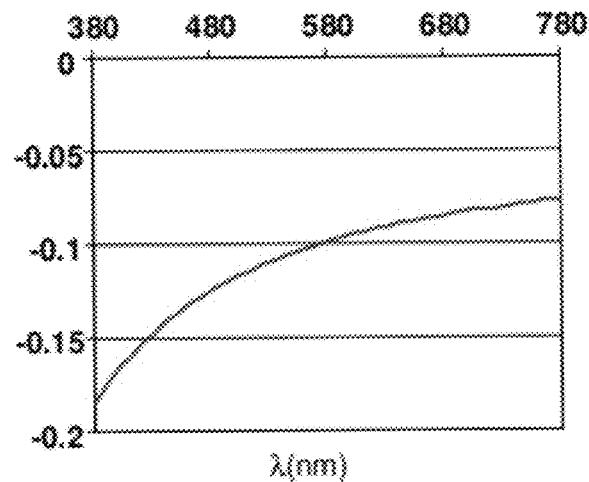

In addition, the bridging group, which essentially consists of subgroups with pi-conjugation, has a high polarizability and a high refractive index, whereas the mesogenic groups, which essentially consist of non-aromatic rings, have a low polarizability and a low refractive index. As a result, the compounds show, depending on their exact structure, either positive birefringence and negative dispersion, as schematically depicted in FIG. 4a, or negative birefringence with positive dispersion, as schematically depicted in FIG. 4b.

As a reference normal calamitic materials have positive birefringence and positive dispersion. It is desirable to have materials where the magnitude of Δn decreases at shorter wavelength, and compounds with both positive dispersion and negative birefringence can be mixed with a host material to give a mixture which possesses a range of dispersion (depending on the concentration of the dopant and host) varying from positive birefringence with positive dispersion through to positive birefringence with negative dispersion.

Preferably the dimers are selected of formula I

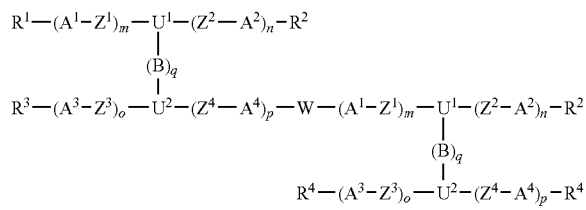

wherein
W is a spacer group,
$U^{1,2}$ are independently of each other selected from

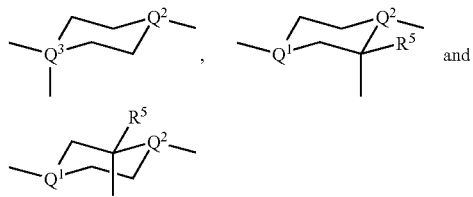

including their mirror images, wherein the rings $U^1$ and $U^2$ are each bonded to the group —(B)$_q$— via the axial bond, and one or two non-adjacent $CH_2$ groups in these rings are optionally replaced by O and/or S, and the rings $U^1$ and $U^2$ are optionally substituted by one or more groups L, $Q^{1,2}$ are independently of each other CH or SiH,
$Q^3$ is C or Si,
B is in each occurrence independently of one another —C≡C—, —CY$^1$=CY$^2$— or an optionally substituted aromatic or heteroaromatic group,
$Y^{1,2}$ are independently of each other H, F, Cl, CN or R$^0$,
q is an integer from 1 to 10, preferably 1, 2, 3, 4, 5 or 6,
$A^{1-4}$ are independently of each other selected from non-aromatic, aromatic or heteroaromatic carbocylic or heterocyclic groups, which are optionally substituted by one or more groups R$^5$, and wherein each of -($A^1$-$Z^1$)$_m$—$U^1$—($Z^2$-$A^2$)$_n$- and -($A^3$-$Z^3$)$_o$—$U^2$—($Z^4$-$A^4$)$_p$- does not contain more aromatic groups than non-aromatic groups and preferably does not contain more than one aromatic group,
$Z^{1-4}$ are independently of each other other identical or different groups selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond,
R$^0$ and R$^{00}$ are independently of each other H or alkyl with 1 to 12 C-atoms,
m, n, o and p are independently of each other 0, 1, 2, 3 or 4,
$R^{1-5}$ are independently of each other identical or different groups selected from H, halogen, —CN, —NC, —NCO, —NCS, —OCN, —SCN, —C(=O)NR$^0$R$^{00}$, —C(=O)X$^0$, —C(=O)R$^0$, —NH$_2$, —NR$^0$R$^{00}$, —SH, —SR$^0$, —SO$_3$H, —SO$_2$R$^0$, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group $R^{1-5}$ denoting or being substituted by P or P-Sp-,
P is a polymerizable group,
Sp is a spacer group or a single bond.

The subgroups forming the bridging group, like B in formula I, are preferably selected from groups having a bonding angle of 120° or more, preferably in the range of 180°. Very preferred are —C≡C— groups or divalent aromatic groups connected to their adjacent groups in para-position, like e.g.

1,4-phenylene, naphthalene-2,6-diyl, indane-2,6-diyl or thieno[3,2-b]thiophene-2,5-diyl.

Further possible subgroups include —CH=CH—, —CY$^1$=CY$^2$—, —CH=N—, —N=CH—, —N=N— and —CH=CR$^0$— wherein Y$^1$, Y$^2$, R$^0$ have the meanings given above.

Preferably the bridging group, like —(B)$_q$— in formula I, comprises one or more groups selected from the group consisting of —C≡C—, optionally substituted 1,4-phenylene and optionally substituted 9H-fluorene-2,7-diyl. The subgroups, or B in formula I, are preferably selected from the group consisting of —C≡C—, optionally substituted 1,4-phenylene and optionally substituted 9H-fluorene-2,7-diyl, wherein in the fluorene group the H-atom in 9-position is optionally replaced by a carbyl or hydrocarbyl group.

Very preferably the bridging group, or —(B)$_q$— in formula I, are selected from —C≡C—, —C≡C—C≡C—, —C≡C—C≡C—C≡C—, —C≡C—C≡C—C≡C—C≡C—,

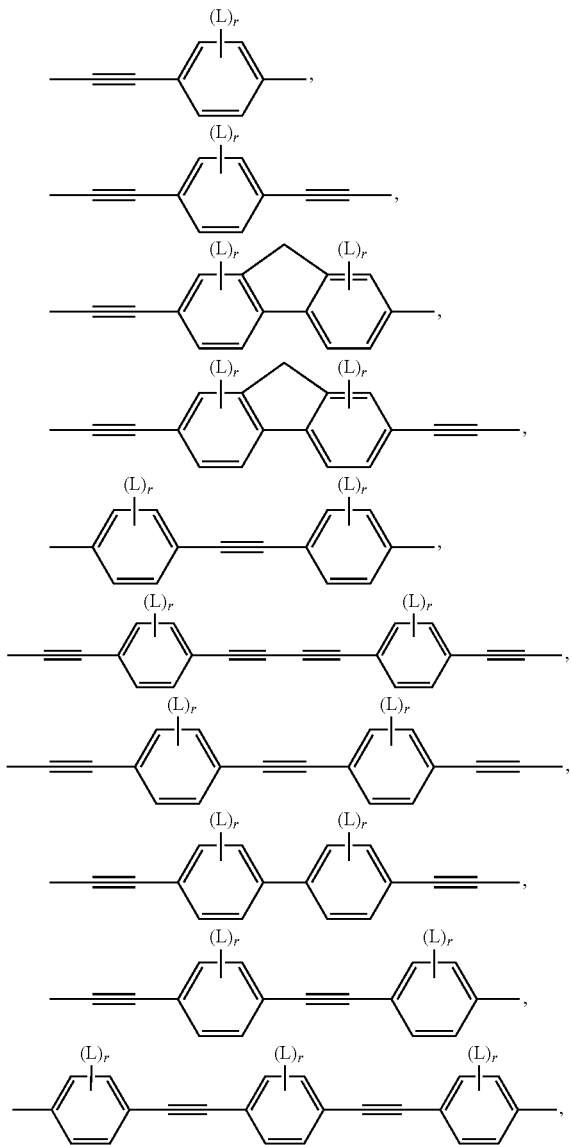

wherein r is 0, 1, 2, 3 or 4 and L has the meaning as described below.

The non-aromatic rings of the mesogenic groups where the bridging group is attached, like U$^1$ and U$^2$ in formula I, are preferably selected from

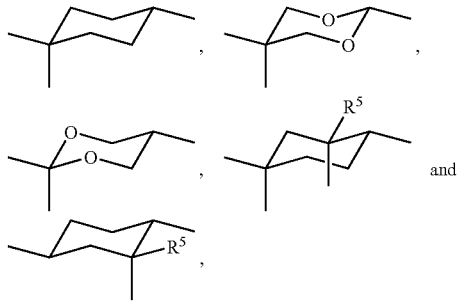

wherein R$^5$ is as defined in formula I.

The aromatic groups, like A$^{1-4}$ in formula I, may be mononuclear, i.e. having only one aromatic ring (like for example phenyl or phenylene), or polynuclear, i.e. having two or more fused rings (like for example napthyl or naphthylene). Especially preferred are mono-, bi- or tricyclic aromatic or heteroaromatic groups with up to 25 C atoms that may also comprise fused rings and are optionally substituted.

Preferred aromatic groups include, without limitation, benzene, biphenylene, triphenylene, [1,1':3',1"]terphenyl-2'-ylene, naphthalene, anthracene, binaphthylene, phenanthrene, pyrene, dihydropyrene, chrysene, perylene, tetracene, pentacene, benzpyrene, fluorene, indene, indenofluorene, spirobifluorene, etc.

Preferred heteroaromatic groups include, without limitation, 5-membered rings like pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings like pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, and fused systems like carbazole, indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, dithienopyridine, isobenzothiophene, dibenzothiophene, benzothiadiazothiophene, or combinations thereof.

The non-aromatic carbocyclic and heterocyclic groups, like A$^{1-4}$ in formula I, include those which are saturated (also referred to as "fully saturated"), i.e. they do only contain C-atoms or hetero atoms connected by single bonds, and those which are unsaturated (also referred to as "partially saturated"), i.e. they also comprise C-atoms or hetero atoms connected by double bonds. The non-aromatic rings may also comprise one or more hetero atoms, preferably selected from Si, O, N and S.

The non-aromatic carbocyclic and heterocyclic groups may be mononuclear, i.e. having only one ring (like for example cyclohexane), or polynuclear, i.e. having two or more fused rings (like for example decahydronaphthalene or bicyclooctane). Especially preferred are fully saturated groups. Further preferred are mono-, bi- or tricyclic non-aromatic groups with up to 25 C atoms that optionally comprise fused rings and are optionally substituted. Very preferred are 5-, 6-, 7- or 8-membered carbocyclic rings wherein one or more C-atoms are optionally replaced by Si and/or one or more CH groups are optionally replaced by N and/or one or more non-adjacent CH$_2$ groups are optionally replaced by —O— and/or —S—, all of which are optionally substituted.

Preferred non-aromatic groups include, without limitation, 5-membered rings like cyclopentane, tetrahydrofuran, tetrahydrothiofuran, pyrrolidine, 6-membered rings like cyclohexane, silinane, cyclohexene, tetrahydropyran, tetrahydrothiopyran, 1,3-dioxane, 1,3-dithiane, piperidine, 7-membered rings like cycloheptane, and fused systems like tetrahydronaphthalene, decahydronaphthalene, indane, bicyclo[1.1.1]pentane-1,3-diyl, bicyclo[2.2.2]octane-1,4-diyl, spiro[3.3]heptane-2,6-diyl, octahydro-4,7-methano-indan-2,5-diyl, or combinations thereof.

Preferably the non-aromatic and aromatic rings, or $A^{1-4}$ in formula I, are selected from trans-1,4-cyclohexylene and 1,4-phenylene that is optionally substituted with one or more groups L.

Very preferably the mesogenic groups comprise not more than one, most preferably no aromatic ring.

Very preferred are compounds of formula I wherein m and p are 1 and n and o are 1 or 2. Further preferred are compounds of formula I wherein m and p are 1 or 2 and n and o are 0. Further preferred are compounds wherein m, n, o and p are 2.

The linkage groups connecting the aromatic and non-aromatic cyclic groups in the mesogenic groups, like $Z^{1-4}$ in formula I, are preferably selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond, very preferably from —COO—, —OCO— and a single bond.

The substituents on the rings, like L in formula I, are preferably selected from P-Sp-, F, Cl, Br, I, —CN, —NO$_2$, —NCO, —NCS, —OCN, —SCN, —C(=O)NR$^0$R$^{00}$, —O(=O)X, —O(=O)OR$^0$, —O(=O)R$^0$, —NR$^0$R$^{00}$, —OH, —SF$_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein R$^0$ and R$^{00}$ are as defined in formula I and X is halogen.

Preferred substituents are selected from F, Cl, CN, NO$_2$ or straight chain or branched alkyl, alkoxy, alkylcarbonyl, alkoxycarbonyl, alkylcarbonlyoxy or alkoxycarbonyloxy with 1 to 12 C atoms, wherein the alkyl groups are optionally perfluorinated, or P-Sp-.

Very preferred substituents are selected from F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, in particular F, Cl, ON, CH$_3$, C$_2$H$_5$, C(CH$_3$)$_3$, CH(CH$_3$)$_2$, OCH$_3$, COCH$_3$ or OCF$_3$, most preferably F, Cl, CH$_3$, C(CH$_3$)$_3$, OCH$_3$ or COCH$_3$, or P-Sp-.

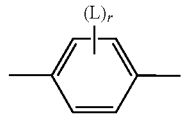

is preferably

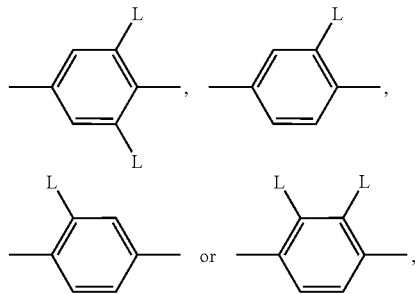

with L having each independently one of the meanings given above.

The carbyl and hydrocarbyl groups, like $R^{1-5}$ in formula I, are preferably selected from straight-chain, branched or cyclic alkyl with 1 to 40, preferably 1 to 25 C-atoms, which is unsubstituted, mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —O—CO—O—, —S—CO—, —CO—S—, —SO$_2$—, —CO—NR$^0$—, —NR$^0$—CO—, —NR$^0$—CO—NR$^{00}$—, —CY$^1$=CY$^2$— or —C≡C— in such a manner that O and/or S atoms are not linked directly to one another, wherein Y$^1$ and Y$^2$ are independently of each other H, F, Cl or CN, and R$^0$ and R$^{00}$ are independently of each other H or an optionally substituted aliphatic or aromatic hydrocarbon with 1 to 20 C atoms.

Very preferably the carbyl and hydrocarbyl groups, and $R^{1-5}$ in formula I, are selected from, C$_1$-C$_{20}$-alkyl, C$_1$-C$_{20}$-oxaalkyl, C$_1$-C$_{20}$-alkoxy, C$_2$-C$_{20}$-alkenyl, C$_2$-C$_{20}$-alkynyl, C$_1$-C$_{20}$-thioalkyl, C$_1$-C$_{20}$-silyl, C$_1$-C$_{20}$-ester, C$_1$-C$_{20}$-amino, C$_1$-C$_{20}$-fluoroalkyl.

An alkyl or alkoxy radical, i.e. where the terminal CH$_2$ group is replaced by —O—, can be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one CH$_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

An alkyl group wherein one or more CH$_2$ groups are replaced by —CH=CH— can be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group wherein one $CH_2$ group is replaced by —O— and one by —CO—, these radicals are preferably neighboured. Accordingly these radicals together form a carbonyloxy group —CO—O— or an oxycarbonyl group —O—CO—. Preferably this group is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxy-ethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxy-carbonylmethyl, propoxycarbonylmethyl, butoxycarbonylmethyl, 2-(methoxycarbonyl) ethyl, 2-(ethoxycarbonyl)ethyl, 2-(propoxy-carbonyl)ethyl, 3-(methoxycarbonyl)propyl, 3-(ethoxycarbonyl)propyl, 4-(methoxycarbonyl)-butyl.

An alkyl group wherein two or more $CH_2$ groups are replaced by —O— and/or —COO— can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5,5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or $CF_3$ is preferably straight-chain. The substitution by CN or $CF_3$ can be in any desired position.

An alkyl or alkenyl group that is at least monosubstituted by halogen is preferably straight-chain. Halogen is preferably F or Cl, in case of multiple substitution preferably F. The resulting groups include also perfluorinated groups. In case of monosubstitution the F or Cl substituent can be in any desired position, but is preferably in ω-position. Examples for especially preferred straight-chain groups with a terminal F substituent are fluoromethyl, 2-fluorethyl, 3-fluorpropyl, 4-fluorbutyl, 5-fluorpentyl, 6-fluorhexyl and 7-fluorheptyl. Other positions of F are, however, not excluded.

$R^0$ and $R^{00}$ are preferably selected from H, straight-chain or branched alkyl with 1 to 12 C atoms.

—$CY^1$=$CY^2$— is preferably —CH=CH—, —CF=CF— or —CH=C(CN)—.

Halogen is F, Cl, Br or I, preferably F or Cl.

$R^{1-5}$ can be an achiral or a chiral group. Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

Preferred achiral branched groups are isopropyl, isobutyl (=methylpropyl), isopentyl (=3-methylbutyl), isopropoxy, 2-methyl-propoxy and 3-methylbutoxy.

The polymerisable group, like P in formula I, is a group that is capable of participating in a polymerisation reaction, like radical or ionic chain polymerisation, polyaddition or polycondensation, or capable of being grafted, for example by condensation or addition, to a polymer backbone in a polymer analogous reaction. Especially preferred are polymerisable groups for chain polymerisation reactions, like radical, cationic or anionic polymerisation. Very preferred are polymerisable groups comprising a C—C double or triple bond, and polymerisable groups capable of polymerisation by a ring-opening reaction, like oxetanes or epoxides.

Suitable and preferred polymerisable groups include, without limitation, $CH_2$=$CW^1$—COO—, $CH_2$=$CW^1$—CO—,

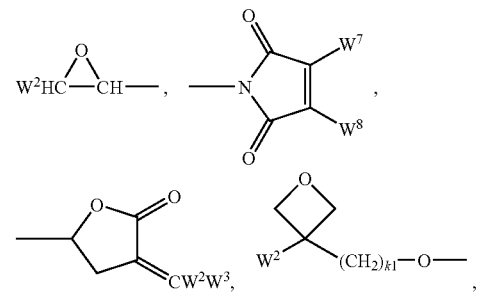

$CH^2$=$CW^2$—(O)$_{k1}$—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, $HW^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN—, and $W^4W^5W^6$Si—, with $W^1$ being H, F, Cl, CN, $CF_3$, phenyl or alkyl with 1 to 5 C-atoms, in particular H, Cl or $CH_3$, $W^2$ and $W^3$ being independently of each other H or alkyl with 1 to 5 C-atoms, in particular H, methyl, ethyl or n-propyl, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted, preferably by one or more groups L as defined above (except for the meaning P-Sp-), and $k_1$ and $k_2$ being independently of each other 0 or 1.

Very preferred polymerisable groups are selected from $CH_2$=$CW^1$—COO—, $CH_2$=$CW^1$—CO—,

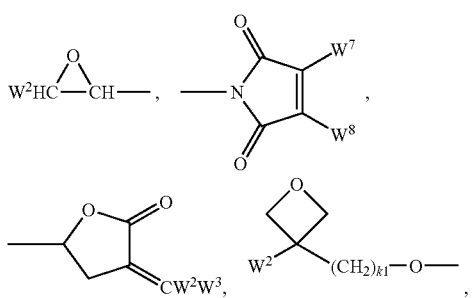

(CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN—, and W$^4$W$^5$W$^6$Si—, with W$^1$ being H, F, Cl, CN, CF$_3$, phenyl or alkyl with 1 to 5 C-atoms, in particular H, F, Cl or CH$_3$, W$^2$ and W$^3$ being independently of each other H or alkyl with 1 to 5 C-atoms, in particular H, methyl, ethyl or n-propyl, W$^4$, W$^5$ and W$^6$ being independently of each other Cl, oxaalkyl or oxacarbonylalkyl with 1 to 5 C-atoms, W$^7$ and W$^8$ being independently of each other H, Cl or alkyl with 1 to 5 C-atoms, Phe being 1,4-phenylene that is optionally substituted preferably by one or more groups L as defined above (except for the meaning P-Sp-), and k$_1$ and k$_2$ being independently of each other 0 or 1.

Most preferred polymerisable groups are selected from CH$_2$=CH—COO—, CH$_2$=C(CH$_3$)—COO—, CH$_2$=CF—COO—, (CH$_2$=CH)$_2$CH—OCO—, (CH$_2$=CH)$_2$CH—O—,

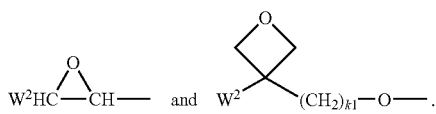

Polymerisation can be carried out according to methods that are known to the ordinary expert and described in the literature, for example in D. J. Broer; G. Challa; G. N. Mol, Macromol. Chem, 1991, 192, 59.

The spacer group linking the two subunits of the dimers, like W in formula I, is preferably selected of formula X'—W'—X'', wherein W' is straight-chain, branched or cyclic alkylene with 1 to 20 C atoms, preferably 1 to 12 C-atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —NR$^0$—CO—O—, —O—CO—NR$^0$—, —NR$^0$—CO—NR$^0$—, —CH=CH— or —C≡C— in such a manner that O and/or S atoms are not linked directly to one another, X' and X'' are independently of each other —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond.

R$^0$ and R$^{00}$ are independently of each other H or alkyl with 1 to 12 C-atoms, and Y$^1$ and Y$^2$ are independently of each other H, F, Cl or CN.

The spacer group attached to the polymerizable group, like Sp in formula I, is preferably selected of formula Sp'-X', such that P-Sp- is P-Sp'-X'—, wherein Sp' has one of the meanings of W' as given above, and X' is as defined above.

X' and X'' are preferably —O—, —S—CO—, —COO—, —OCO—, —O—COO—, —CO—NR$^0$—, —NR$^0$—CO—, —NR$^0$—CO—NR$^0$— or a single bond.

Typical groups W' and Sp' are, for example, —(CH$_2$)$_{p1}$—, —(CH$_2$CH$_2$O)$_{q1}$—CH$_2$CH$_2$—, —CH$_2$CH$_2$—S—CH$_2$CH$_2$— or —CH$_2$CH$_2$—NH—CH$_2$CH$_2$— or —(SiR$^0$R$^{00}$—O)$_{p1}$—, with p1 being an integer from 1 to 20, preferably 2 to 12, q1 being an integer from 1 to 10, preferably 1 to 5, and R$^0$ and R$^{00}$ having the meanings given above.

Preferred groups W' and Sp' are ethylene, propylene, butylene, pentylene, hexylene, heptylene, octylene, nonylene, decylene, undecylene, dodecylene, octadecylene, cyclohexylene, ethyleneoxyethylene, methyleneoxy-butylene, ethylene-thioethylene, ethylene-N-methyl-iminoethylene, 1-methylalkylene, ethenylene, propenylene and butenylene for example. Further preferred are chiral spacer groups, and spacer groups comprising a cycloalkyl group, preferably a cyclohexane group, e.g. 1-alkyl-4-alkyl'-cyclohexane, wherein alkyl and alkyl' are identical or different C$_{1-12}$ alkyl groups.

Further preferred are compounds wherein the polymerisable group is directly attached to the mesogenic group without a spacer group Sp.

In case of compounds with two or more groups P-Sp-, the polymerisable groups P and the spacer groups Sp can be identical or different.

In another preferred embodiment the dimers comprise one or more terminal groups, like R$^{1-4}$, or substituents, like L or R$^5$, that are substituted by two or more polymerisable groups P or P-Sp- (multifunctional polymerisable groups). Suitable multifunctional polymerisable groups of this type are disclosed for example in U.S. Pat. No. 7,060,200 B1 oder US 2006/0172090 A1. Very preferred are compounds comprising one or more multifunctional polymerisable groups selected from the following formulae:

| | |
|---|---|
| —X-alkyl-CHP$^1$—CH$_2$—CH$_2$P$^2$ | P1 |
| —X'-alkyl-C(CH$_2$P$^1$)(CH$_2$P$^2$)—CH$_2$P$^3$ | P2 |
| —X'-alkyl-CHP$^1$CHP$^2$—CH$_2$P$^3$ | P3 |
| —X'-alkyl-C(CH$_2$P$^1$)(CH$_2$P$^2$)—C$_{aa}$H$_{2aa+1}$ | P4 |
| —X'-alkyl-CHP$^1$—CH$_2$P$^2$ | P5 |
| —X'-alkyl-CHP$^1$P$^2$ | P5 |
| —X'-alkyl-CP$^1$P$^2$—C$_{aa}$H$_{2aa+1}$ | P6 |
| —X'-alkyl-C(CH$_2$P$^1$)(CH$_2$P$^2$)—CH$_2$OCH$_2$—C(CH$_2$P$^3$)(CH$_2$P$^4$)CH$_2$P$^5$ | P7 |
| —X'-alkyl-CH((CH$_2$)$_{aa}$P$^1$)((CH$_2$)$_{bb}$P$^2$) | P8 |
| —X-alkyl-CHP$^1$CHP$^2$—C$_{aa}$H$_{2aa+1}$ | P9 | wherein
alkyl is straight-chain or branched alkylene having 1 to 12 C-atoms which is unsubstituted, mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —O—CO—O—, —S—CO—, —CO—S—, —SO$_2$—, —CO—NR$^0$—, —NR$^0$—CO—, —NR$^0$—CO—NR$^{00}$—, —CY$^1$=CY$^2$— or —C≡C— in such a manner that O and/or S atoms are not linked directly to one another, with R$^0$ and R$^{00}$ having the meanings given above, or denotes a single bond, aa and bb are independently of each other 0, 1, 2, 3, 4, 5 or 6, X' is as defined above, and P$^{1-5}$ independently of each other have one of the meanings given for P above.

Very preferred compounds of formula I are those of the following subformulae:

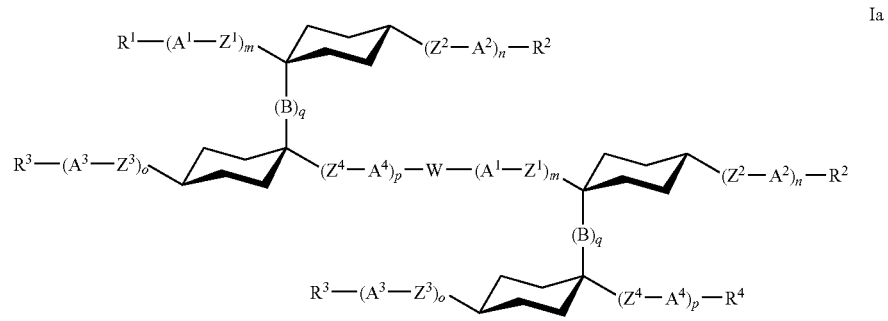

Ia

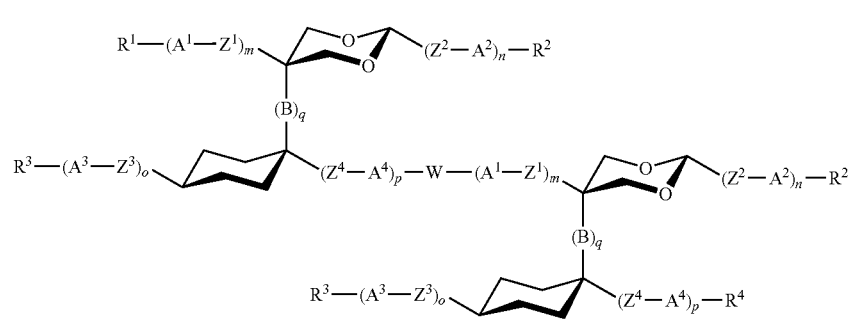

Ib

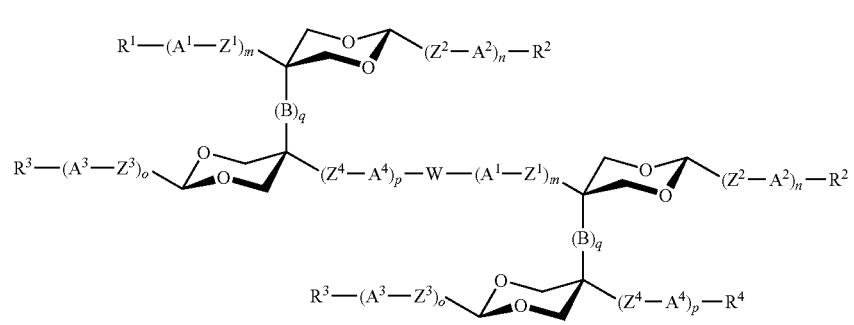

Ic

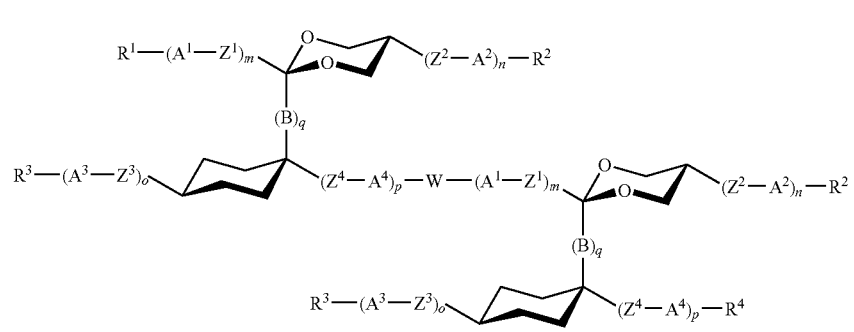

Id

-continued
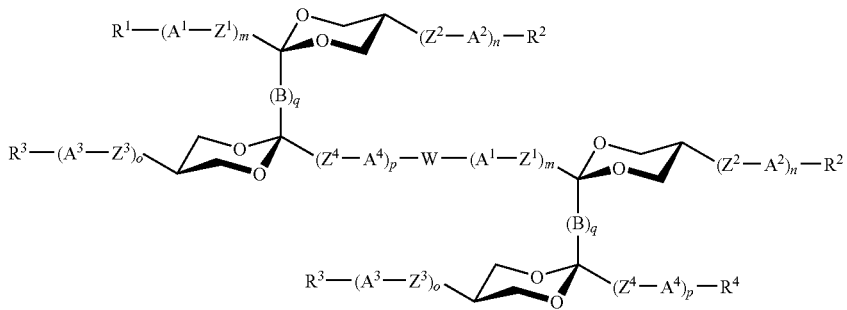
Ie
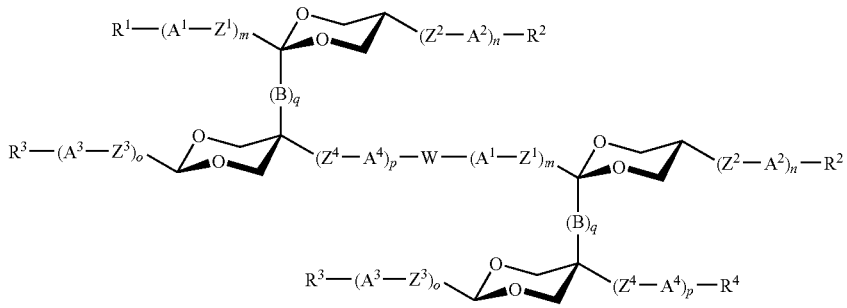
If
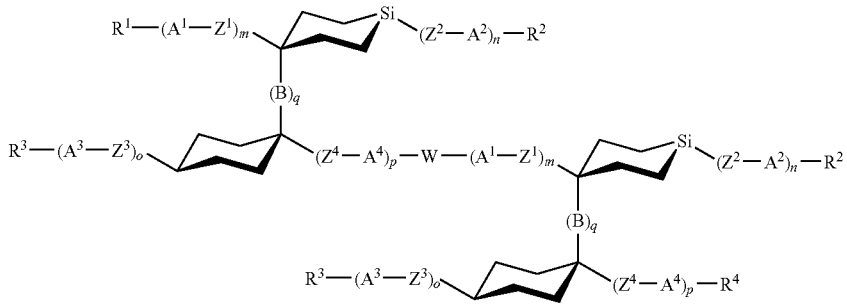
Ig
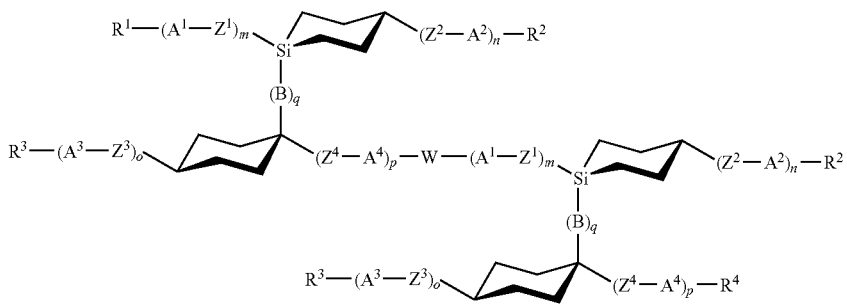
Ih
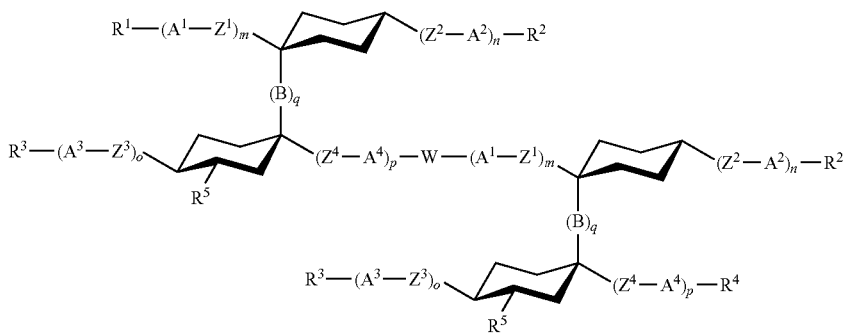
Ii -continued
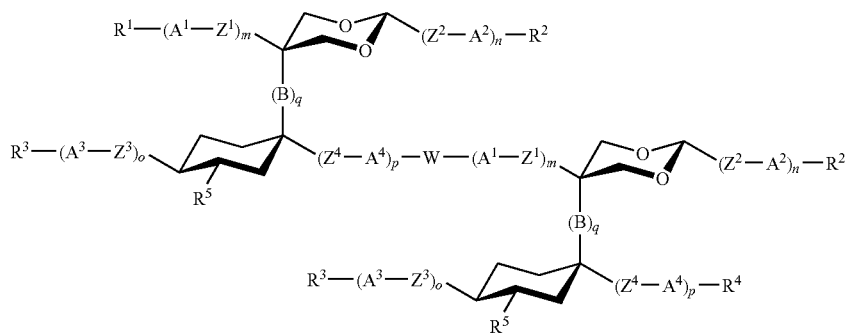
Ik
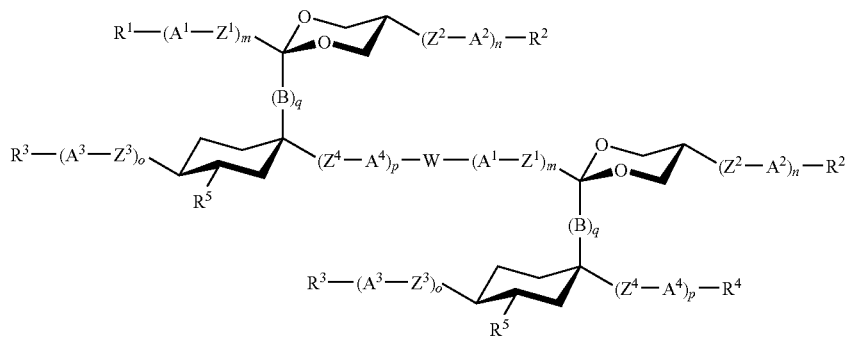
Im
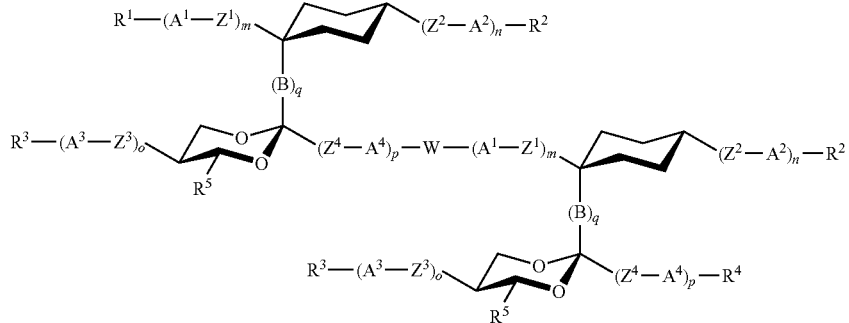
In
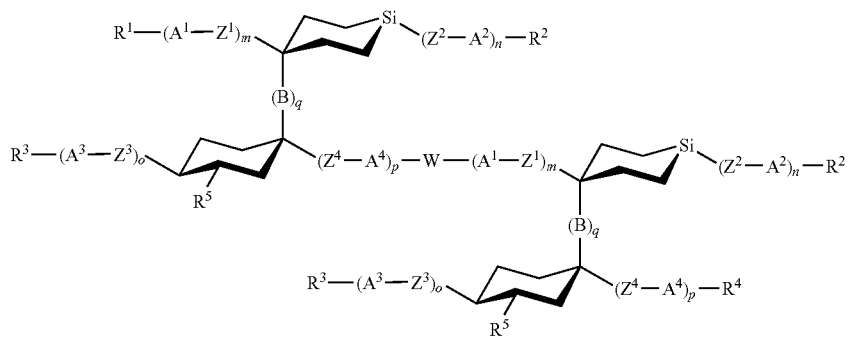
Io

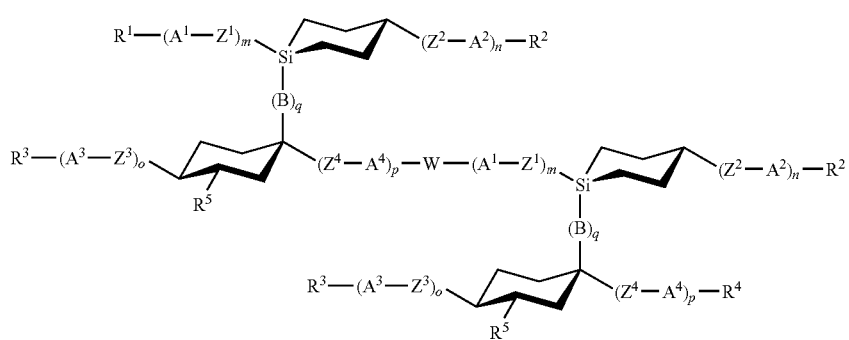
Ip
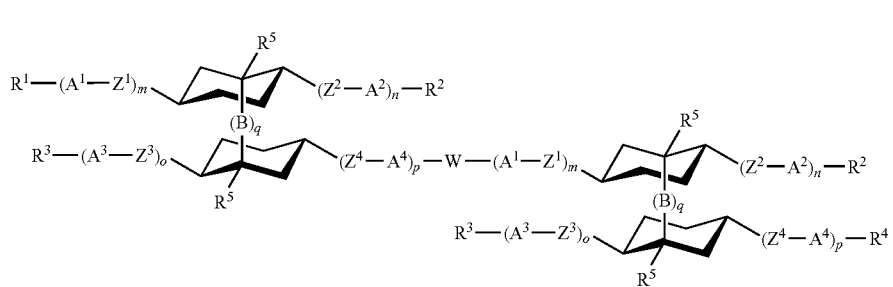
Iq
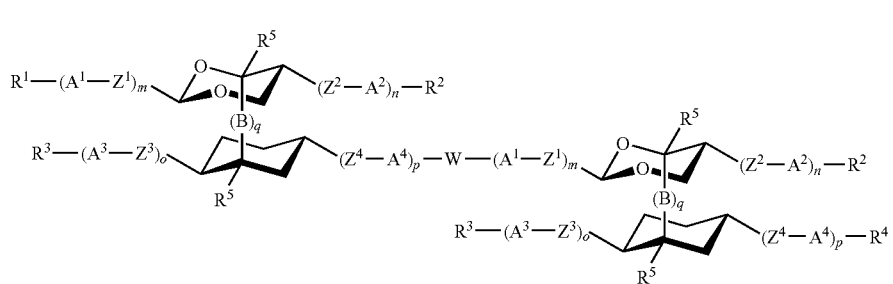
Ir
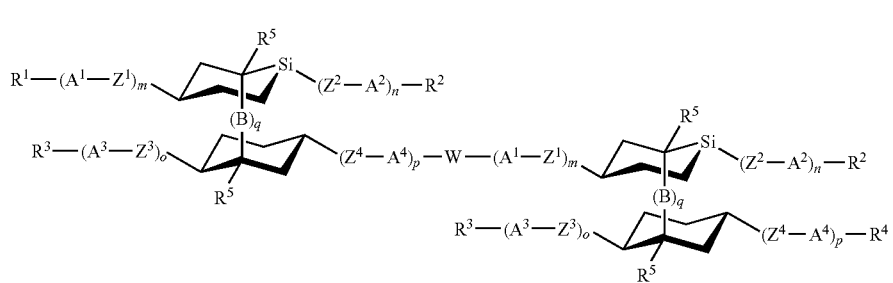
Is
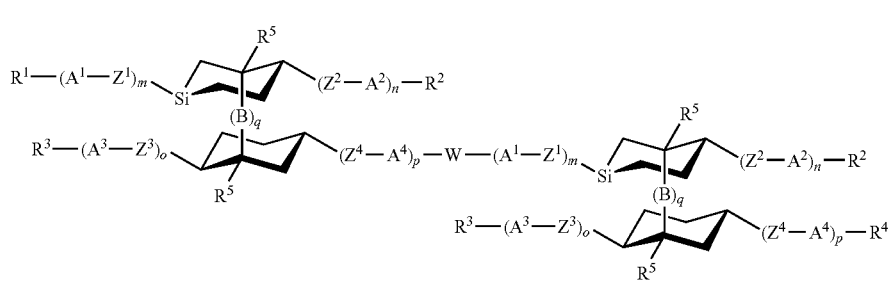
It

-continued
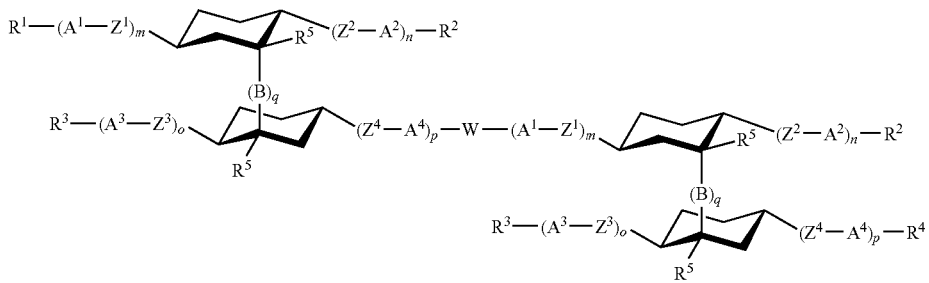
Iu
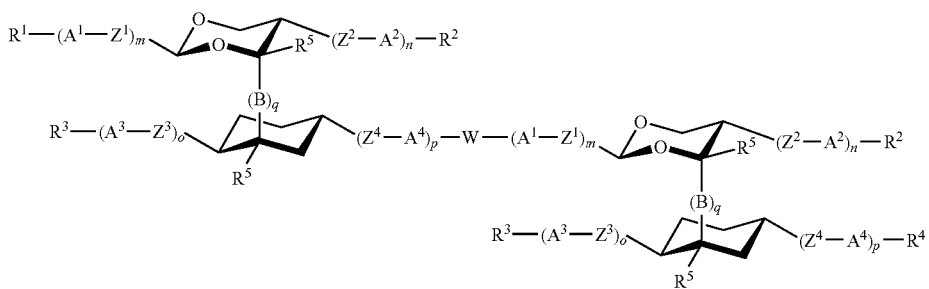
Iv
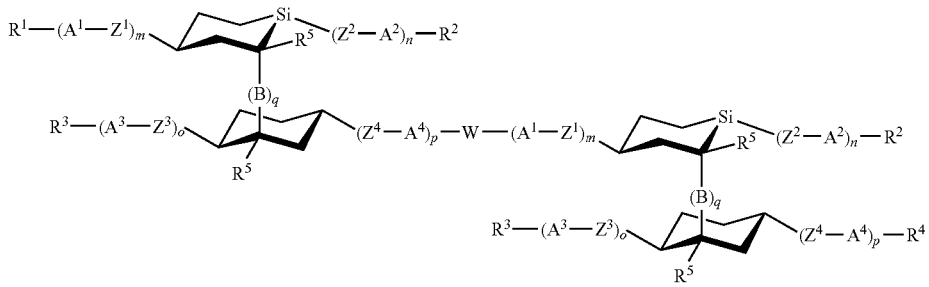
Iw
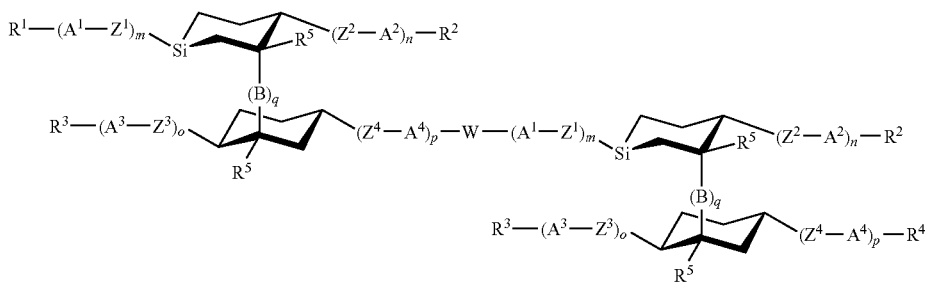
Ix
wherein $R^{1-5}$, $A^{1-4}$, $Z^{1-4}$, B, W, m, n, o, p, q have the meanings given above.

Especially preferred are compounds of the following subformulae:
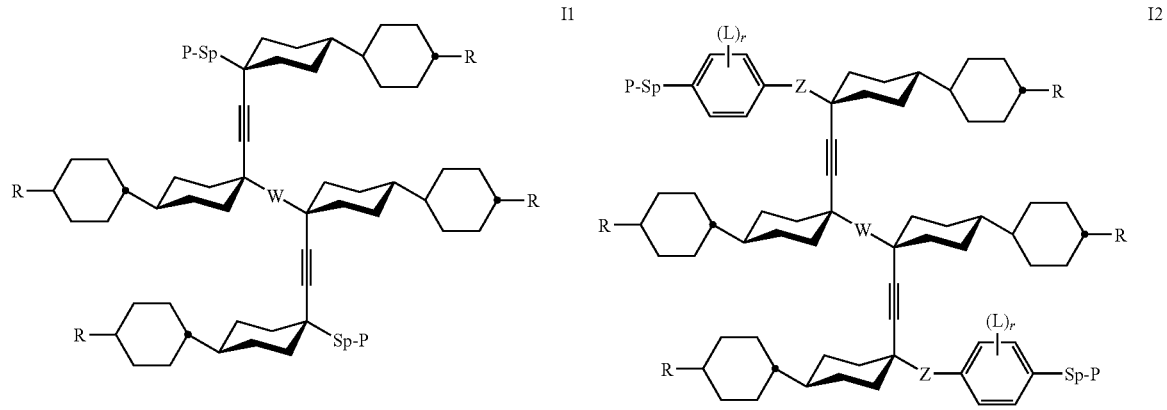
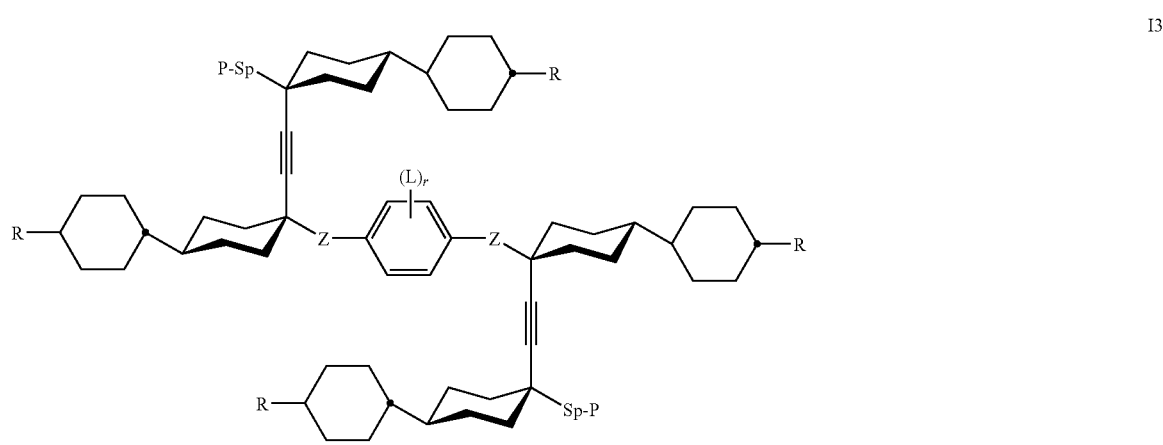
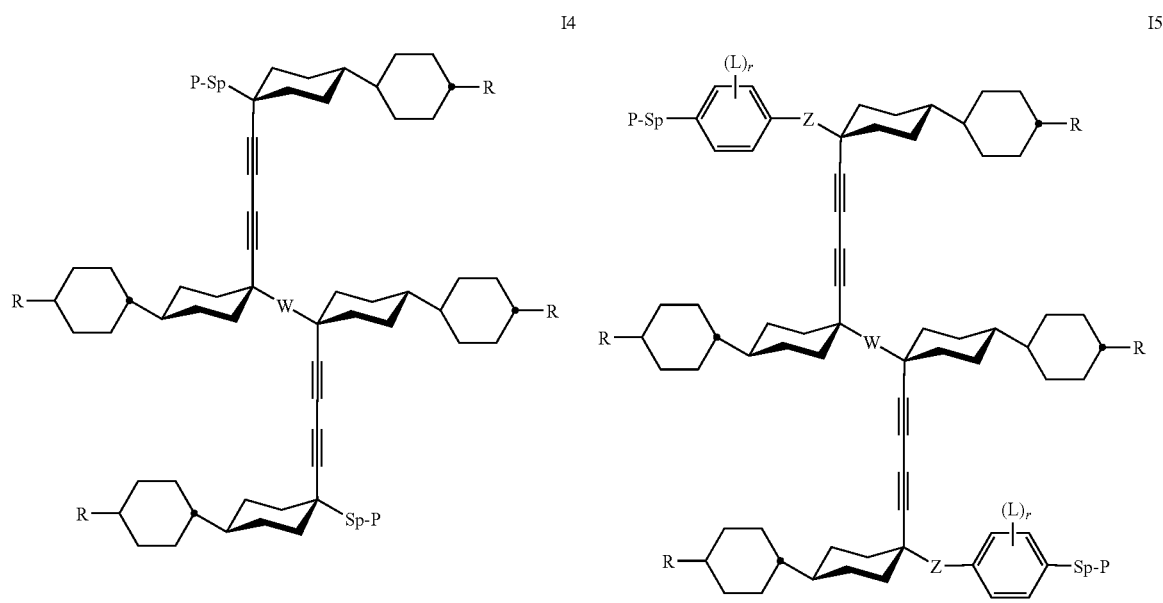

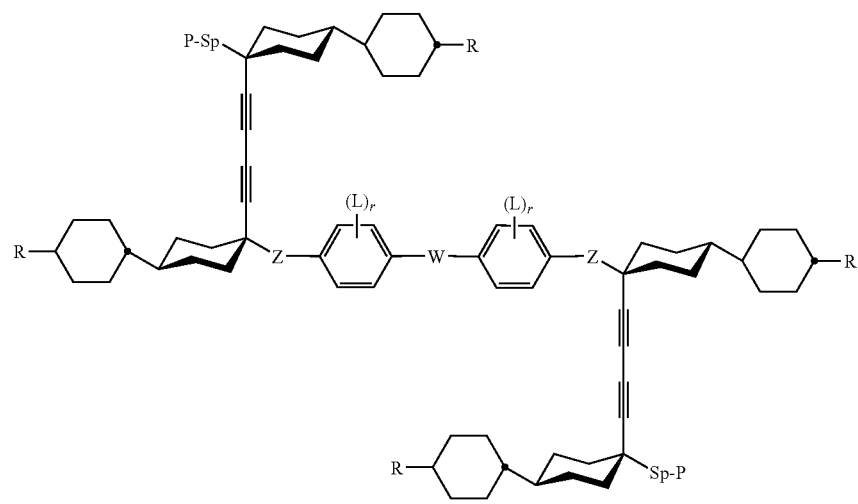
I6
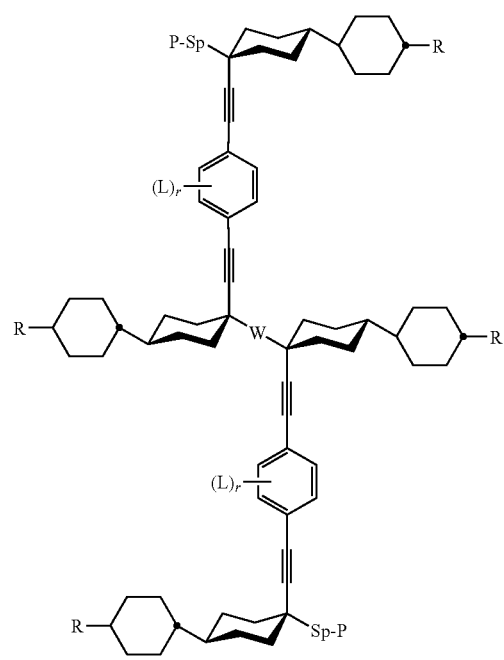
I7

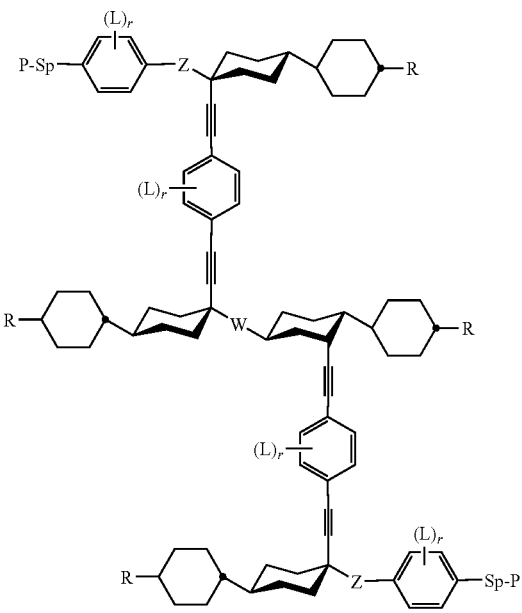

I8

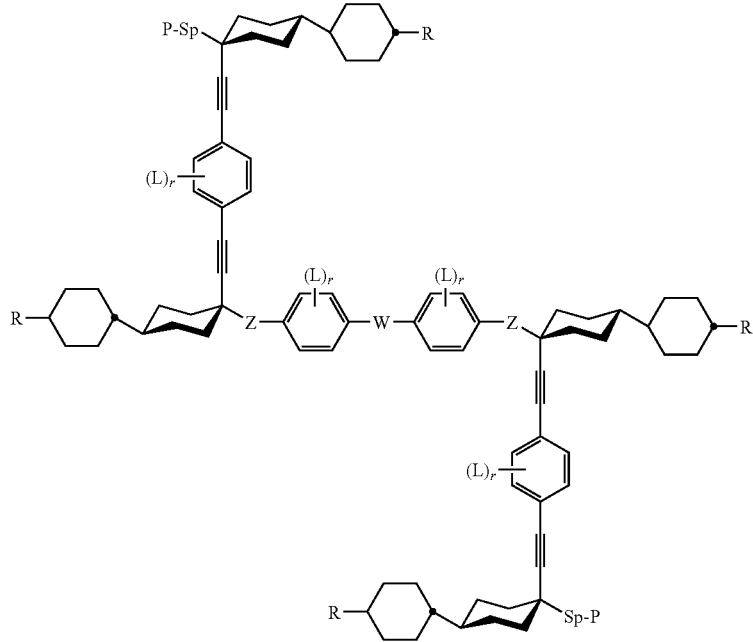

I9 wherein Z has one of the meanings of $Z^1$ given above, R has one of the meanings of $R^1$ as given above that is different from P-Sp-, and P, Sp, L and r are as defined above.

P-Sp- in these preferred compounds is preferably P-Sp'-X, with X' preferably being —O—, —COO— or —OCOO—. Z is preferably —COO—, —OCO— or a single bond.

The compounds of the present invention can be synthesized according to or in analogy to methods which are known per se and which are described in the literature and in standard works of organic chemistry such as, for example, Houben-Weyl, Methoden der organischen Chemie, Thieme-Verlag, Stuttgart. Further suitable and preferred methods of synthesis are exemplarily described below in Schemes 1-3, and in the examples.

The compounds of formula I can be generally synthesized by initially reacting a suitably substituted acetylene, e.g. (tri-methylsilyl)acetylene, with a suitable, optionally substituted cyclohexanone in the presence of butyllithium, as described e.g. in ACS Symposium Series (2001), 798 (Anisotropic Organic Materials), 195-205. After separation of the isomers by chromatography, and removal of the protecting trimethylsilyl group, the resulting compound (like e.g. compound 1.3 in Scheme 1 below) can be reacted via its hydroxy group either with a dihaloalkane and butyllithium to yield a diether compound (like e.g. compound 1.4 in Scheme 1), or with a diacid (like e.g. 1,6-dicarboxyhexane or, 4,4'-[1,6-hexanediylbis(oxy)]bis-benzoic acid) to yield a diester compound (like e.g. compound 4.1 in Scheme 2 below). The diester or diether can be coupled with a dihaloaromatic compound (like e.g. 1-bromo-4-iodobenzene) under Sonogashira conditions to give a compound with two axial phenylacetylene groups (like e.g. compound 1.5 in Scheme 3 below). Further reactions of this compounds with a compound containing an axial acetylene group and a polymerisable group, e.g. an acrylate group (which are prepared as described above, like e.g. "Intermediate 1" in Scheme 1 or compound 1.6 in Scheme 3), under Sonogashira conditions will yield the target dimeric compound with two 1,4-diethynylbenzene bridging groups (like e.g. compound 1.7 in Scheme 3). Substituting other dihaloaromatic groups for 1-bromo-4-iodobenzene in the first Sonogashira reaction will give final dimeric compounds with different bridging groups, e.g. 4-bromo-4'-iodo-1,1'-biphenyl will give a final dimeric compound with two 4,4'-diethynyl-1,1'-biphenyl bridging groups.

A preferred method for making key intermediates (like compound 1.3 and Intermediate 1) for the dimeric compounds is shown in Scheme 1 below, wherein R is $R^1$-$(A^1$-$Z^1)_m$— with $R^1$, $A^1$, $Z^1$ and m being as defined above.

Scheme 1

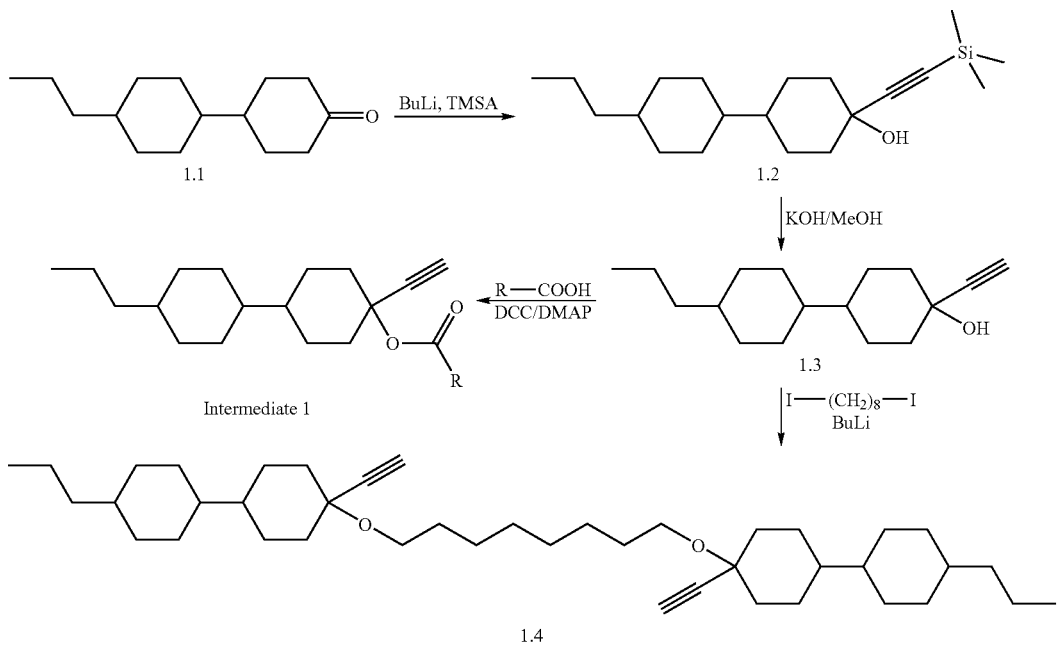

Compound 1.3 is prepared in two steps by reacting the ketone 1.1 with trimethylacetylene in the presence of butyl lithium, and then removing the TMS group using potassium hydroxide. Compound 1.3 is then reacted with a suitable carboxylic acid in the presence of DCC and catalytic amount of DMAP.

Typical examples of Intermediate 1 are shown below:

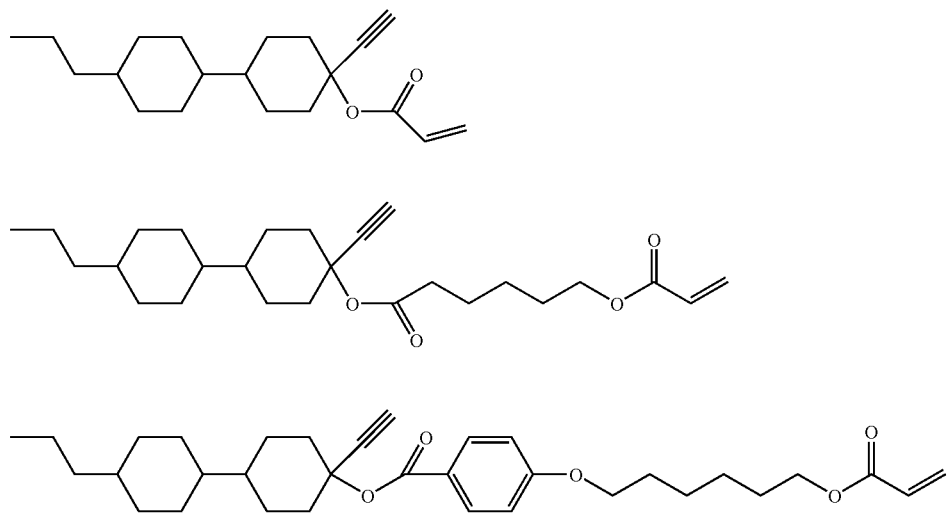

Scheme 2
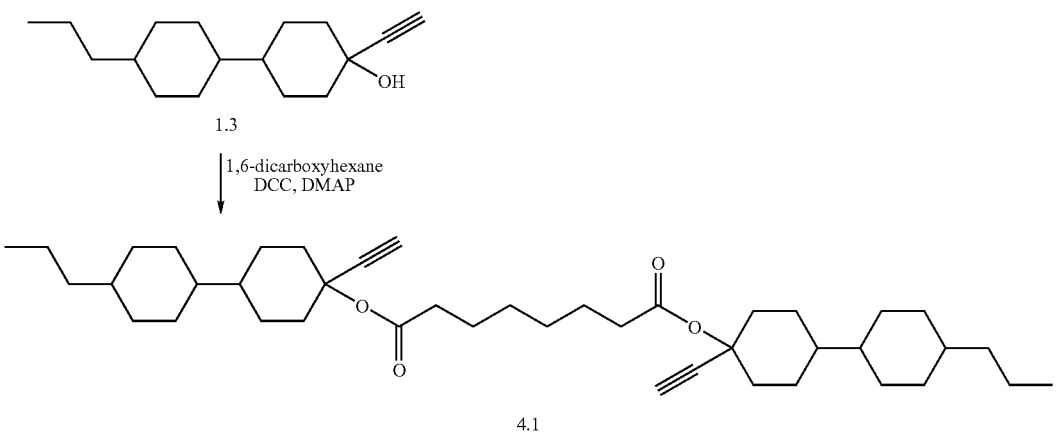
Scheme 3
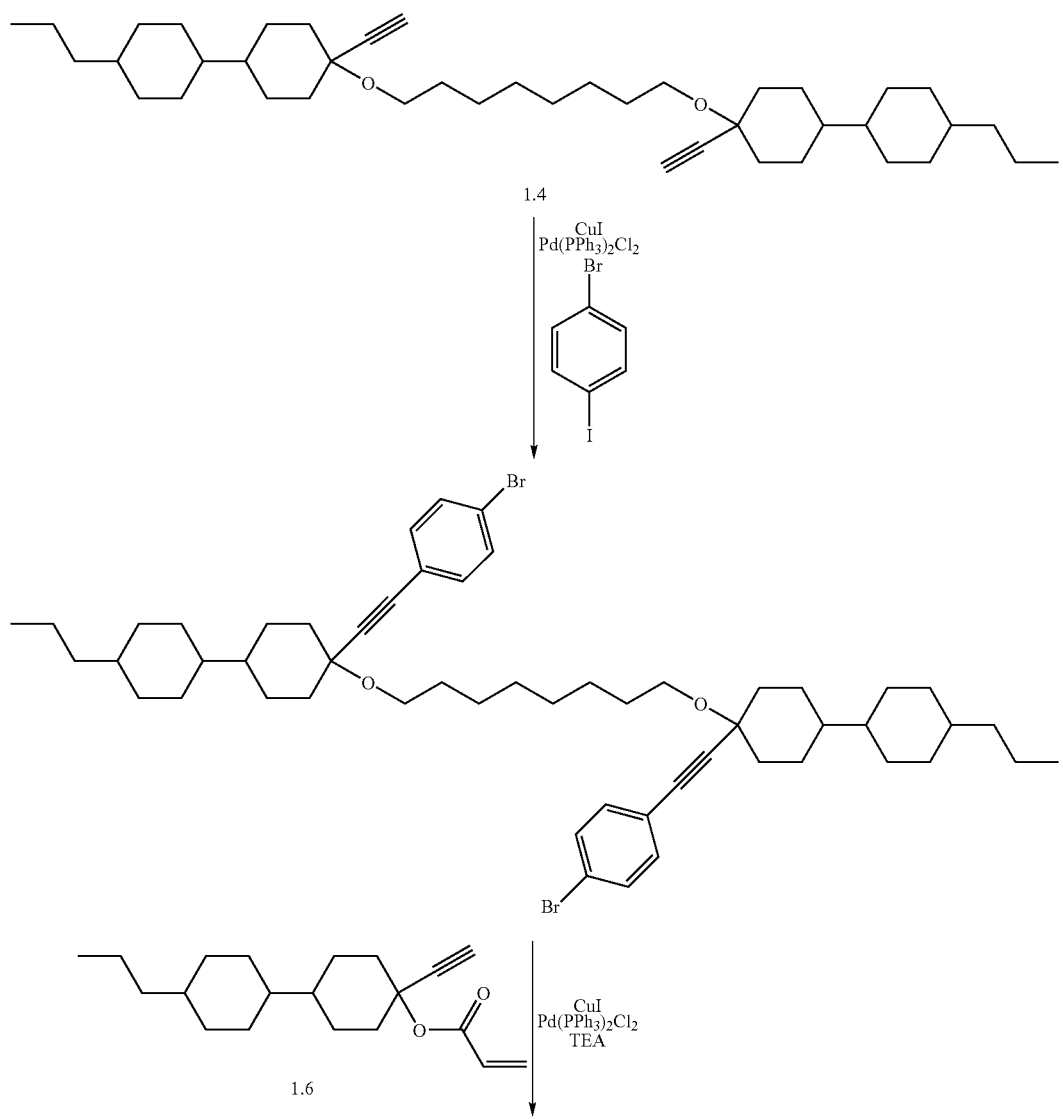

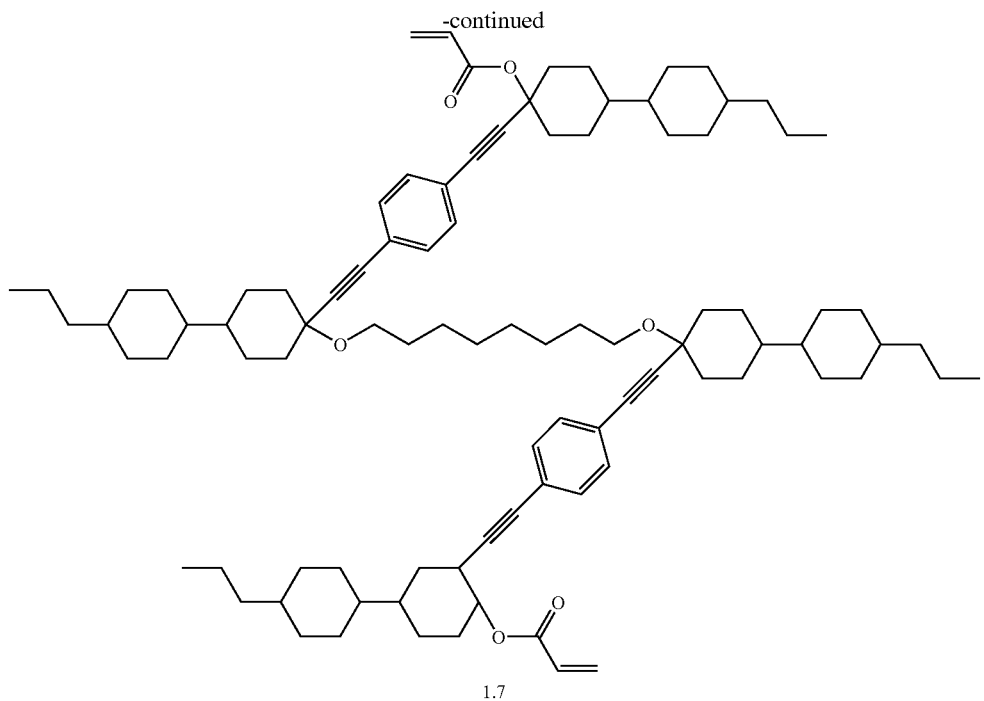

1.7

Another aspect of the invention is an LC formulation, preferably a polymerizable LC formulation, comprising one or more guest compounds as described above and below, and one or more additional compounds, which are preferably mesogenic or liquid crystalline and/or polymerizable. Very preferably the LC formulation comprises one or more additional compounds selected from reactive mesogens (RMs), most preferably selected from mono- and direactive RMs. These additional compounds constitute the polymerizable LC host component.

Preferably the polymer films according to the present invention are crosslinked, and the guest component and/or the host components comprises at least one compound with two or more polymerizable groups (di- or multireactive).

The concentration of the guest compound(s) of the present invention in the LC formulation (including both the guest and host component) is preferably from 5 to 90 wt. %, very preferably from 30 to 70 wt. %.

The additional RMs of the polymerizable LC host formulation can be prepared by methods which are known per se and which are described in standard works of organic chemistry like for example Houben-Weyl, Methoden der organischen Chemie, Thieme-Verlag, Stuttgart. Suitable RMs are disclosed for example in WO 93/22397, EP 0 261 712, DE 195 04 224, WO 95/22586, WO 97/00600, U.S. Pat. No. 5,518,652, U.S. Pat. No. 5,750,051, U.S. Pat. No. 5,770,107, U.S. Pat. No. 6,514,578 and U.S. Pat. No. 6,183,822. Examples of particularly suitable and preferred RMs are shown in the following list.

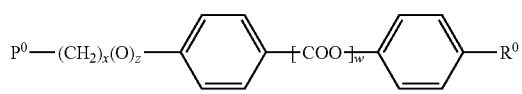
(MR1)

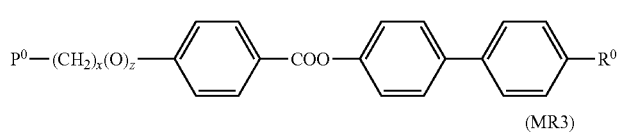
(MR2)

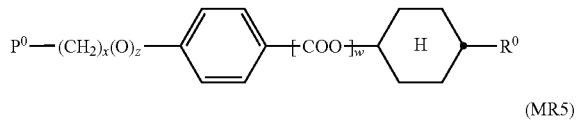
(MR3)

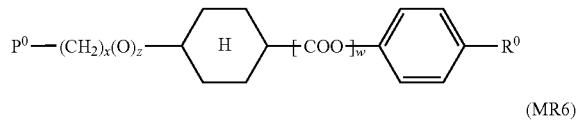
(MR4)

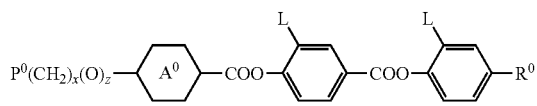
(MR5)

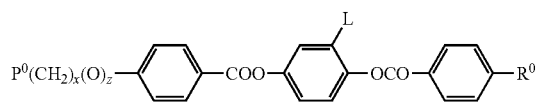
(MR6)

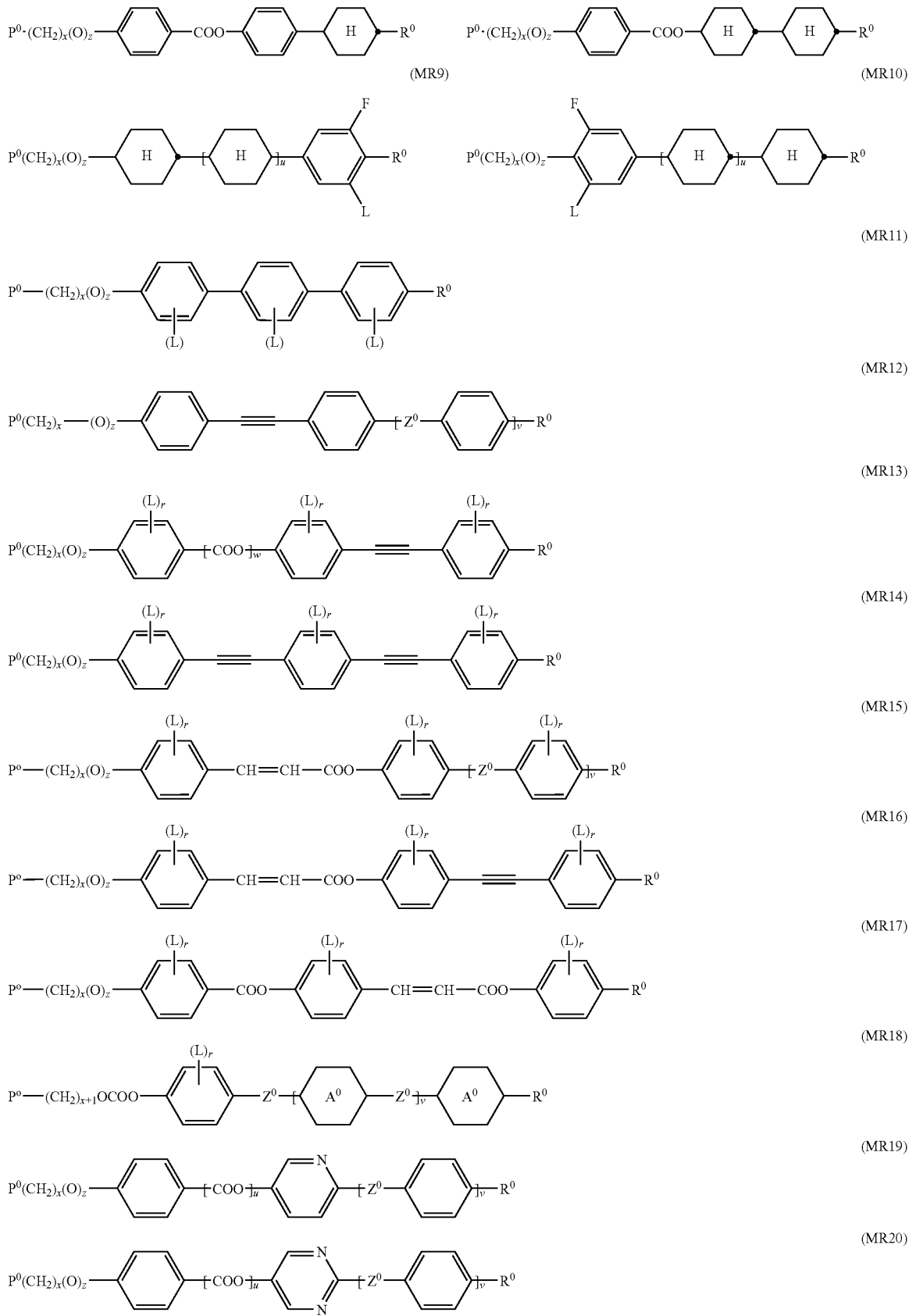

-continued
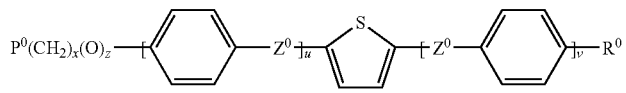
(MR21)
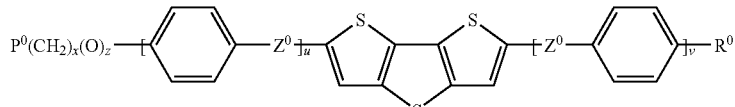
(MR22)
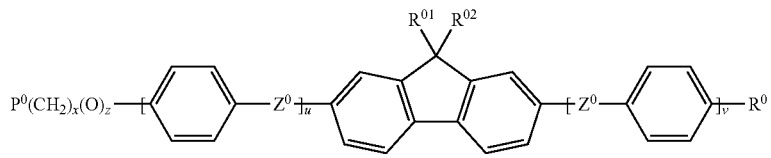
(MR23)
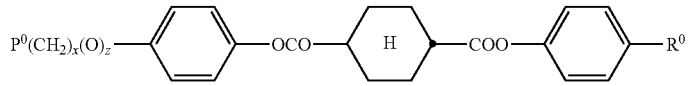
(MR24)
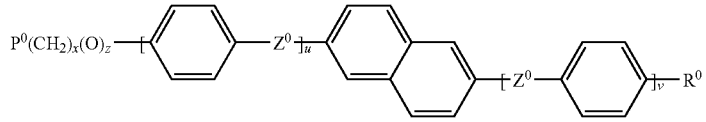
(MR25)
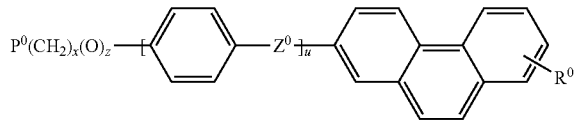
(MR26)
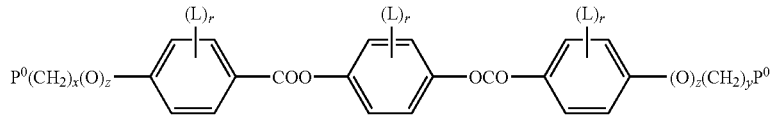
(DR1)
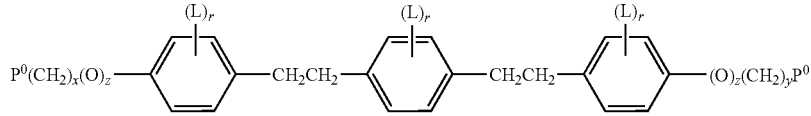
(DR2)
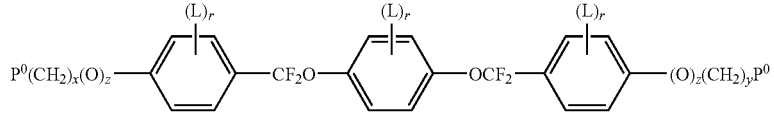
(DR3)
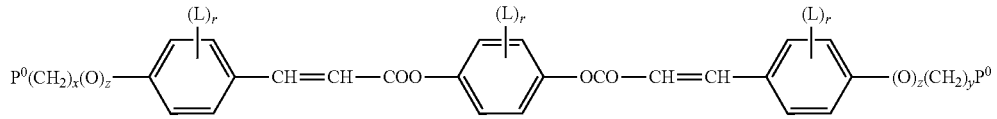
(DR4)
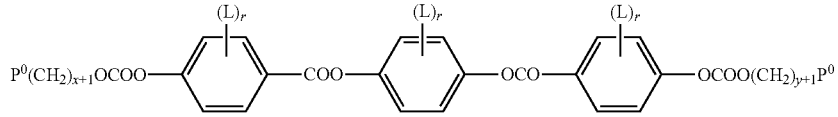
(DR5)
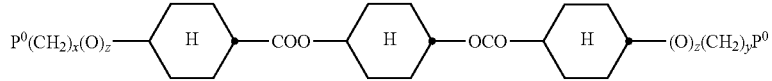
(DR6)
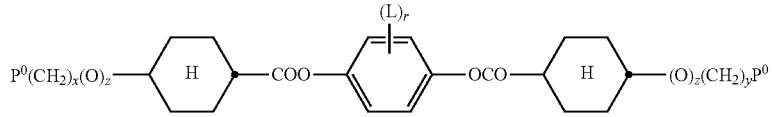
(DR7)

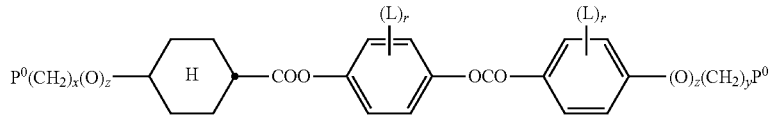
(DR8)
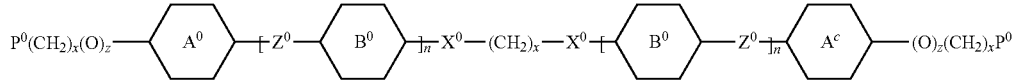
(DR9)
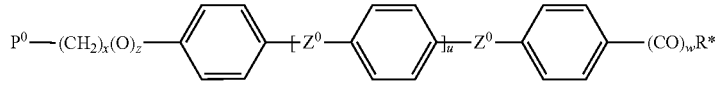
(CR1)
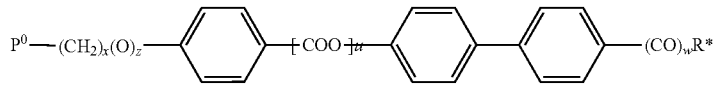
(CR2)
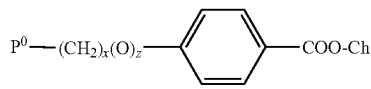
(CR3)
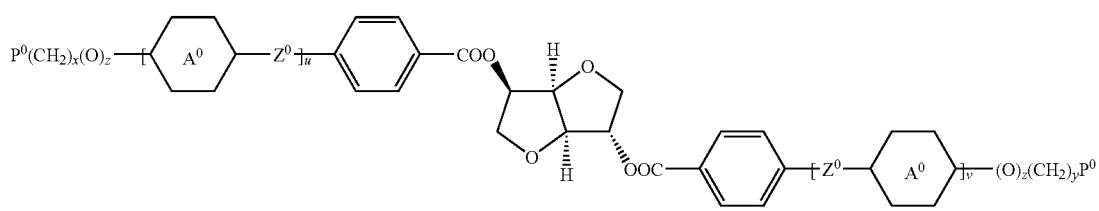
(CR4)
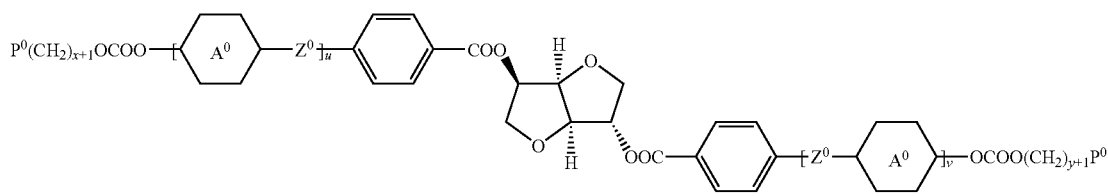
(CR5)
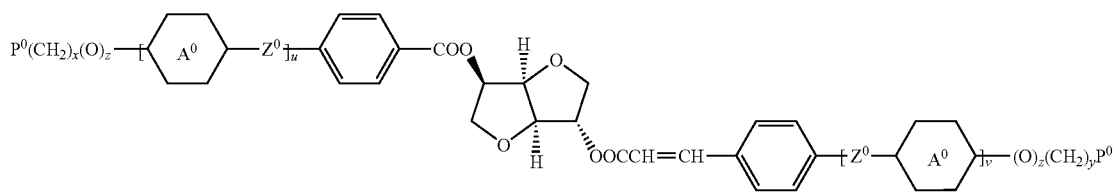
(CR6)
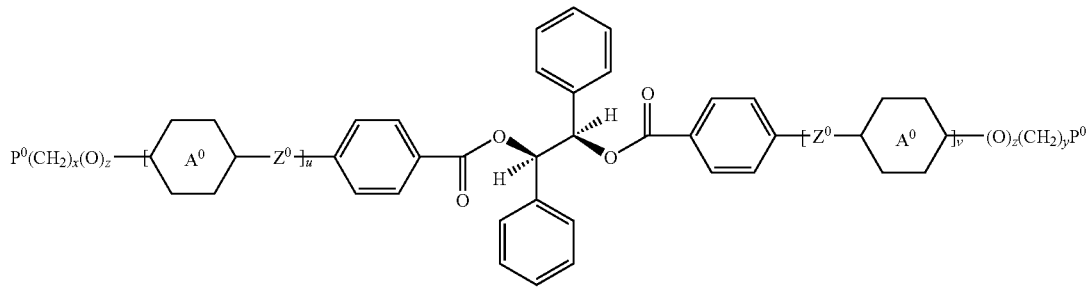
(CR7)

-continued

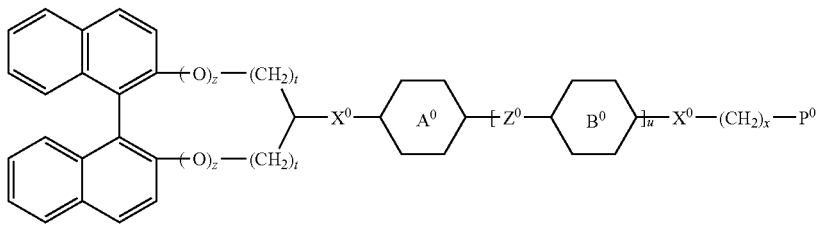
(CR8)

wherein
- $P^0$ is, in case of multiple occurrence independently of one another, a polymerizable group, preferably an acryl, methacryl, oxetane, epoxy, vinyl, vinyloxy, propenyl ether or styrene group,
- $A^0$ and $B^0$ are, in case of multiple occurrence independently of one another, 1,4-phenylene that is optionally substituted with 1, 2, 3 or 4 groups L, or trans-1,4-cyclohexylene,
- $Z^0$ is, in case of multiple occurrence independently of one another, —COO—, —OCO—, —CH$_2$CH$_2$—, —C≡C—, —CH=CH—, —CH=CH—COO—, —OCO—CH=CH— or a single bond,
- $R^0$ is alkyl, alkoxy, thioalkyl, alkylcarbonyl, alkoxycarbonyl, alkylcarbonyloxy or alkoxycarbonyloxy with 1 or more, preferably 1 to 15 C atoms which is optionally fluorinated, or is $Y^0$ or P—(CH$_2$)$_y$—(O)$_z$—,
- $Y^0$ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono-oligo- or polyfluorinated alkyl or alkoxy with 1 to 4 C atoms,
- $R^{01,02}$ are independently of each other H, $R^0$ or $Y^0$,
- R* is a chiral alkyl or alkoxy group with 4 or more, preferably 4 to 12 C atoms, like 2-methylbutyl, 2-methyloctyl, 2-methylbutoxy or 2-methyloctoxy,
- Ch is a chiral group selected from cholesteryl, estradiol, or terpenoid radicals like menthyl or citronellyl,
- L is, in case of multiple occurrence independently of one another, H, F, Cl, CN or optionally halogenated alkyl, alkoxy, alkylcarbonyl, alkoxycarbonyl, alkylcarbonyloxy or alkoxycarbonyloxy with 1 to 5 C atoms,
- r is 0, 1, 2, 3 or 4,
- t is, in case of multiple occurrence independently of one another, 0, 1, 2 or 3,
- u and v are independently of each other 0, 1 or 2,
- w is 0 or 1,
- x and y are independently of each other 0 or identical or different integers from 1 to 12,
- z is 0 or 1, with z being 0 if the adjacent x or y is 0, and wherein the benzene and napthalene rings can additionally be substituted with one or more identical or different groups L.

Especially preferably the polymerizable LC host component contains only achiral compounds and no chiral compounds.

Further preferably the polymerizable LC host component comprises one or more compounds selected from formula MR3, MR4, MR7, MR8, MR9, MR10, MR18, DR6, DR7 and DR8, furthermore DR1 and DR5.

Further preferably the polymerizable LC host component comprises one or more selected from the following formulae:

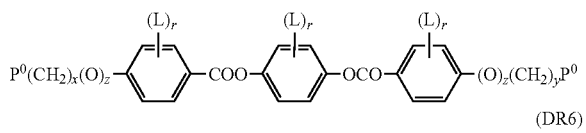
(DR1a)

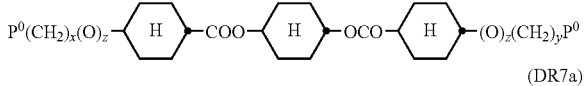
(DR6)

(DR7a)

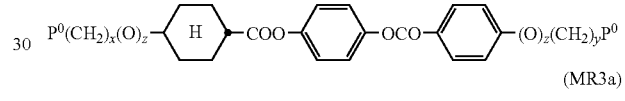
(DR8a)

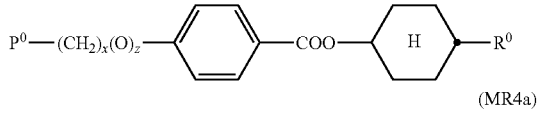
(MR3a)

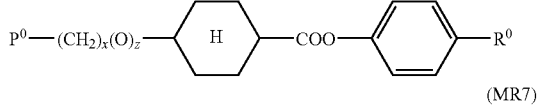
(MR4a)

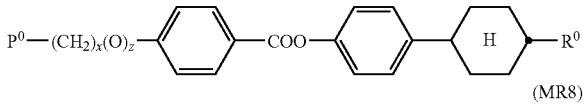
(MR7)

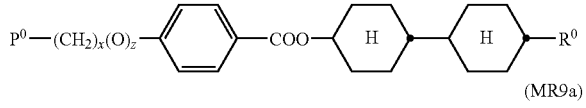
(MR8)

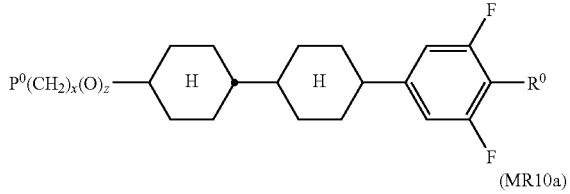
(MR9a)

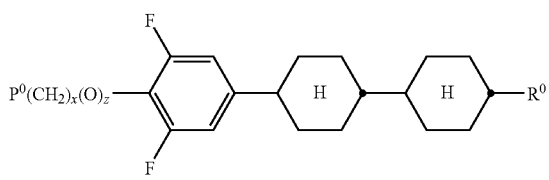
(MR10a)

wherein L, r, $P^0$, $R^0$, x, y, and z are as defined above.

Further preferably the polymerizable LC host component comprises one or more compounds selected from the following formulae:
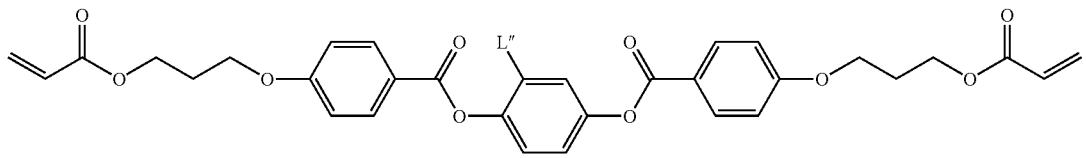
(DR1a1)
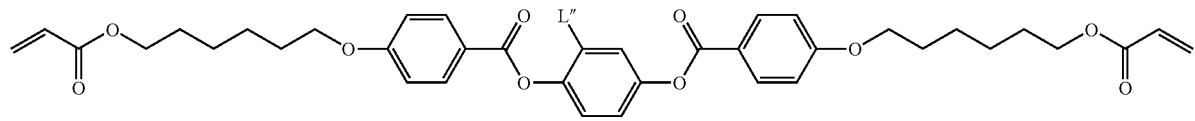
(DR1a2)
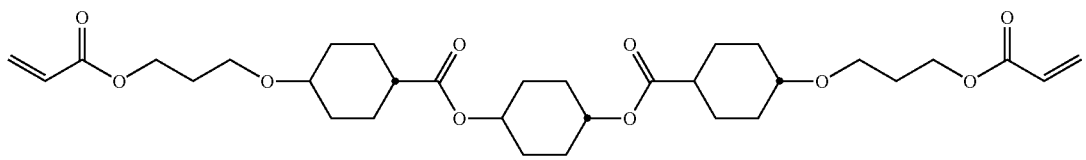
(DR6a)
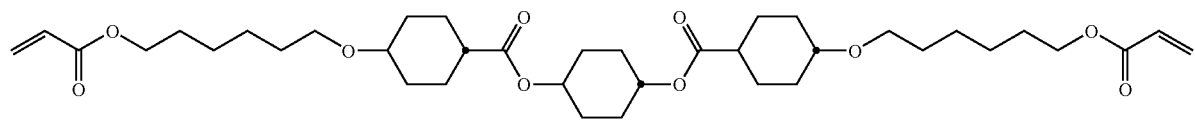
(DR6b)
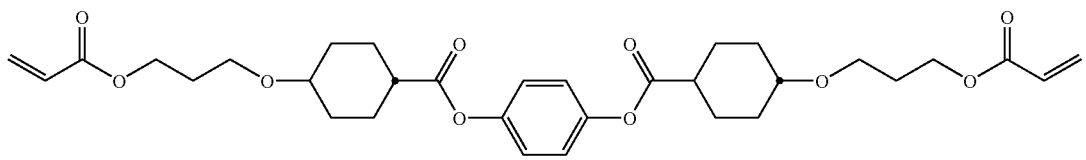
(DR7a1)
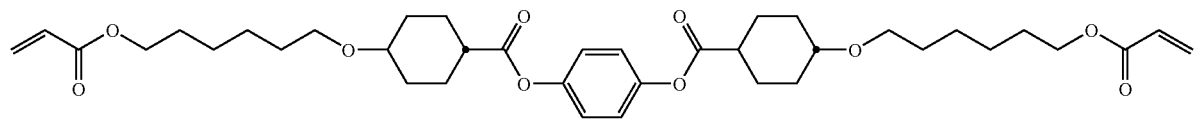
(DR7a2)
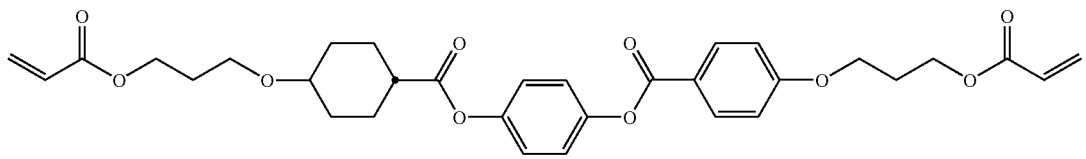
(DR8a1)
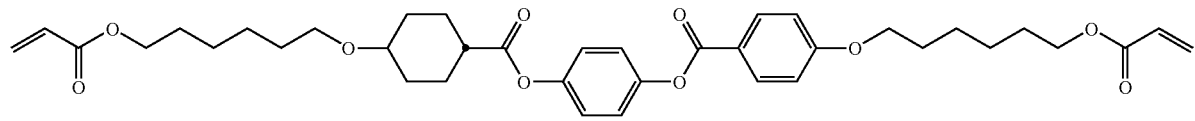
(DR8a2)
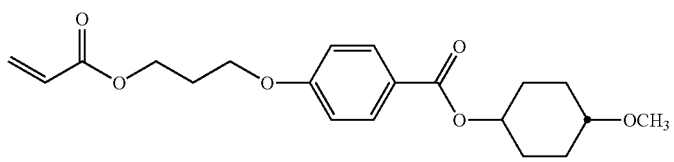
(MR3a1)

-continued
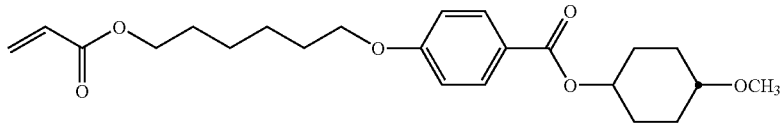
(MR3a2)
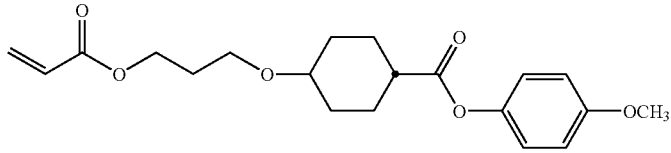
(MR4a1)
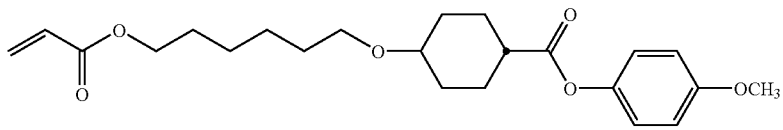
(MR4a2)
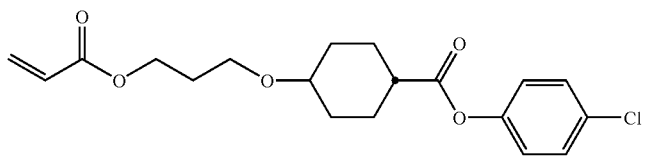
(MR4a3)
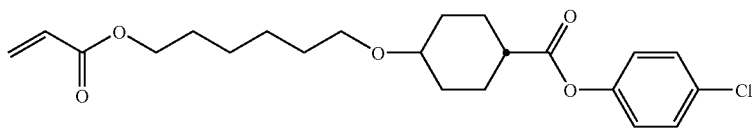
(MR4a4)
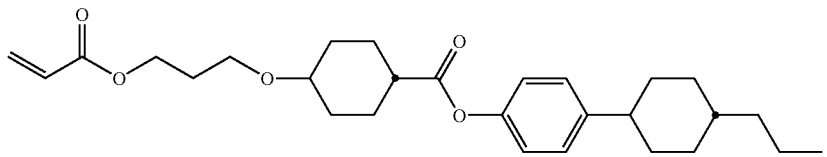
(MR7a)
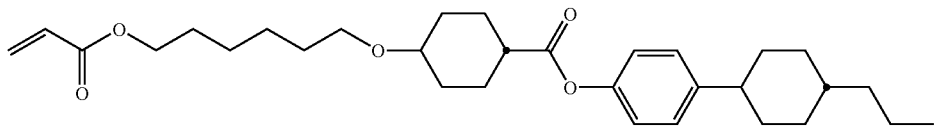
(MR7b)
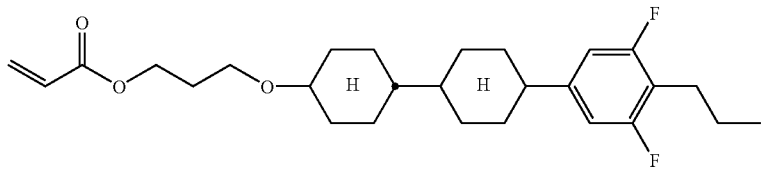
(MR9a1)
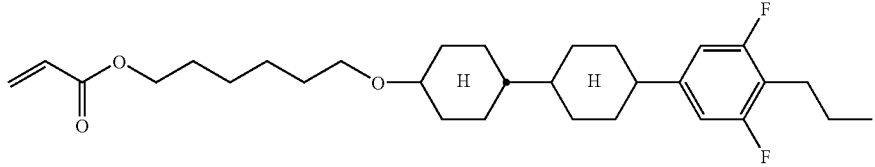
(MR9a2)
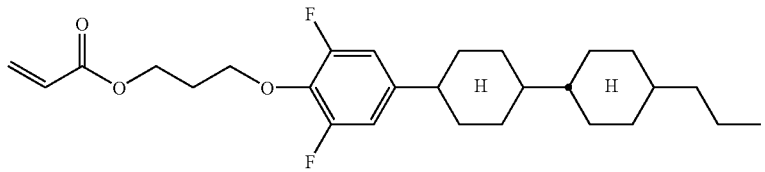
(MR10a1)

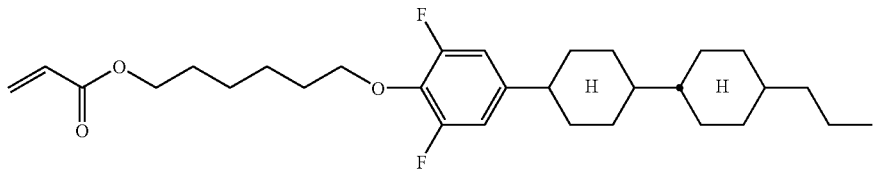

(MR10a2)

wherein L" is H or L as defined above, and is preferably H or CH$_3$.

Preferably the polymerizable compounds of the polymerizable LC host component are selected from compounds, very preferably mono- or direactive RMs, having low birefringence.

Especially preferred is a polymerizable host component having an absolute value of the birefringence from 0.01 to 0.2, very preferably from 0.04 to 0.16.

The general preparation of polymer LC films according to this invention is known to the ordinary expert and described in the literature, for example in D. J. Broer; G. Challa; G. N. Mol, *Macromol. Chem*, 1991, 192, 59. Typically a polymerizable LC material (i.e. a compound or a mixture or formulation) is coated or otherwise applied onto a substrate where it aligns into uniform orientation, and polymerized in situ in its LC phase at a selected temperature for example by exposure to heat or actinic radiation, preferably by photo-polymerization, very preferably by UV-photopolymerization, to fix the alignment of the LC molecules. If necessary, uniform alignment can promoted by additional means like shearing or annealing the LC material, surface treatment of the substrate, or adding surfactants to the LC material.

As substrate for example glass or quartz sheets or plastic films can be used. It is also possible to put a second substrate on top of the coated material prior to and/or during and/or after polymerization. The substrates can be removed after polymerization or not. When using two substrates in case of curing by actinic radiation, at least one substrate has to be transmissive for the actinic radiation used for the polymerization. Isotropic or birefringent substrates can be used. In case the substrate is not removed from the polymerized film after polymerization, preferably isotropic substrates are used.

Suitable and preferred plastic substrates are for example films of polyester such as polyethyleneterephthalate (PET) or polyethylene-naphthalate (PEN), polyvinylalcohol (PVA), polycarbonate (PC) or triacetylcellulose (TAC), very preferably PET or TAC films. As birefringent substrates for example uniaxially stretched plastics film can be used. PET films are commercially available for example from DuPont Teijin Films under the trade name Melinex®.

The polymerizable material can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the polymerizable material in a suitable solvent. This solution is then coated or printed onto the substrate, for example by spin-coating or printing or other known techniques, and the solvent is evaporated off before polymerization. In many cases it is suitable to heat the mixture in order to facilitate the evaporation of the solvent. As solvents for example standard organic solvents can be used. The solvents can be selected for example from ketones such as acetone, methyl ethyl ketone, methyl propyl ketone or cyclohexanone; acetates such as methyl, ethyl or butyl acetate or methyl acetoacetate; alcohols such as methanol, ethanol or isopropyl alcohol; aromatic solvents such as toluene or xylene; halogenated hydrocarbons such as di- or trichloromethane; glycols or their esters such as PGMEA (propyl glycol monomethyl ether acetate), γ-butyrolactone, and the like. It is also possible to use binary, ternary or higher mixtures of the above solvents.

Initial alignment (e.g. planar alignment) of the polymerizable LC material can be achieved for example by rubbing treatment of the substrate, by shearing the material during or after coating, by annealing the material before polymerization, by application of an alignment layer, by applying a magnetic or electric field to the coated material, or by the addition of surface-active compounds to the material. Reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

Especially preferred is a polymerizable material comprising one or more surfactants that promote a specific surface alignment of the LC molecules. Suitable surfactants are described for example in J. Cognard, Mol. Cryst. Liq. Cryst. 78, Supplement 1, 1-77 (1981). Preferred aligning agents for planar alignment are for example non-ionic surfactants, preferably fluorocarbon surfactants such as the commercially available Fluorad FC-171® (from 3M Co.) or Zonyl FSN® (from DuPont), multiblock surfactants as described in GB 2 383 040 or polymerizable surfactants as described in EP 1 256 617.

It is also possible to apply an alignment layer onto the substrate and provide the polymerizable material onto this alignment layer. Suitable alignment layers are known in the art, like for example rubbed polyimide or alignment layers prepared by photoalignment as described in U.S. Pat. No. 5,602,661, U.S. Pat. No. 5,389,698 or U.S. Pat. No. 6,717,644.

It is also possible to induce or improve alignment by annealing the polymerizable LC material at elevated temperature, preferably at its polymerization temperature, prior to polymerization.

Polymerization is achieved for example by exposing the polymerizable material to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation. As a source for actinic radiation for example a single UV lamp or a set of UV lamps can be used. When using a high lamp power the curing time can be reduced. Another possible source for actinic radiation is a laser, like for example a UV, IR or visible laser.

Polymerization is preferably carried out in the presence of an initiator absorbing at the wavelength of the actinic radiation. For this purpose the polymerizable LC material preferably comprises one or more initiators, preferably in a concentration from 0.01 to 10%, very preferably from 0.05 to 5%. For example, when polymerizing by means of UV light, a photoinitiator can be used that decomposes under UV irradiation to produce free radicals or ions that start the polymerization reaction. For polymerizing acrylate or methacrylate groups preferably a radical photoinitiator is used. For polymerizing vinyl, epoxide or oxetane groups preferably a cationic photoinitiator is used. It is also possible to use a thermal polymerization initiator that decomposes when heated to produce free radicals or ions that start the polymerization. Typical radical photoinitiators are for example the commercially available Irgacure® or Darocure® (Ciba Geigy AG, Basel, Switzerland). A typical cationic photoinitiator is for example UVI 6974 (Union Carbide).

The polymerizable material may also comprise one or more stabilizers or inhibitors to prevent undesired spontaneous polymerization, like for example the commercially available Irganox® (Ciba Geigy AG, Basel, Switzerland).

The curing time depends, inter alia, on the reactivity of the polymerizable material, the thickness of the coated layer, the type of polymerization initiator and the power of the UV lamp. The curing time is preferably $\leq$5 minutes, very preferably $\leq$3 minutes, most preferably $\leq$1 minute. For mass production short curing times of $\leq$30 seconds are preferred.

Preferably polymerization is carried out in an inert gas atmosphere like nitrogen or argon.

The polymerizable material may also comprise one or more dyes having an absorption maximum adjusted to the wavelength of the radiation used for polymerization, in particular UV dyes like e.g. 4,4"-azoxy anisole or Tinuvin® dyes (from Ciba AG, Basel, Switzerland).

In another preferred embodiment the polymerizable material comprises one or more monoreactive polymerizable non-mesogenic compounds, preferably in an amount of 0 to 50%, very preferably 0 to 20%. Typical examples are alkylacrylates or alkylmethacrylates.

In another preferred embodiment the polymerizable material comprises one or more di- or multireactive polymerizable non-mesogenic compounds, preferably in an amount of 0 to 50%, very preferably 0 to 20%, alternatively or in addition to the di- or multireactive polymerizable mesogenic compounds. Typical examples of direactive non-mesogenic compounds are alkyldiacrylates or alkyldimethacrylates with alkyl groups of 1 to 20 C atoms. Typical examples of multireactive non-mesogenic compounds are trimethylpropanetrimethacrylate or pentaerythritoltetraacrylate.

It is also possible to add one or more chain transfer agents to the polymerizable material in order to modify the physical properties of the polymer film. Especially preferred are thiol compounds, for example monofunctional thiols like dodecane thiol or multifunctional thiols like trimethylpropane tri(3-mercaptopropionate). Very preferred are mesogenic or LC thiols as disclosed for example in WO 96/12209, WO 96/25470 or U.S. Pat. No. 6,420,001. By using chain transfer agents the length of the free polymer chains and/or the length of the polymer chains between two crosslinks in the polymer film can be controlled. When the amount of the chain transfer agent is increased, the polymer chain length in the polymer film decreases.

The polymerizable material may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the polymerizable material does not contain a binder or dispersion auxiliary.

The polymerizable material can additionally comprise one or more additives like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes, pigments or nanoparticles.

The thickness of a polymer film according to the present invention is preferably from 0.3 to 5 microns, very preferably from 0.5 to 3 microns, most preferably from 0.7 to 1.5 microns. For use as alignment layer, thin films with a thickness of 0.05 to 1, preferably 0.1 to 0.4 microns are preferred.

The polymer films and materials of the present invention can be used as retardation or compensation film for example in LCDs to improve the contrast and brightness at large viewing angles and reduce the chromaticity. It can be used outside the switchable LC cell of the LCD or between the substrates, usually glass substrates, forming the switchable LC cell and containing the switchable LC medium (incell application).

The polymer film and materials of the present invention can be used in conventional LC displays, for example displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned), PVA (patterned vertically aligned) or PSVA (polymer stabilised vertically aligned) mode; displays with bend or hybrid alignment like the OCB (optically compensated bend cell or optically compensated birefringence), R-OCB (reflective OCB), HAN (hybrid aligned nematic) or pi-cell ($\pi$-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase.

The layers, films and materials of the present invention can be used for various types of optical films, preferably selected from optically uniaxial films (A-plate, C-plate, negative C-plate, O-plate), twisted optical retarders, like for example twisted quarter wave foils (QWF), achromatic retarders, achromatic QWFs or half wave foils (HWF), and optically biaxial films. The LC phase structure in the layers and materials can be selected from cholesteric, smectic, nematic and blue phases. The alignment of the LC material in the layer can be selected from homeotropic, splayed, tilted, planar and blue-phase alignment. The layers can be uniformly oriented or exhibit a pattern of different orientations.

The films can be used as optical compensation film for viewing angle enhancement of LCD's or as a component in a brightness enhancement films, furthermore as an achromatic element in reflective or transflective LCD's. Further preferred applications and devices include retarding components in optoelectronic devices requiring similar phase shift at multiple wavelengths, such as combined CD/DVD/HD-DVD/Blu-Ray, including reading, writing re-writing data storage systems achromatic retarders for optical devices such as cameras
achromatic retarders for displays including OLED and LCD's.

The following examples are intended to explain the invention without restricting it. The methods, structures and properties described hereinafter can also be applied or transferred to materials that are claimed in this invention but not explicitly described in the foregoing specification or in the examples.

Above and below, percentages are per cent by weight. All temperatures are given in degrees Celsius. m.p. denotes melting point, cl.p. denotes clearing point, $T_g$ denotes glass transition temperature. Furthermore, C=crystalline state, N=nematic phase, S=smectic phase and I=isotropic phase. The data between these symbols represent the transition temperatures. Δn denotes the optical anisotropy ($\Delta n = n_e - n_o$, where $n_o$ denotes the refractive index parallel to the longitudinal molecular axes and $n_e$ denotes the refractive index perpendicular thereto), measured at 589 nm and 20° C. The optical and electrooptical data are measured at 20° C., unless expressly stated otherwise.

Unless stated otherwise, the percentages of components of a polymerizable mixture as given above and below refer to the total amount of solids in the mixture polymerizable mixture, i.e. not including solvents.

EXAMPLE 1

Compound (1.7) is prepared as described below.

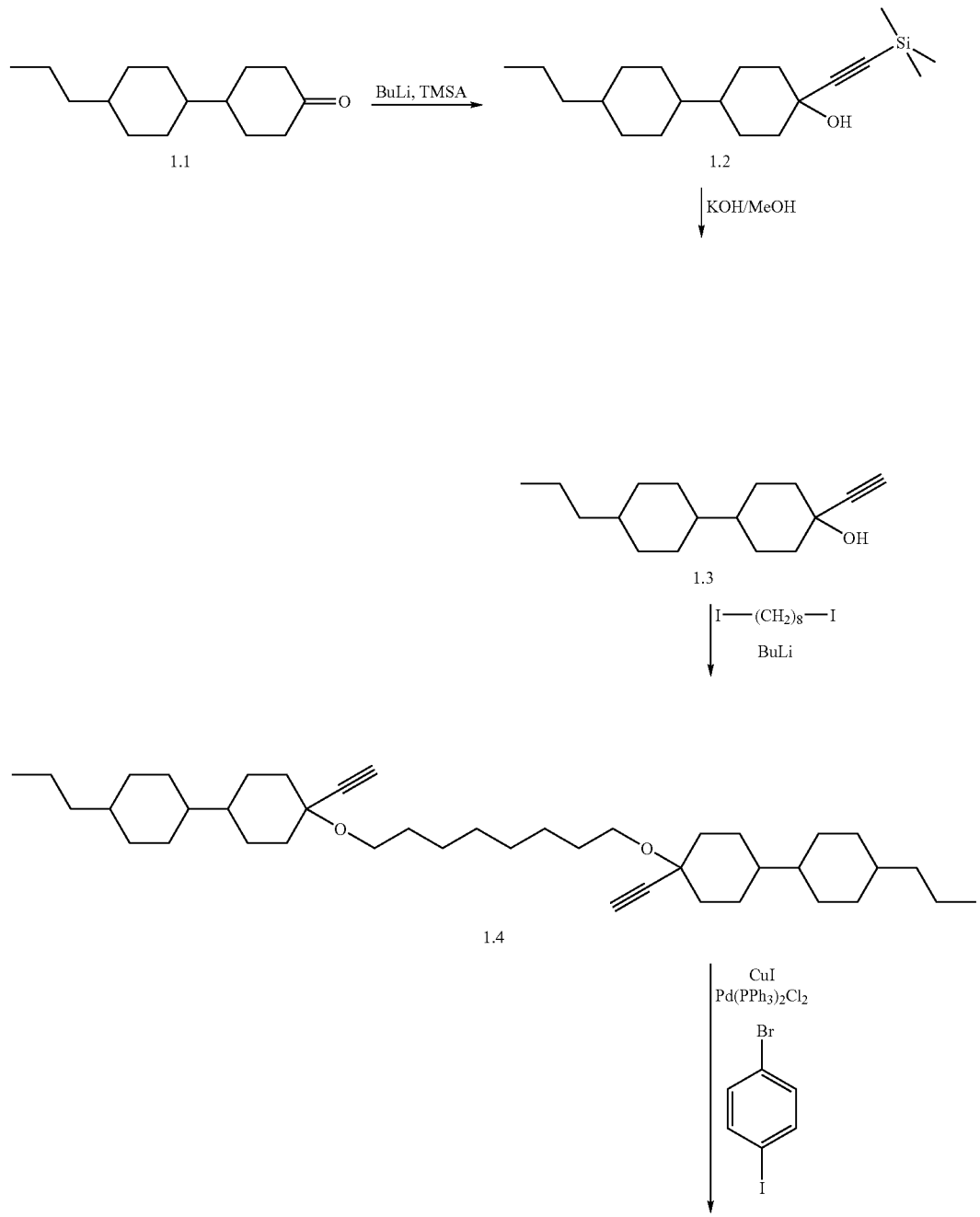

-continued

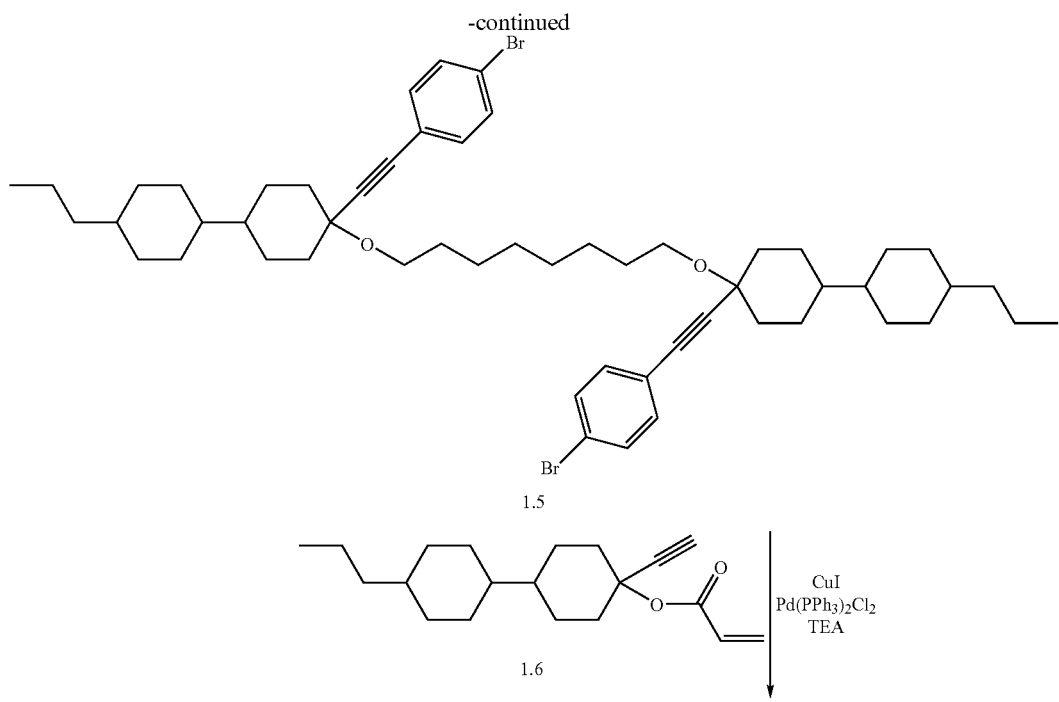

1.5

1.6

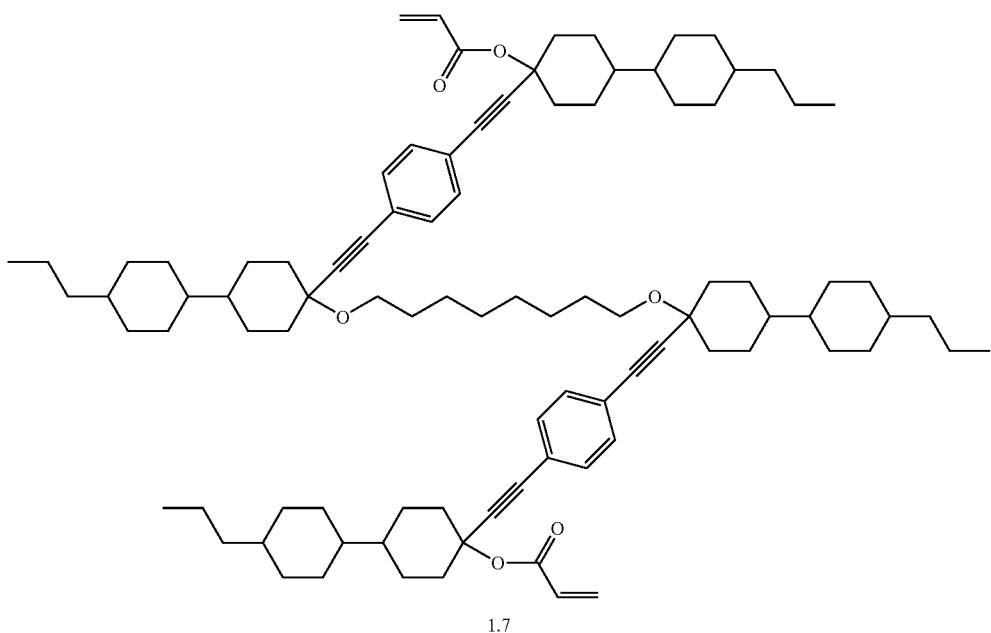

1.7

Compound 1.3 is prepared in two steps by reacting the ketone 1.1 with trimethylacetylene in the presence of butyl lithium, and then removing the TMS group using potassium hydroxide. The diether 1.4 is prepared by reacting the hydroxy-acetylene (1.3) with a diiodoalkane in the presence of butyl lithium. Coupling 1-bromo-4-iodobenzene with compound 1.4 gives the 1.5 which is further coupled with the acrylate 1.6 (prepared according to scheme 1) to give the target compound 1.7.

EXAMPLE 2
Compound (2) is prepared in analogy to Example 1.
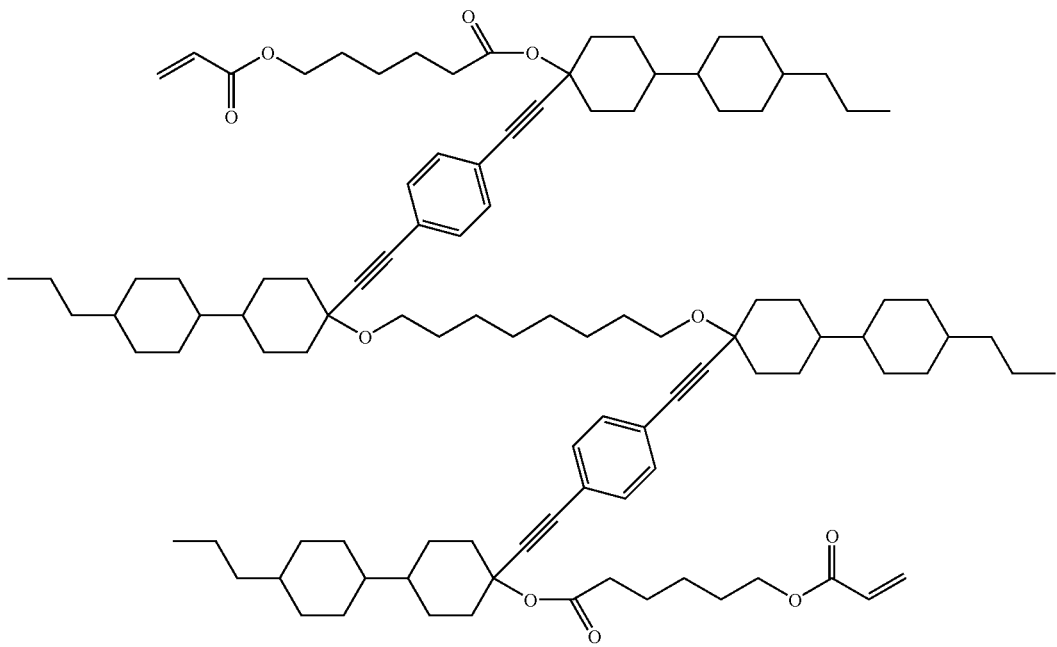
EXAMPLE 3
Compound (3) is prepared in analogy to Example 1.
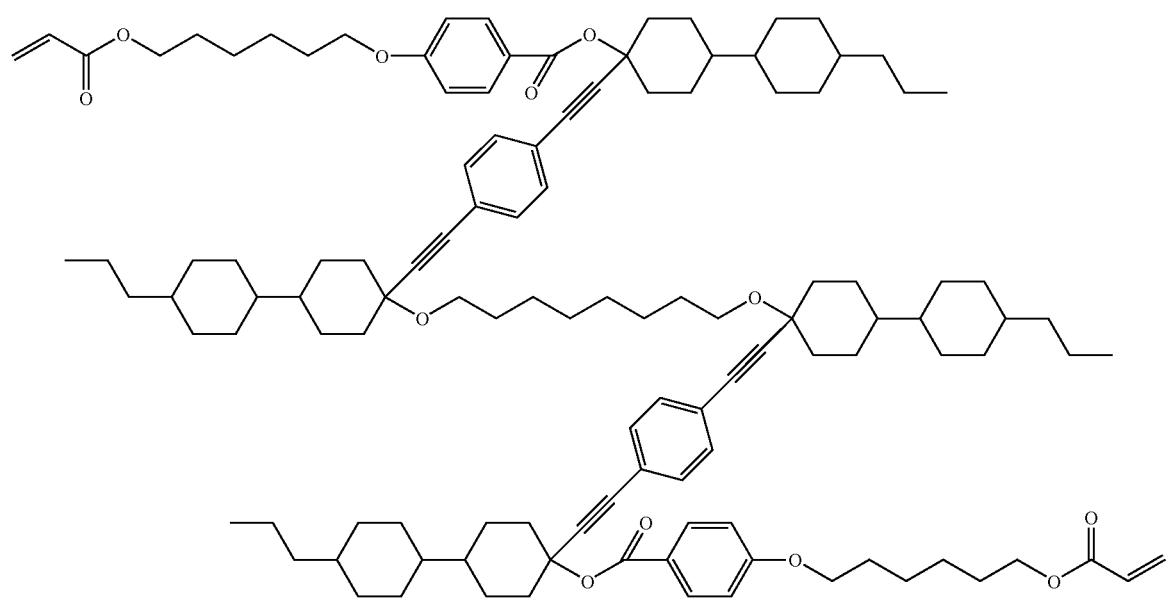

EXAMPLE 4
Compound (4.3) is prepared as described below.
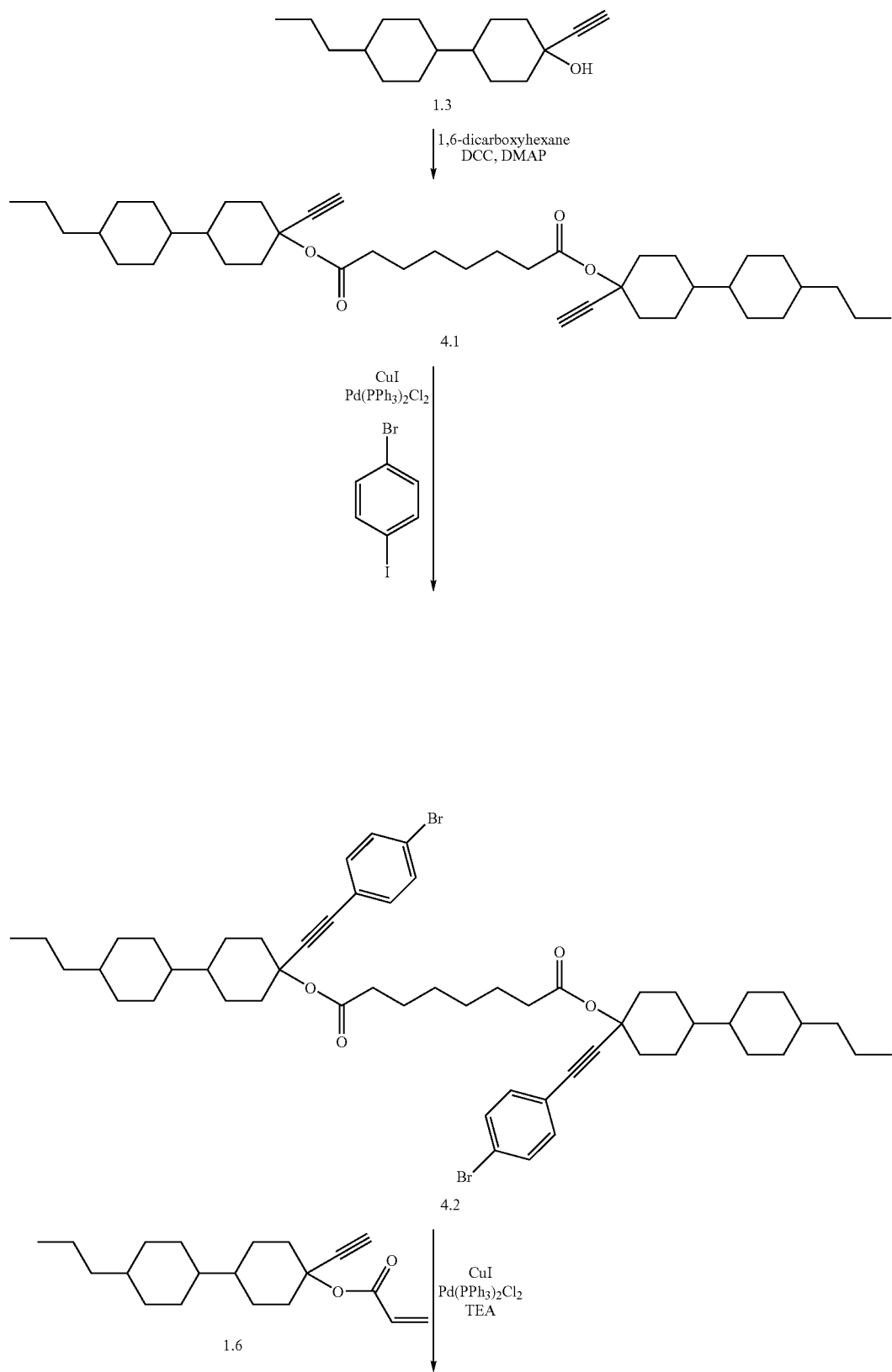

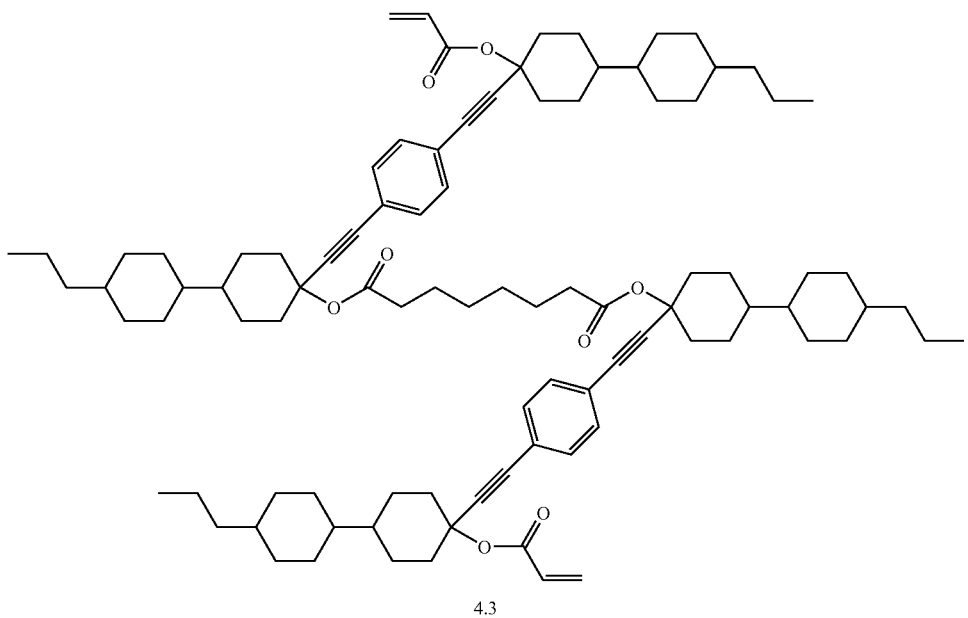

4.3

4-ethynyl-4'-propyl-(trans,trans)-[1,1'-bicyclohexyl]-4-ol (1.3) is reacted with 1,6-dicarboxyhexane in the presence of DCC and DMAP to yield the diester 4.1. Coupling of this diester with 1-bromo-4-iodobenzene under Sonogashira coupling conditions gives compound 4.2. Further reaction of this compound with compound 1.6 (prepared according to scheme 1) gives the target compound 4.3.

EXAMPLE 5

Compound (5.3) is prepared as described below.

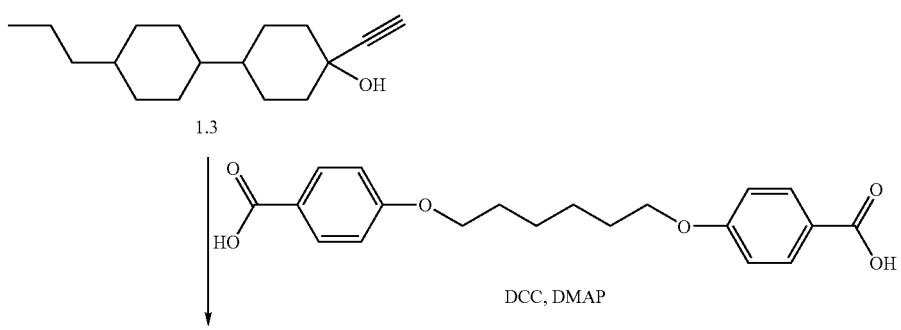

-continued
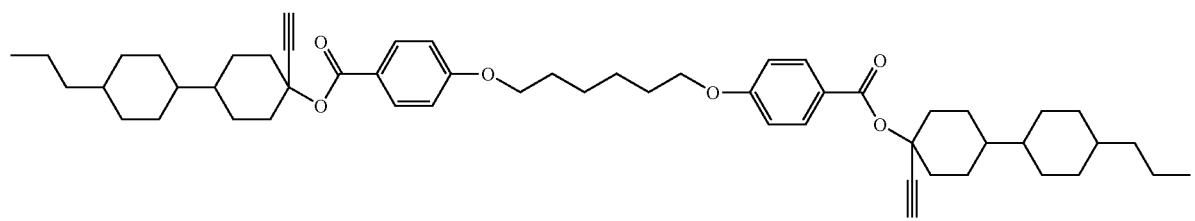
5.1
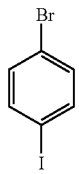
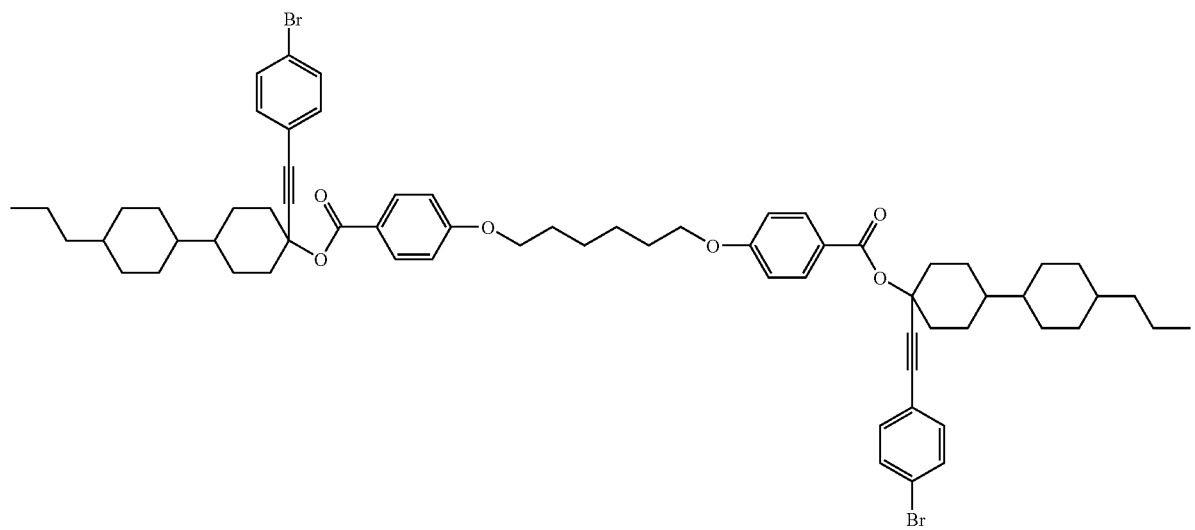
5.2
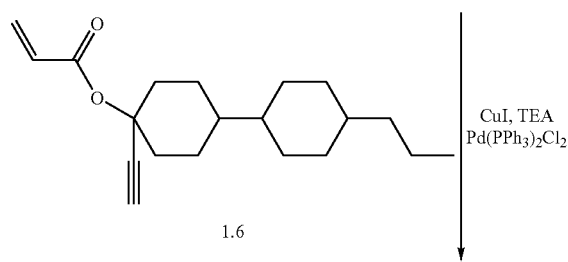
1.6

-continued

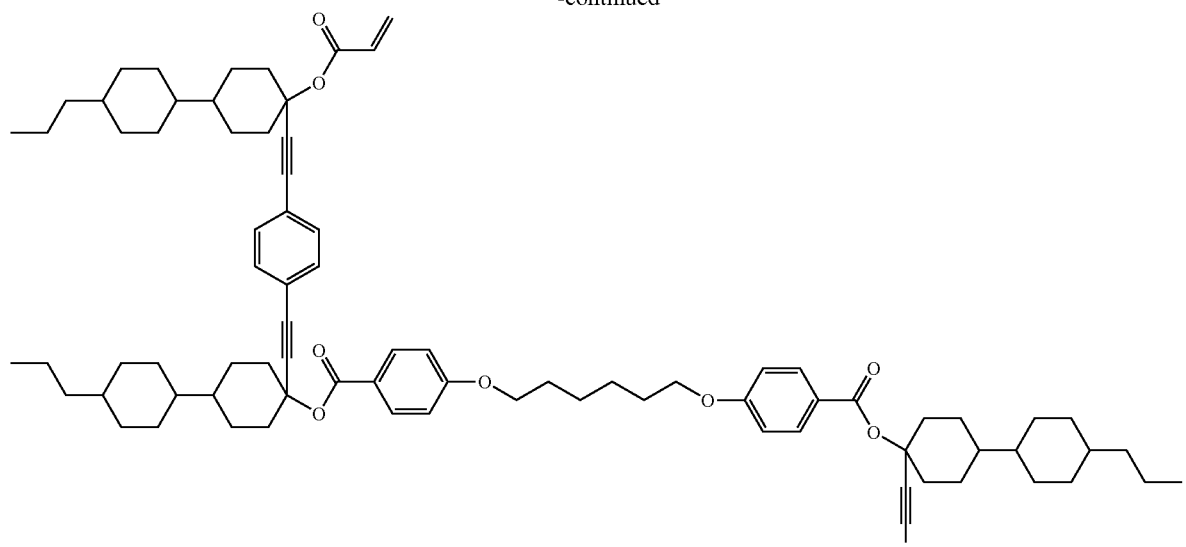

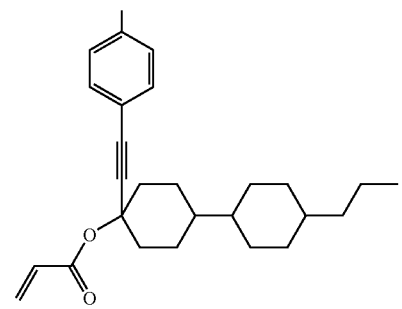

5.3

4-ethynyl-4'-propyl-(trans,trans)-[1,1'-bicyclohexyl]-4-ol (1.3) is reacted with 4,4'-[1,6-hexanediylbis(oxy)]bis-benzoic acid in the presence of DCC and DMAP to give the diester 5.1. Coupling of this diester with 1-bromo-4-iodobenzene under Sonogashira coupling conditions gives compound 5.2. Further reaction of this compound with compound 1.6 (prepared according to example 1) gives the target compound 5.3.

EXAMPLE 6

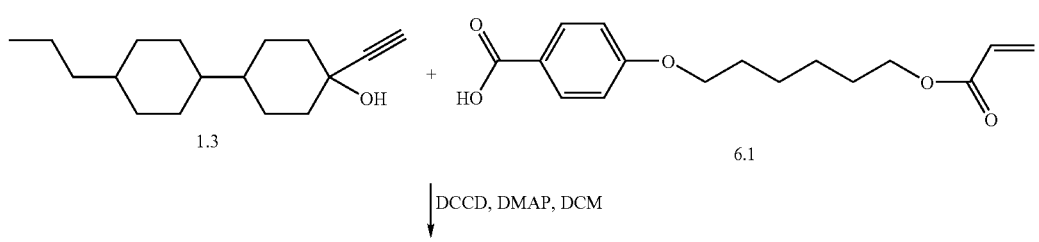

-continued
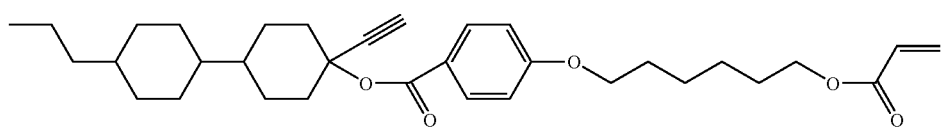
6.2
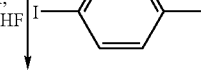
Pd(PPh₃)₂Cl₂, CuI, diisopropylamine, THF
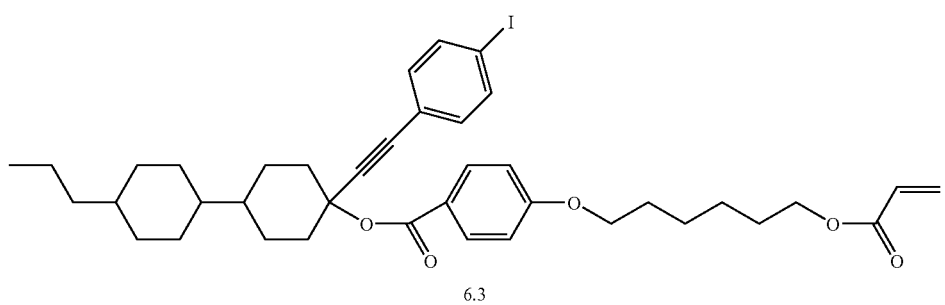
6.3
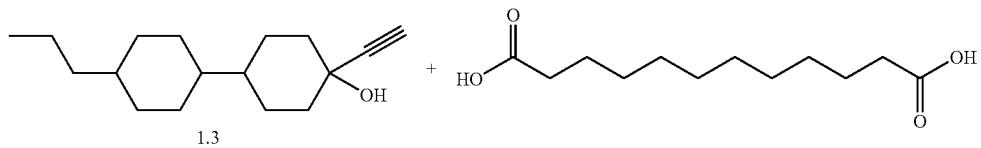
1.3        6.4
TFAA/TFA, DCM
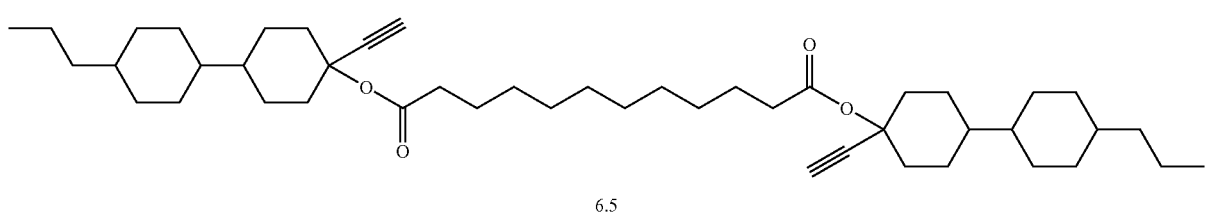
6.5
6.4 + 6.5
Pd(PPh₃)₂Cl₂, CuI, diisopropylamine, THF

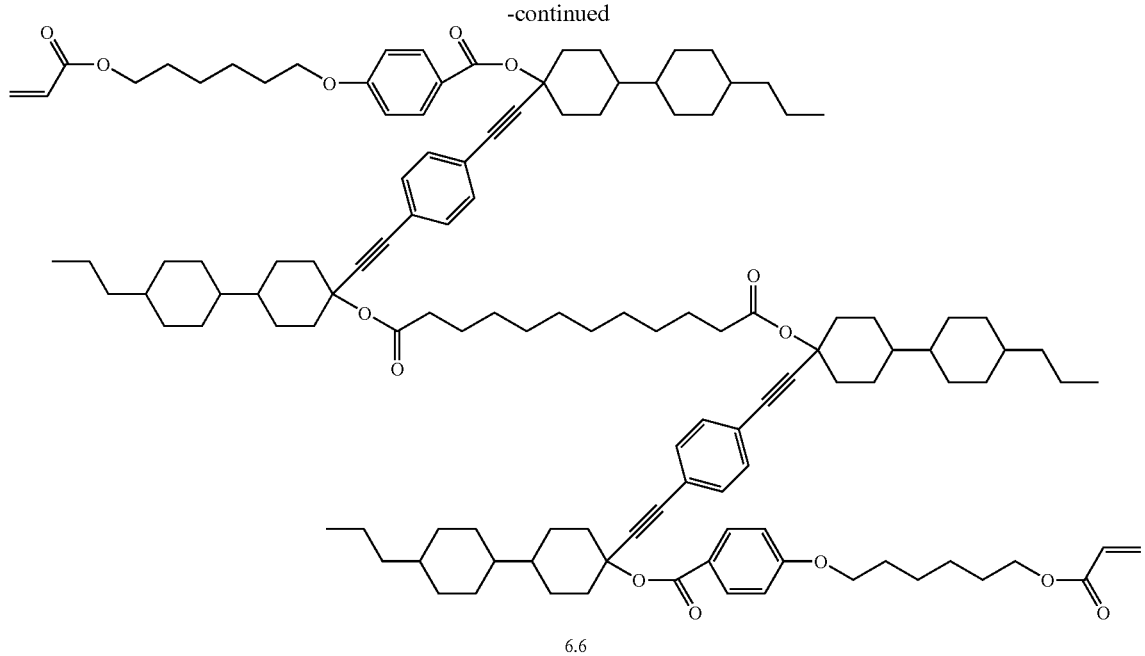

6.6

4-ethynyl-4'-propyl-(trans,trans)-[1,1'-bicyclohexyl]-4-ol (1.3) is reacted with 4-(6-acryloyloxy-hexyloxy)benzoic acid in the presence of DCC and DMAP to yield the ester 6.2. Coupling of this ester with 1,4-diiodobenzene under Sonogashira coupling conditions gives compound (6.3) in 42% yield. Compound 1.3 is also reacted with the dodecanedicarboxylic acid (6.4) to give the diester (6.5) in 77% yield. The diester (6.5) is further reacted with compound (6.3) under Sonogashira conditions to give the target dimer, compound (6.6) as a white crystalline solid in 45% yield Compound 6.6 has a melting point of 84° C.

MIXTURE EXAMPLE 1

The following mixture is prepared:

| | | |
|---|---|---|
| | Irgacure ® 651 | 0.48% |
| | Irgacure ® 1076 | 0.05% |
| | DR1a1 | 2.22% |
| | MR9a1 | 5.65% |
| | MR9a2 | 7.70% |
| | Compound 6.6 | 23.91% |
| | Toluene | 60.00% |

(DR1a1)

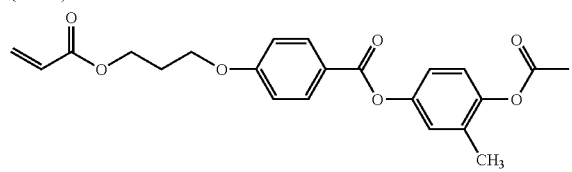

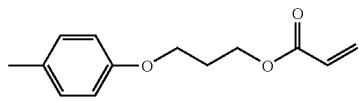

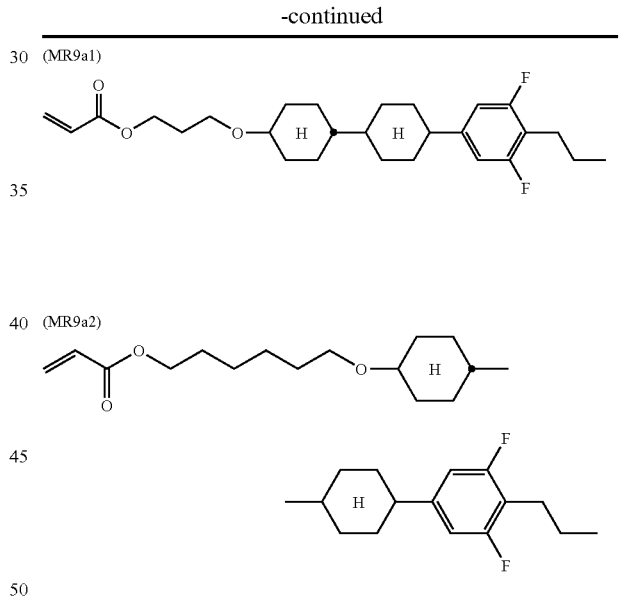

Compound DR1a1 is known from Broer et al., Makromol. Chem. 1989, 190, 3201-15. Compounds MR9a1 and MR9a2 are known from U.S. Pat. No. 6,183,822. Irgacure® 651 and 1076 are commercially available from Ciba AG.

The formulation is spin coated at 3000 rpm onto a clean glass slide. The samples are annealed at 50° C. for 30 s. After annealing, the sample is polymerised using an EFOS lamp (200 mW/cm2) 365 nm filter, under nitrogen at 40° C. for 60 s. The retardation of the slide as measured using an ellipsometer.

Figure 5:
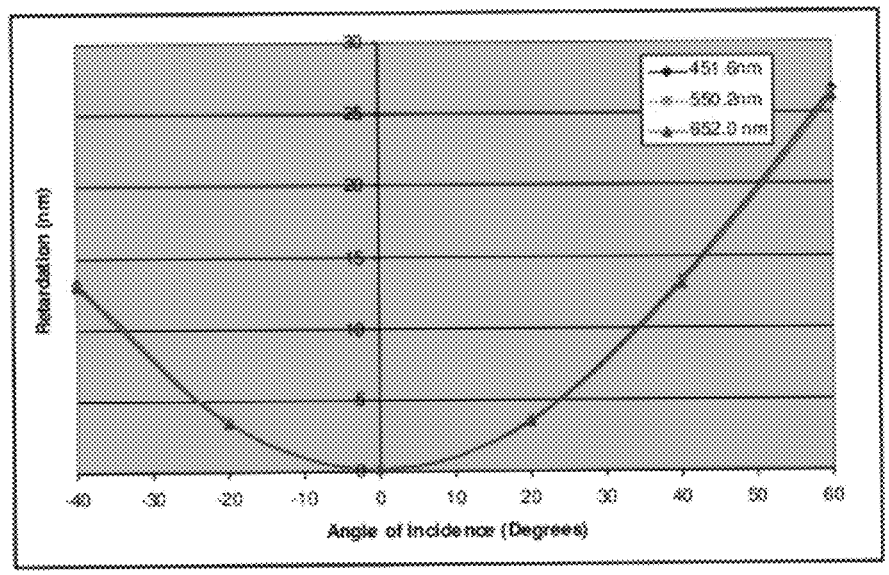
FIG. 5 shows the retardation profile of a film prepared according to example 1.

The retardation profile of the film is shown in FIG. 5. From this data it is determined that the film has the optical property of an +C-plate, and that the film has low dispersion with $R_{450}/R_{550}=1.015$ when measured at an angle of between 20 and 60° out to the plane of the film.

MIXTURE EXAMPLE 2

The following mixture is prepared:

| | |
|---|---|
| Irgacure ® 651 | 0.42% |
| Irgacure ® 1076 | 0.02% |
| DR1a1 | 1.6% |
| MR9a1 | 4.23% |
| MR9a2 | 5.49% |
| Compound 6.6 | 28.24% |
| Toluene | 60.00% |

The formulation is spin coated at 3000 rpm onto a clean glass slide. The samples are annealed at 50° C. for 30 s. After annealing, the sample is polymerised using an EFOS lamp (200 mW/cm2) 365 nm filter, under nitrogen at 40° C. for 60 s. The retardation of the slide is measured using an ellipsometer.

Figure 6:
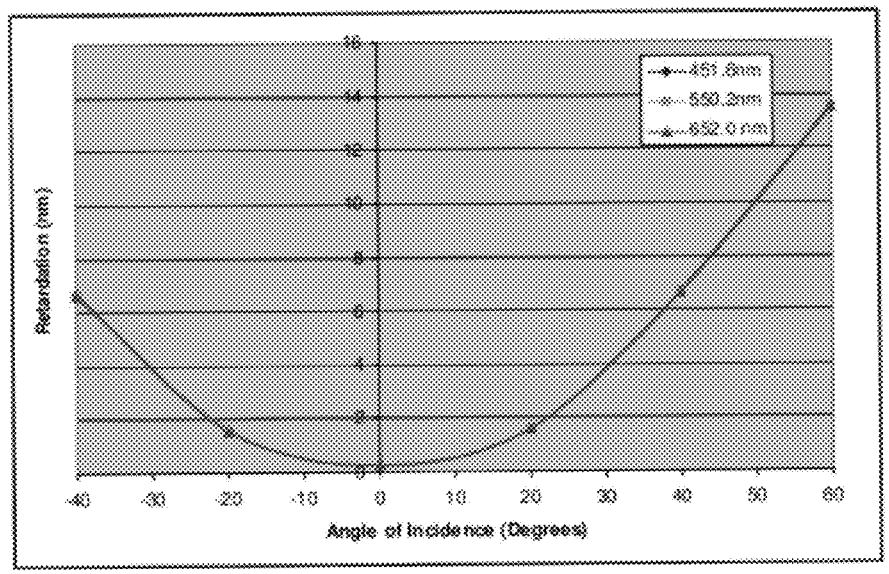
FIG. 6 shows the retardation profile of a film prepared according to example 2.

The retardation profile of the film is shown in FIG. 6. From this data it is determined that the film has the optical property of an +C-plate, and that the film has low dispersion with $R_{450}/R_{550}=1$ when measured at an angle of between 20 and 60° out to the plane of the film.

COMPARATIVE EXAMPLE 1

The following mixture is prepared as a comparative example. This mixture does not contain any of the dimer compounds mentioned above:

| | |
|---|---|
| Irgacure ® 651 | 0.43% |
| Irgacure ® 1076 | 0.05% |
| DR1a1 | 5.66% |
| MR9a1 | 14.41% |
| MR9a2 | 19.45% |
| Toluene | 60.00% |

The formulation is spin coated at 3000 rpm onto a clean glass slide. The samples are annealed at 50° C. for 30 s. After annealing, the sample is polymerised using an EFOS lamp (200 mW/cm2) 365 nm filter, under nitrogen at 40° C. for 60 s. The retardation of the slide is measured using an ellipsometer.

Figure 7:
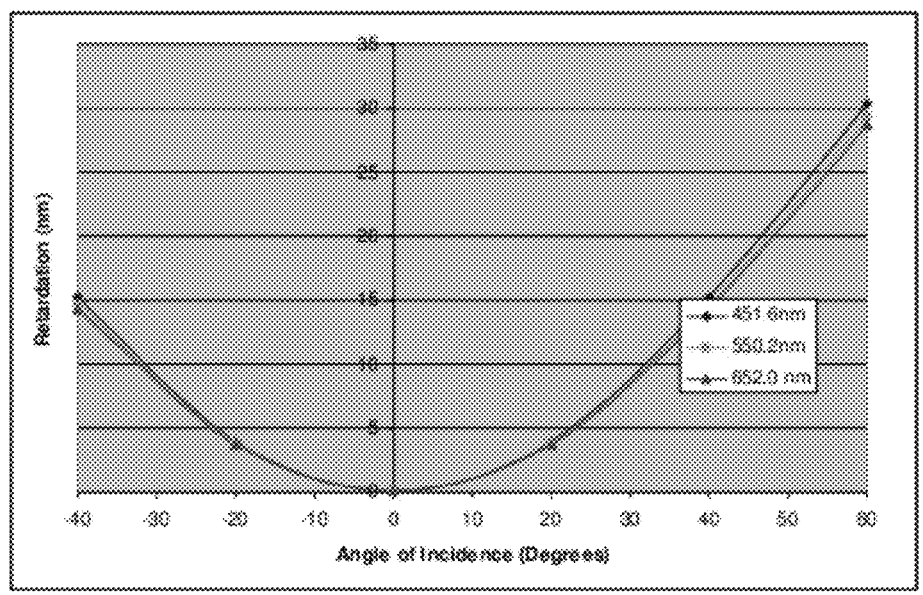
FIG. 7 shows the retardation profile of a film prepared according to comparative example 1.

The retardation profile of the film is shown in FIG. 7. From this data it is determined that the film has the optical property of an +C-plate, and that the film has a dispersion with $R_{450}/R_{550}=1.04$ when measured at an angle of between 20 and 60° out to the plane of the film, which is significantly higher than the dispersion of the films according to examples 1 and 2.

Figure 8:
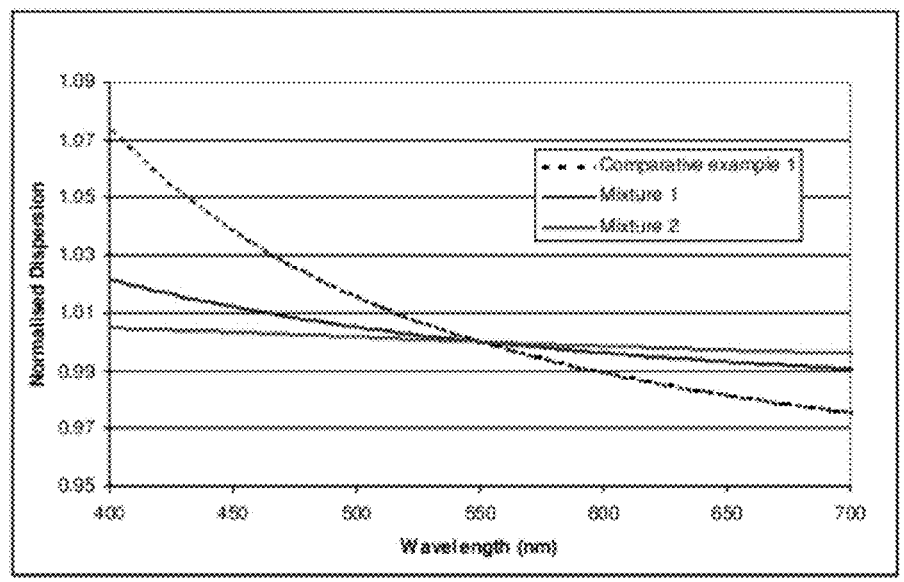
FIG. 8 shows the normalized retardation plots for the films prepared according to example 1, 2 and comparative example 1.

FIG. 8 shows the normalized retardation plots obtained by measuring the retardation versus wavelength of each of the polymerised +C film of examples 1, 2 and comparative example 1, at an angle of 60° to normal by the use of a spectroscopic ellipsometer, for example the M2000 spectroscopic ellipsometer manufactured by J. A. Woollam Co. Such plots are usually referred to as retardation dispersion plots. The retardation dispersion curve of each film is normalised so that films with slightly different retardation values can be compared to each other. The figure shows that by adding suitable dimers to the mixture the dispersion of the mixture decreases.

The invention claimed is:

1. A compound comprising two subunits, wherein each subunit comprises
   two mesogenic groups comprising one or more non-aromatic rings,
   optionally one or more polymerizable groups attached to at least one of the mesogenic groups either directly or via spacer groups, and
   a bridging group connecting the mesogenic groups, comprising one or more subgroups selected from pi-conjugated linear carbyl or hydrocarbyl groups, aromatic and heteroaromatic groups, and being linked to a sp$^3$-hybridized C atom or Si-atom in a non-aromatic ring of each mesogenic group.

2. A compound according to claim 1, wherein said mesogenic groups comprise more saturated rings than unsaturated or aromatic rings.

3. A compound according to claim 1, wherein said bridging group consists of subgroups selected from pi-conjugated linear groups, aromatic and heteroaromatic groups.

4. A compound according to claim 1, wherein said bridging group is connected in axial position to a cyclohexylene or silanane ring comprised in a mesogenic group, which is optionally substituted and wherein one or more non-adjacent C-atoms are each optionally replaced by Si and/or one or more non-adjacent CH$_2$ groups are each optionally replaced by —O— or —S—.

5. A compound according to claim 1, selected from the following formula:

$$R^1-(A^1-Z^1)_m-U^1-(Z^2-A^2)_n-R^2 \atop |(B)_q$$
$$R^3-(A^3-Z^3)_o-U^2-(Z^4-A^4)_p-W-(A^1-Z^1)_m-U^1-(Z^2-A^2)_n-R^2 \atop |(B)_q$$
$$R^4-(A^3-Z^3)_o-U^2-(Z^4-A^4)_p-R^4$$

I wherein
W is a spacer group,
$U^{1,2}$ are independently of each other selected from

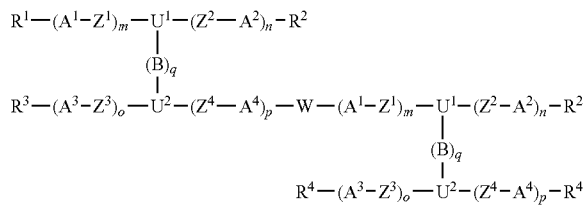

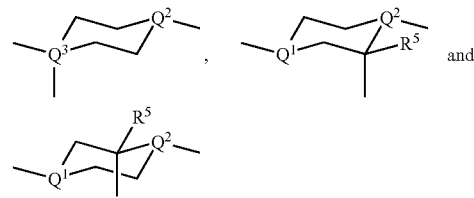

including their mirror images, wherein the rings $U^1$ and $U^2$ are each bonded to the group —(B)$_q$— via the axial bond, and one or two non-adjacent CH$_2$ groups in these rings are each optionally replaced by O or S, and the rings $U^1$ and $U^2$ are each optionally substituted by one or more groups L,
$Q^{1,2}$ are, independently of each other, CH or SiH,
$Q^3$ is C or Si,
B is in each occurrence independently of one another —C≡C—, —CY$^1$=CY$^2$— or an optionally substituted aromatic or heteroaromatic group, $Y^{1,2}$ are independently of each other H, F, Cl, CN or $R^0$, q is an integer from 1 to 10, $A^{1-4}$ are independently of each other selected from non-aromatic, aromatic or heteroaromatic carbocyclic or heterocyclic groups, which are optionally substituted by one or more groups $R^5$, and wherein each of $-(A^1-Z^1)_m-U^1-(Z^2-A^2)_n-$ and $-(A^3-Z^3)_o-U^2-(Z^4-A^4)_p-$ does not contain more aromatic groups than non-aromatic groups, $Z^{1-4}$ are independently of each other, identical or different groups selected from —O—, —S—, —CO—, —COO—, —OCO—, —O—COO—, —CO—$NR^0$—, —$NR^0$—CO—, —$NR^0$—CO—$NR^0$—, —OCH$_2$—, —CH$_2$O—, —SCH$_2$—, —CH$_2$S—, —CF$_2$O—, —OCF$_2$—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —$CY^1$=$CY^2$—, —CH=N—, —N=CH—, —N=N—, —CH=$CR^0$—, —C≡C—, —CH=CH—COO—, —OCO—CH=CH—, $CR^0R^{00}$ or a single bond, $R^0$ and $R^{00}$ are independently of each other H or alkyl with 1 to 12 C-atoms, m, n, o and p are independently of each other 0, 1, 2, 3 or 4, $R^{1-5}$ are, independently of each other, identical or different groups selected from H, halogen, —CN, —NC, —NCO, —NCS, —OCN, —SCN, —C(=O)$NR^0R^{00}$, —C(=O)$X^0$, —C(=O)$R^0$, —NH$_2$, —$NR^0R^{00}$, —SH, —$SR^0$, —SO$_3$H, —SO$_2R^0$, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group $R^{1-5}$ denoting or being substituted by P or P-Sp-, P is a polymerizable group, and Sp is a spacer group or a single bond.

6. A compound according to claim 5, wherein the bridging group —(B)$_q$— is selected from —C≡C—, —C≡C—C≡C—, —C≡C—C≡C—C≡C—, —C≡C—C≡C—C≡C—C≡C—,

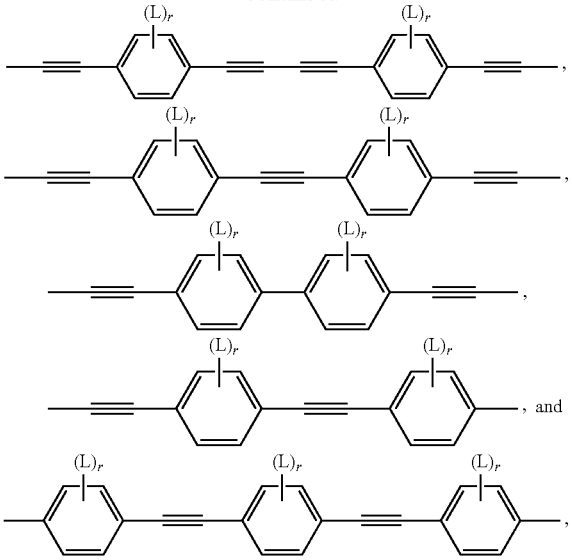

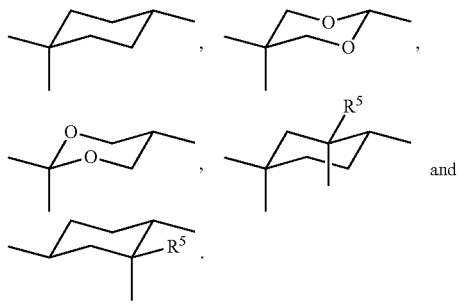

wherein r is 0, 1, 2, 3 or 4,

L is selected from P-Sp-, F, Cl, Br, I, —CN, —NO$_2$, —NCO, —NCS, —OCN, —SCN, —C(=O)$NR^0R^{00}$, —C(=O)X, —C(=O)$OR^0$, C(=O)$R^0$, —$NR^0R^{00}$, —OH, —SF$_5$, optionally substituted silyl, aryl with up to 12 C atoms, and straight chain or branched alkyl, alkoxy, alkylcarbonyl, alkoxycarbonyl, alkylcarbonyloxy or alkoxycarbonyloxy with up to 12 C atoms, wherein in the alkyl, alkoxy, alkylcarbonyl, alkoxycarbonyl, alkylcarbonyloxy or alkoxycarbonyloxy groups one or more H atoms are optionally replaced by F or Cl, and X is halogen.

7. A compound according to claim 5, wherein $U^1$ and $U^2$ are selected from

8. A compound according to claim 6, wherein $A^{1-4}$ are selected from trans-1,4-cyclohexylene and 1,4-phenylene that is optionally substituted with one or more groups.

9. A compound according to claim 1, wherein the mesogenic groups do not comprise more than one unsaturated or aromatic ring.

10. A compound according to claim 5, wherein $Z^{1-4}$ are selected from —O—, —S—, —CO—, —COO—, —OCO—, —O—COO—, —CO—$NR^0$—, —$NR^0$—CO—, —$NR^0$—CO—$NR^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond.

11. A compound according to claim 5, wherein
P is selected from CH$_2$=CW$^1$—COO—, CH$_2$=CW$^1$—CO—,

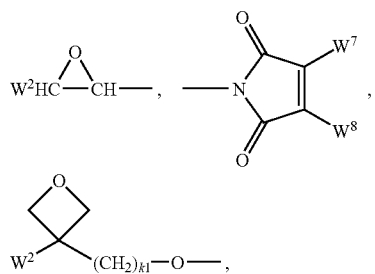

CH$_2$=CW$^2$—(O)$_{k1}$—, CH$_3$—CH=CH—O—, (CH$_2$=CH)$_2$ CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe-(O)$_{k2}$—, Phe-CH=CH—, HOOC—, OCN—, and W$^4$W$^5$W$^6$Si—, W$^1$ is H, F, Cl, CN, CF$_3$, phenyl or alkyl with 1 to 5 C-atoms, W$^2$ and W$^3$ are, independently of each other, H or alkyl with 1 to 5 C-atoms, W$^4$, W$^5$ and W$^6$ are, independently of each other, Cl, oxaalkyl or oxacarbonylalkyl with 1 to 5 C-atoms, W$^7$ and W$^8$ are, independently of each other, H, Cl or alkyl with 1 to 5 C-atoms, Phe is 1,4-phenylene that is optionally substituted, and k$_1$ and k$_2$ are, independently of each other, 0 or 1.

12. A compound according to claim 5, wherein
W is selected from formula X'—W'—X",
W' is alkylene with 1 to 20 C atoms, preferably 1 to 12 C-atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —NR$^0$—CO—O—, —O—CO—NR$^0$—, —NR$^0$—CO—NR$^0$—, —CH=CH— or —C≡C— in such a manner that O and/or S atoms are not linked directly to one another, and X' and X" are, independently of each other, —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^1$=CY$^2$—, —C≡C—, —CH=CH—COO—, —OCO—CH=CH— or a single bond.

13. A compound according to claim 12, wherein
Sp is of the formula Sp'-X' whereby P-Sp- is P-Sp'-X'—, and Sp' is alkylene with 1 to 20 C atoms, preferably 1 to 12 C-atoms, which is optionally mono- or polysubstituted by F, Cl, Br, I or CN, and wherein one or more non-adjacent CH$_2$ groups are optionally replaced, in each case independently from one another, by —O—, —S—, —NH—, —NR$^0$—, —SiR$^0$R$^{00}$—, —CO—, —COO—, —OCO—, —OCO—O—, —S—CO—, —CO—S—, —NR$^0$—CO—O—, —O—CO—NR$^0$—, —NR$^0$—CO—NR$^0$—, —CH=CH— or —C≡C— in such a manner that O and/or S atoms are not linked directly to one another.

14. A compound according to claim 6, selected from the following formulae:

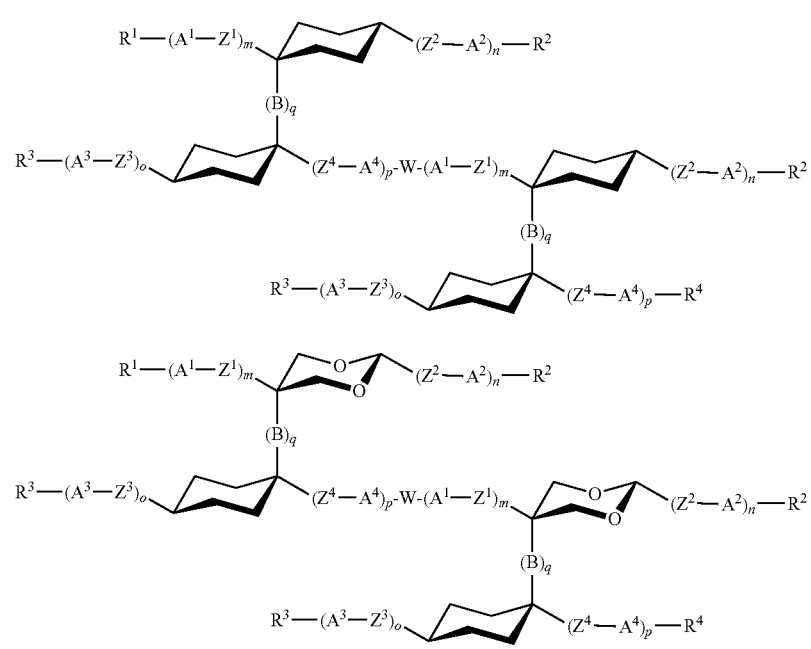

c
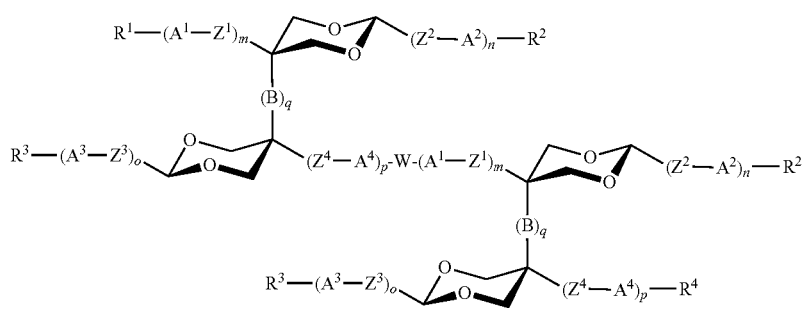
d
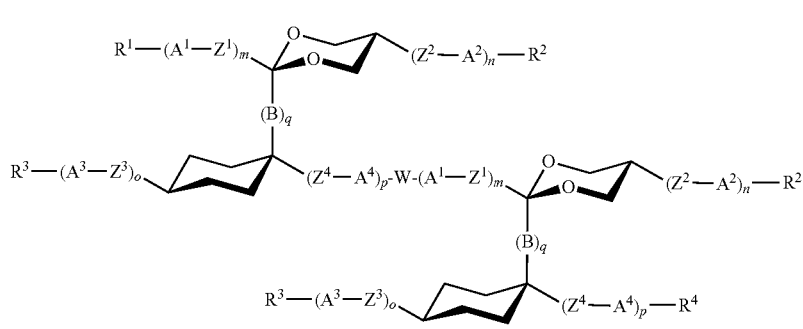
e
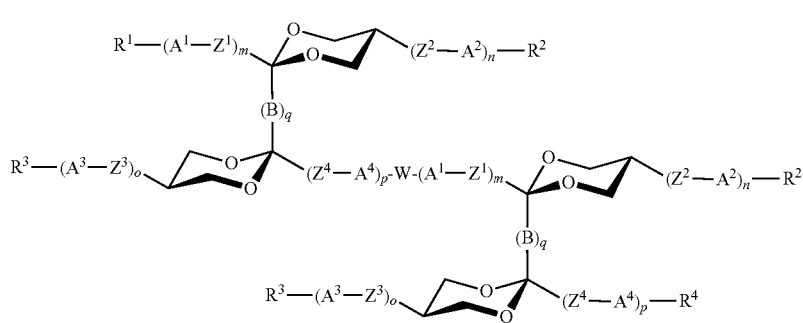
f
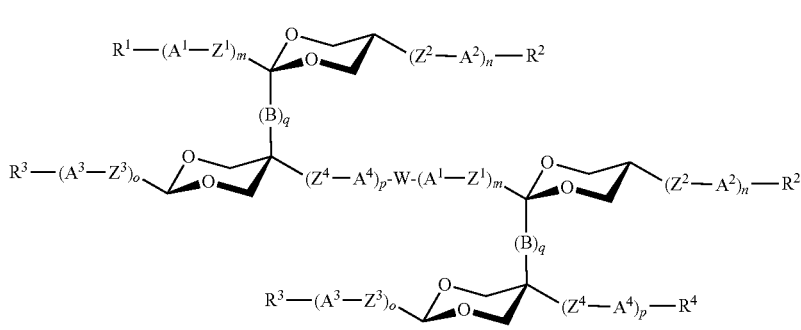
g
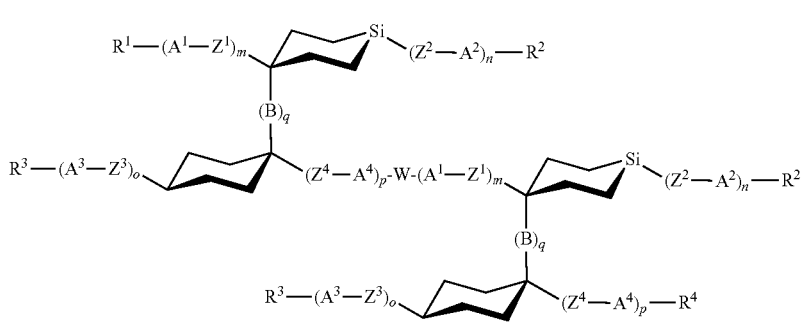

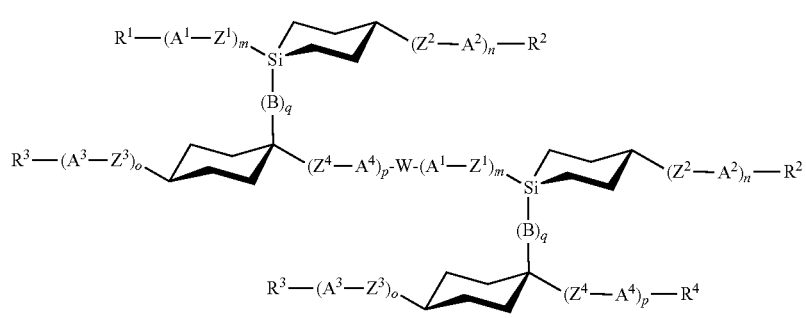
h
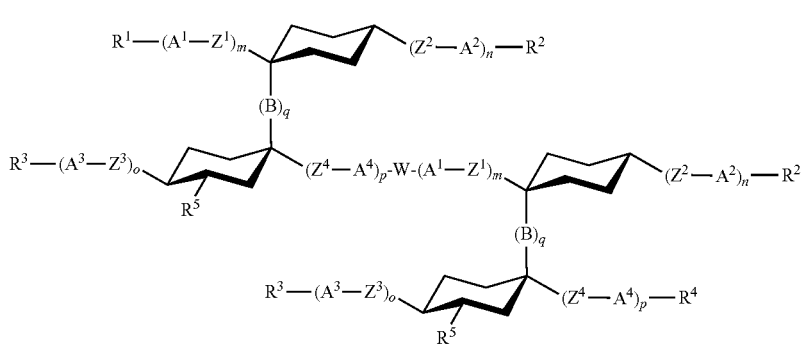
i
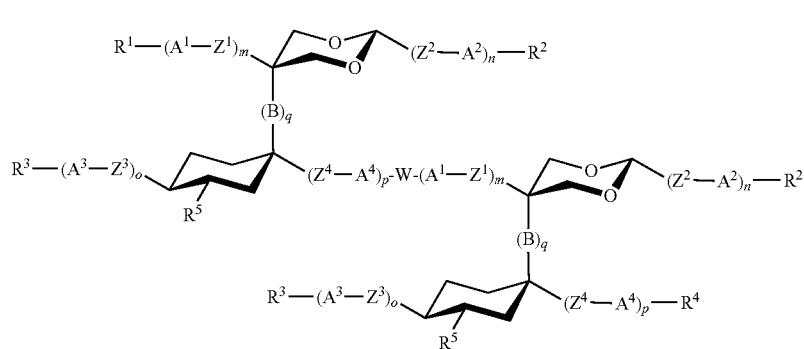
k
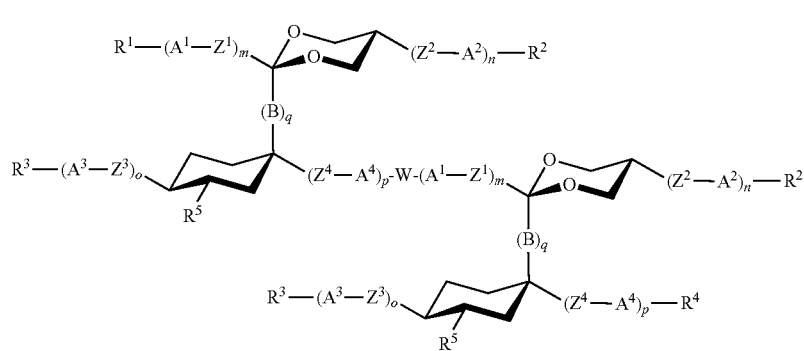
m
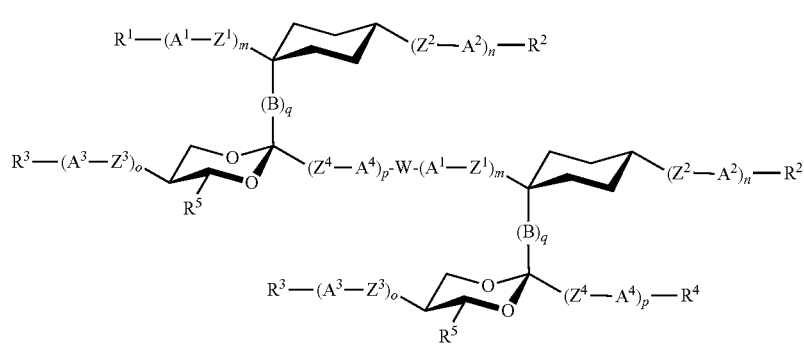
n

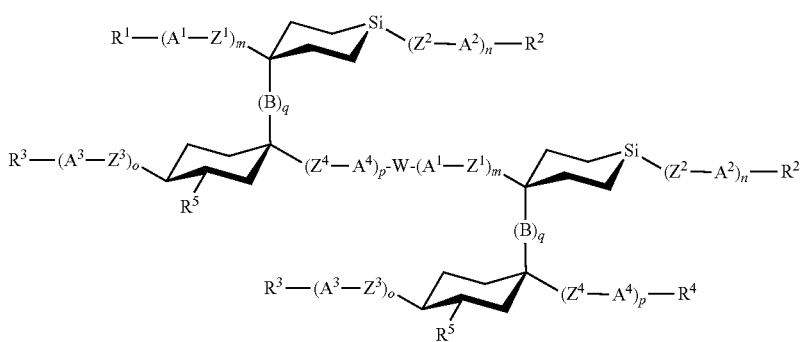
o
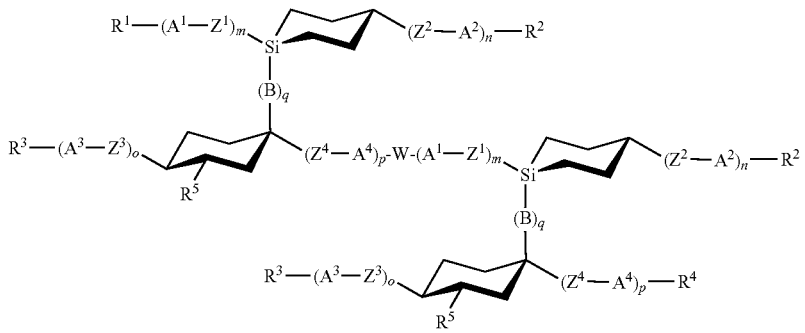
p
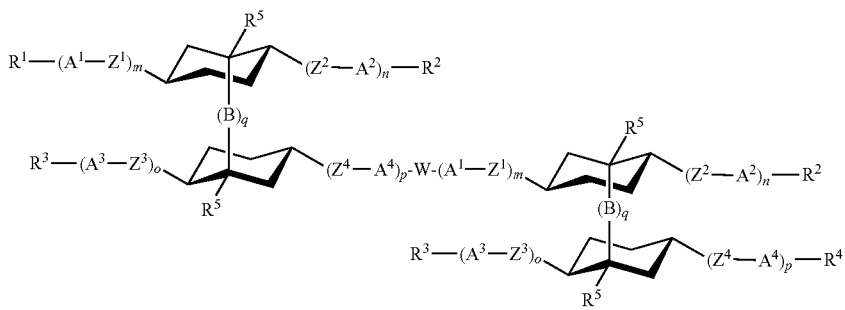
q
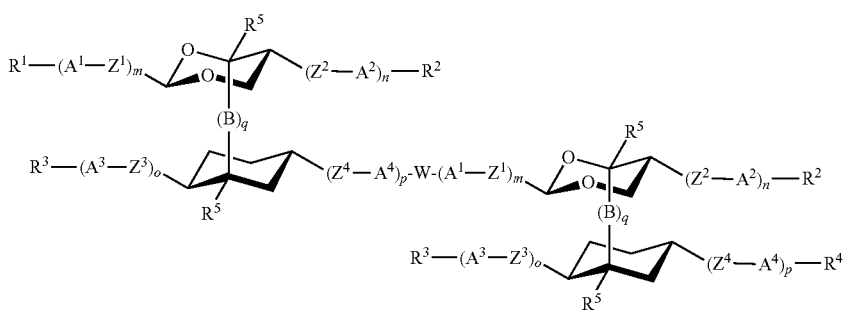
r
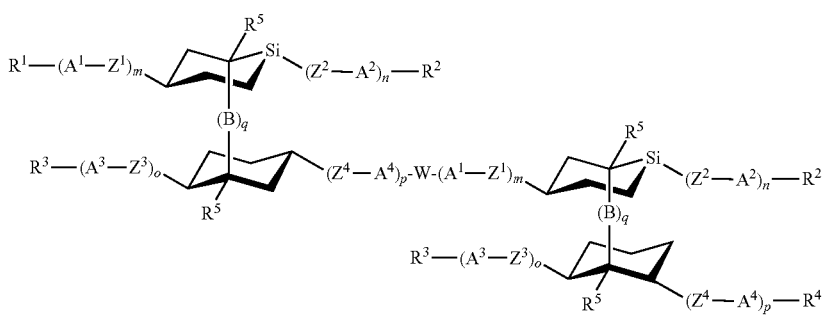
s

-continued
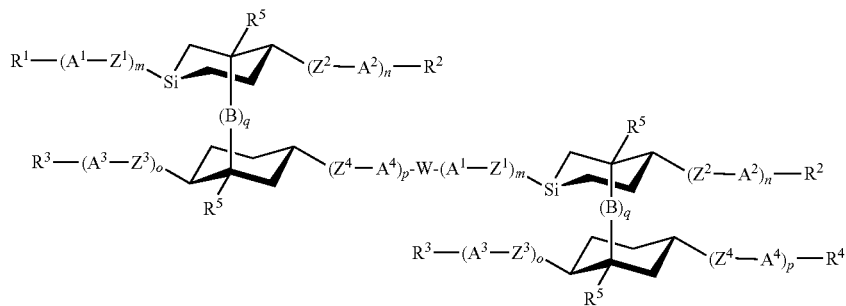
t
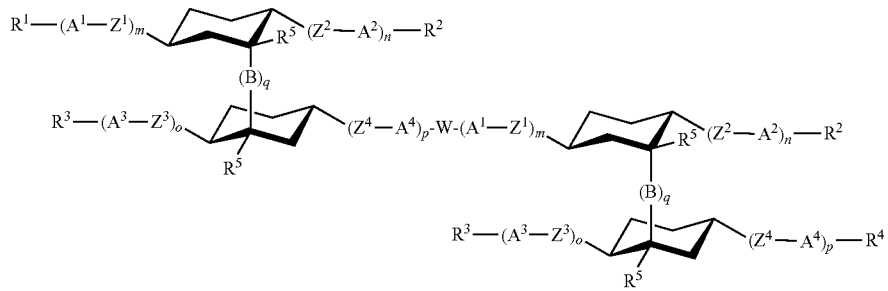
u
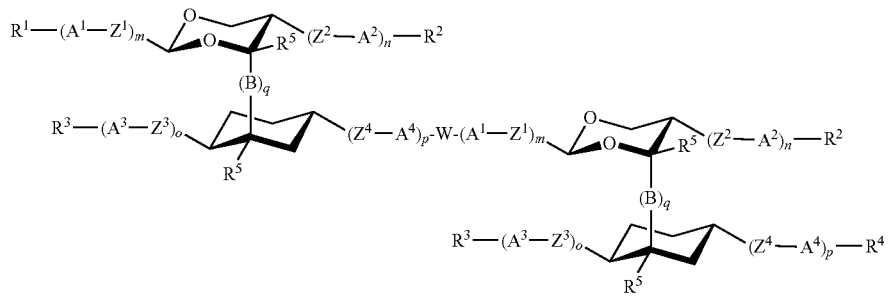
v
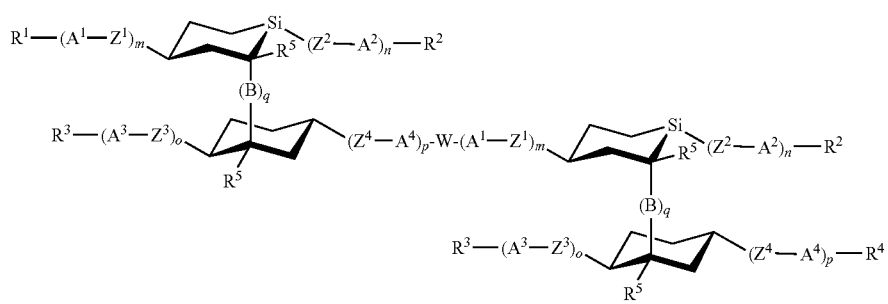
w
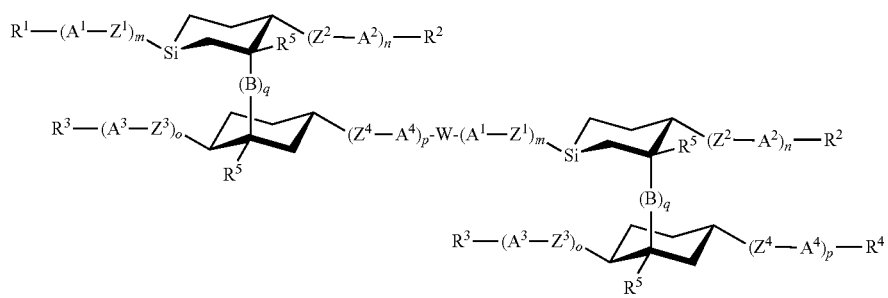
x

15. A compound according to claim 5, selected from the following formulae:
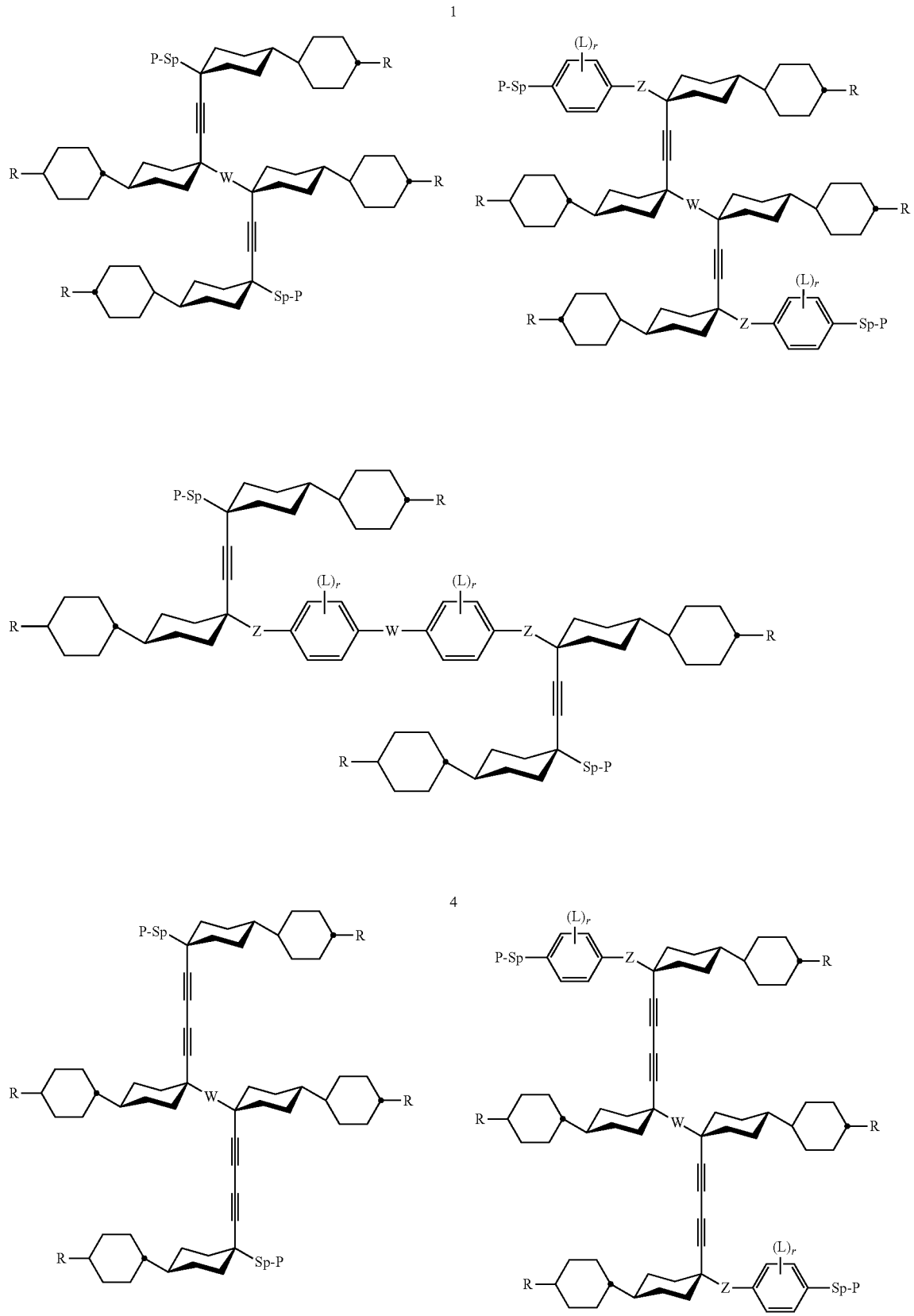

-continued
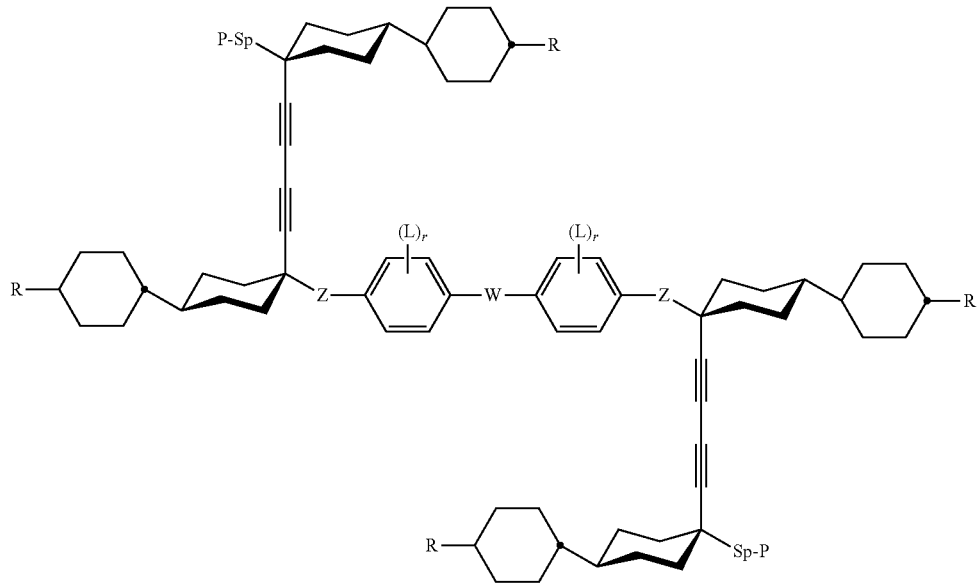
6
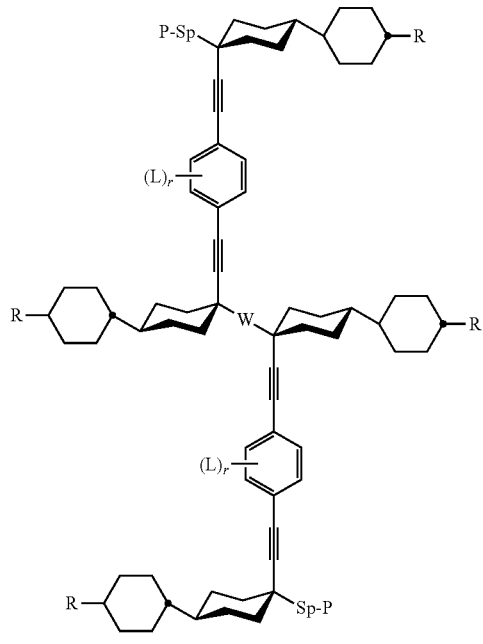
7
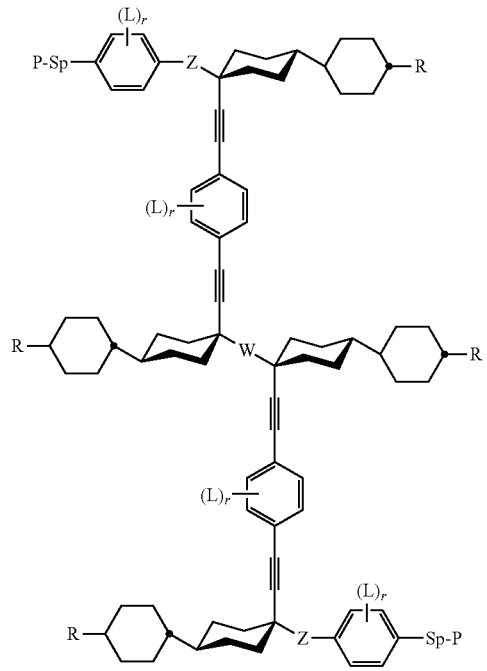
8

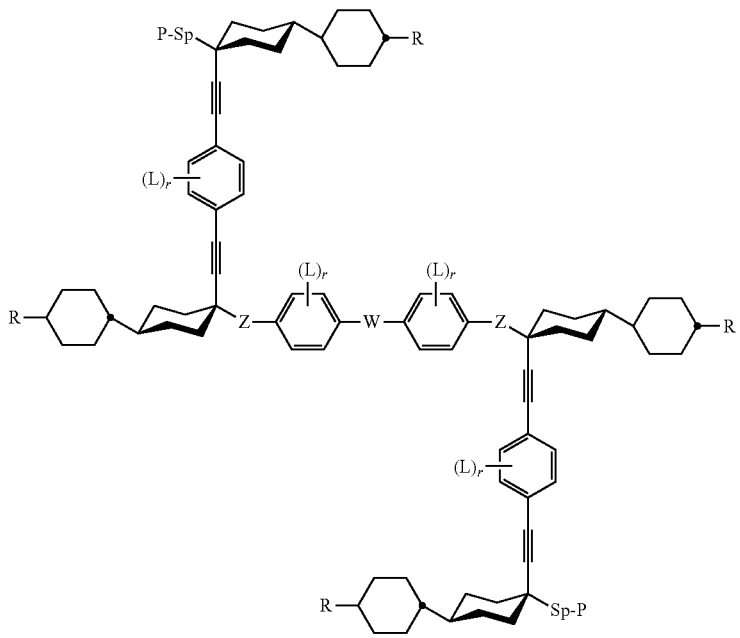

wherein

Z is selected from —O—, —S—, —CO—, —COO—, —OCO—, —O—COO—, —CO—NR⁰—, —NR⁰—CO—, —NR⁰—CO—NR⁰—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, CH=CH—, —CY$^1$=CY$^2$—, —CH=N—, —N=CH—, —N=N—, —CH=CR⁰—, —C≡C—, —CH=CH—COO—, —OCO—CH=CH—, CR⁰R⁰⁰ or a single bond, and R is selected from H, halogen, —CN, —NC, —NCO, —NCS, —OCN, —SCN, —C(=O)NR⁰R⁰⁰, —C(=O)X⁰, —C(=O)R⁰, —NH$_2$, —NR⁰R⁰⁰, —SH, —SR⁰, —SO$_3$H, —SO$_2$R⁰, —OH, —NO$_2$, —CF$_3$, —SF$_5$, P-Sp-, optionally substituted silyl, or carbyl or hydrocarbyl with 1 to 40 C atoms that is optionally substituted and optionally comprises one or more hetero atoms.

16. A liquid-crystal formulation comprising one or more compounds according to claim 1.

17. A polymerizable liquid-crystal formulation comprising one or more compounds according to claim 1, and one or more further compounds, wherein at least one of the compounds is polymerizable.

18. A birefringent polymer film obtainable by polymerizing a polymerizable compound according to claim 1 in its liquid-crystal phase in an oriented state in the form of a thin film.

19. A birefringent polymer film with $R_{450}/R_{550} < 1$, wherein $R_{450}$ is the optical on-axis retardation at a wavelength of 450 nm and $R_{550}$ is the optical on-axis retardation at a wavelength of 550 nm, said film being obtainable by polymerizing one or more polymerizable compounds according to claim 1.

20. An optical film, retarder, or compensator having negative optical dispersion comprising a polymerized compound according to claim 1.

21. An optical, electronic or electrooptical component or device, comprising a compound according to claim 1.

22. An optical component according to claim 21, wherein said component is an optically uniaxial film selected from an A-plate, C-plate, negative C-plate or O-plate, a twisted optical retarder, a twisted quarter wave foil (QWF), an optically biaxial film, an achromatic retarder, an achromatic QWF or half wave foil (HWF), a film having a cholesteric, smectic, nematic or blue phase, a film having homeotropic, splayed, tilted, planar or blue-phase alignment, which is uniformly oriented or exhibits a pattern of different orientations.

23. An optical component according to claim 21, wherein said component is an optical compensation film for viewing angle enhancement of LCD's, a component in a brightness enhancement films, or an achromatic element in reflective or transflective LCD's.

24. A device or component according to claim 21, wherein said device or component is selected from electrooptical displays, LCDs, optical films, polarizers, compensators, beam splitters, reflective films, alignment layers, color filters, holographic elements, hot stamping foils, coloured images, decorative or security markings, LC pigments, adhesives, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electrophotographic recording devices, capacitors, charge injection layers, Schottky diodes, planarising layers, antistatic films, conducting substrates, conducting patterns, photoconductors, electrophotographic applications, electrophotographic recording, organic memory devices, biosensors, biochips, optoelectronic devices requiring similar phase shift at multiple wavelengths, combined CD/DVD/HD-DVD/Blu-Rays, reading, writing re-writing data storage systems, and cameras.

25. A method for preparing a compound according to claim 1, comprising:
- a) reacting a suitably substituted acetylene with an optionally substituted cyclohexanone in the presence of butyllithium,
- b) separating the isomers thereby formed,
- c) reacting the hydroxy group of one isomer prepared according to a) and b) with a polymerizable group,
- d) repeating a) and b) with the same or different cyclohexanone and acetylene educts,
- e1) reacting one isomer prepared by d) with a dihaloalkane and butyllithium to yield a diether compound, or
- e2) reacting one isomer prepared by d) with a diacid to yield a diester compound,
- f) coupling the diester or diether prepared by e1) or e2), respectively, with a dihaloaromatic compound under Sonogashira conditions,
- g) reacting the product of c) with the product of step f) under Sonogashira conditions.

* * * * *

UNITED STATES PATENT AND TRADEMARK OFFICE
CERTIFICATE OF CORRECTION

PATENT NO. : 8,252,389 B2
APPLICATION NO. : 12/679341
DATED : August 28, 2012
INVENTOR(S) : Kevin Adlem et al.

It is certified that error appears in the above-identified patent and that said Letters Patent is hereby corrected as shown below:

Column 75, Line 15 reads: "-$OCF_2$-, -$SCF_2$-, -$CH_2CH_2$-, -$(CH_2)_3$-", should read
-- -$OCF_2$-, -$CF_2S$-, -$SCF_2$-, -$CH_2CH_2$-, -$(CH_2)_3$- --.

Signed and Sealed this
Twenty-seventh Day of November, 2012

David J. Kappos
*Director of the United States Patent and Trademark Office*